United States Patent
Frei et al.

(10) Patent No.: US 10,536,361 B2
(45) Date of Patent: Jan. 14, 2020

(54) METHOD AND APPARATUS FOR MONITORING AND PROCESSING SENSOR DATA FROM AN ELECTRICAL OUTLET

(71) Applicant: Ubiquiti Networks, Inc., San Jose, CA (US)

(72) Inventors: Randall W. Frei, San Jose, CA (US); Linker Cheng, San Jose, CA (US); Robert J. Pera, San Jose, CA (US)

(73) Assignee: Ubiquiti Inc., New York, NY (US)

( * ) Notice: Subject to any disclaimer, the term of this patent is extended or adjusted under 35 U.S.C. 154(b) by 330 days.

(21) Appl. No.: 13/736,879

(22) Filed: Jan. 8, 2013

(65) Prior Publication Data

US 2014/0006506 A1    Jan. 2, 2014

Related U.S. Application Data

(60) Provisional application No. 61/665,238, filed on Jun. 27, 2012, provisional application No. 61/665,839, (Continued)

(51) Int. Cl.
*H04L 12/26* (2006.01)
*G05B 15/02* (2006.01)
(Continued)

(52) U.S. Cl.
CPC .............. *H04L 43/10* (2013.01); *G05B 15/02* (2013.01); *G06F 1/26* (2013.01); *G06F 13/10* (2013.01);
(Continued)

(58) Field of Classification Search
CPC ..................................... H04L 1/00; G05F 1/66
(Continued)

(56) References Cited

U.S. PATENT DOCUMENTS

| | | | |
|---|---|---|---|
| 4,992,866 A | 2/1991 | Morgan | |
| 5,170,381 A * | 12/1992 | Taylor et al. | 369/4 |

(Continued)

OTHER PUBLICATIONS

Title: The WebSocket Protocol Authors: Internet Engineering Task Force (IETF), I. Fette, Google, Inc., A. Melnikov, and Isode Ltd. Date: Dec. 2011.*

(Continued)

*Primary Examiner* — William G Trost, IV
*Assistant Examiner* — Christopher P Cadorna
(74) *Attorney, Agent, or Firm* — Shun Yao; Park, Vaughan, Fleming & Dowler LLP

(57) ABSTRACT

A load-monitoring interfacing device obtains and processes sensor data from an electrical load. The interfacing device can include at least one power outlet to provide power to a corresponding electrical load. During operation, the interfacing device can obtain sensor data from a local power outlet coupled to an electrical load, such that the sensor data can indicate an electrical measurement associated with the electrical load. The interfacing device selects a rule to process based on the obtained sensor data, and processes the rule to determine whether to perform an action. If the rule's condition is satisfied, the interfacing device proceeds to processing the rule's action description to perform the action, such as to enable or disable a power outlet, or to perform any other pre-defined action.

36 Claims, 31 Drawing Sheets

Related U.S. Application Data filed on Jun. 28, 2012, provisional application No. 61/716,429, filed on Oct. 19, 2012, provisional application No. 61/665,772, filed on Jun. 28, 2012, provisional application No. 61/665,769, filed on Jun. 28, 2012, provisional application No. 61/716,392, filed on Oct. 19, 2012.

(51) Int. Cl.

| | | |
|---|---|---|
| *H04L 29/08* | (2006.01) | |
| *H04L 12/28* | (2006.01) | |
| *G06F 1/26* | (2006.01) | |
| *G06F 13/10* | (2006.01) | |
| *G08B 25/01* | (2006.01) | |
| *H04W 4/14* | (2009.01) | |
| *H04L 12/24* | (2006.01) | |
| *H04L 29/12* | (2006.01) | |
| *H04L 12/58* | (2006.01) | |

(52) U.S. Cl.
CPC ............ *G08B 25/01* (2013.01); *H04L 12/281* (2013.01); *H04L 12/2803* (2013.01); *H04L 12/2809* (2013.01); *H04L 12/2818* (2013.01); *H04L 12/2825* (2013.01); *H04L 29/1249* (2013.01); *H04L 41/024* (2013.01); *H04L 43/065* (2013.01); *H04L 51/046* (2013.01); *H04L 51/38* (2013.01); *H04L 61/2061* (2013.01); *H04L 67/10* (2013.01); *H04L 67/104* (2013.01); *H04L 67/12* (2013.01); *H04L 67/125* (2013.01); *H04L 67/141* (2013.01); *H04L 67/26* (2013.01); *H04L 67/289* (2013.01); *H04W 4/14* (2013.01); *H04L 61/2575* (2013.01); *Y02B 70/126* (2013.01); *Y02D 10/14* (2018.01)

(58) Field of Classification Search
USPC ........................................................ 709/204
See application file for complete search history.

(56) References Cited

U.S. PATENT DOCUMENTS

| | | | |
|---|---|---|---|
| 5,179,554 A * | 1/1993 | Lomicka et al. ............ 370/257 |
| 5,278,771 A | 1/1994 | Nyenya | |
| 5,510,975 A | 4/1996 | Ziegler | |
| 5,621,662 A | 4/1997 | Humphries | |
| 5,872,594 A | 2/1999 | Thompson | |
| 6,157,372 A | 12/2000 | Blackburn | |
| 6,192,282 B1 | 2/2001 | Smith | |
| 6,199,074 B1 | 3/2001 | Kern | |
| 6,266,082 B1 | 7/2001 | Yonezawa | |
| 6,275,922 B1 | 8/2001 | Bertsch | |
| 6,275,992 B1 | 8/2001 | Bertsch | |
| 6,359,647 B1 | 3/2002 | Sengupta | |
| 6,501,377 B2 | 12/2002 | Ebata | |
| 6,529,234 B2 | 3/2003 | Urisaka | |
| 6,535,793 B2 | 3/2003 | Allard | |
| 6,580,451 B2 | 6/2003 | Yonezawa | |
| 6,597,393 B2 | 7/2003 | Kato | |
| 6,665,004 B1 | 12/2003 | Paff | |
| 6,693,533 B2 | 2/2004 | Ebata | |
| 6,759,957 B2 | 7/2004 | Murakami | |
| 6,845,297 B2 | 1/2005 | Allard | |
| 6,954,859 B1 | 10/2005 | Simerly | |
| 6,970,751 B2 | 11/2005 | Gonzales | |
| 6,977,585 B2 | 12/2005 | Falk | |
| 7,095,321 B2 | 8/2006 | Primm | |
| 7,099,723 B2 | 8/2006 | Gonzales | |
| 7,113,090 B1 | 9/2006 | Saylor | |
| 7,117,043 B1 | 10/2006 | Frederick | |
| 7,319,477 B2 | 1/2008 | Katz | |
| 7,353,114 B1 | 4/2008 | Rohlf | |
| 7,526,539 B1 | 4/2009 | Hsu | |
| 7,555,658 B2 | 6/2009 | Vahid | |
| 7,584,020 B2 | 9/2009 | Bruemmer | |
| 7,587,260 B2 | 9/2009 | Bruemmer | |
| 7,668,621 B2 | 2/2010 | Bruemmer | |
| 7,683,940 B2 | 3/2010 | Fleming | |
| 7,783,390 B2 | 8/2010 | Miller | |
| 7,791,466 B2 | 9/2010 | Agarwalla | |
| 7,801,644 B2 | 9/2010 | Bruemmer | |
| 7,839,926 B1 | 11/2010 | Metzger | |
| 7,859,571 B1 | 12/2010 | Brown | |
| 7,865,242 B2 | 1/2011 | Diebold | |
| 7,865,252 B2 | 1/2011 | Clayton | |
| 7,895,136 B2 | 2/2011 | Slemmer | |
| 7,945,614 B2 | 5/2011 | Ebata | |
| 7,952,609 B2 | 5/2011 | Simerly | |
| 7,974,738 B2 | 7/2011 | Bruemmer | |
| 8,013,732 B2 | 9/2011 | Petite | |
| 8,031,650 B2 | 10/2011 | Petite | |
| 8,042,048 B2 | 10/2011 | Wilson | |
| 8,060,582 B2 | 11/2011 | Bliss | |
| 8,073,564 B2 | 12/2011 | Bruemmer | |
| 8,154,398 B2 | 4/2012 | Rolf | |
| 8,165,041 B2 | 4/2012 | Wang | |
| 8,212,667 B2 | 7/2012 | Petite | |
| 8,266,107 B2 | 9/2012 | Fashchik | |
| 8,270,767 B2 | 9/2012 | Park | |
| 8,306,634 B2 | 11/2012 | Nguyen | |
| 8,310,335 B2 | 11/2012 | Sivakkolundhu | |
| 8,350,697 B2 | 1/2013 | Trundle | |
| 8,390,684 B2 | 3/2013 | Piran | |
| 8,429,435 B1 | 4/2013 | Clayton | |
| 8,478,450 B2 | 7/2013 | Lu | |
| 8,489,065 B2 | 7/2013 | Green | |
| 8,619,136 B2 | 12/2013 | Howarter | |
| 8,742,686 B2 | 6/2014 | Zampini, II | |
| 8,761,000 B2 | 6/2014 | Knox | |
| 9,063,873 B2 | 6/2015 | Frei | |
| 9,083,566 B1 | 7/2015 | Pearson | |
| 9,183,163 B2 | 11/2015 | Frei | |
| 9,258,593 B1 | 2/2016 | Chen | |
| 2001/0024233 A1 | 9/2001 | Urisaka | |
| 2001/0026318 A1 | 10/2001 | Yonezawa | |
| 2001/0037163 A1 | 11/2001 | Allard | |
| 2002/0067254 A1 | 6/2002 | Ebata | |
| 2003/0033028 A1 | 2/2003 | Bennett | |
| 2003/0050737 A1 * | 3/2003 | Osann, Jr. .................... 700/276 |
| 2003/0095042 A1 | 5/2003 | Ebata | |
| 2003/0149754 A1 | 8/2003 | Miller | |
| 2003/0216834 A1 | 11/2003 | Allard | |
| 2003/0217136 A1 | 11/2003 | Cho et al. | |
| 2003/0217236 A1 | 11/2003 | Rowlands | |
| 2003/0233660 A1 | 12/2003 | Slemmer et al. | |
| 2004/0008257 A1 | 1/2004 | Kim | |
| 2004/0073720 A1 | 4/2004 | Clough | |
| 2004/0117462 A1 | 6/2004 | Bodin | |
| 2005/0063365 A1 * | 3/2005 | Mathew et al. ............ 370/352 |
| 2005/0132414 A1 | 6/2005 | Bentley | |
| 2006/0053459 A1 | 3/2006 | Simerly | |
| 2006/0253205 A1 | 11/2006 | Gardiner | |
| 2007/0016663 A1 | 1/2007 | Weis | |
| 2007/0156781 A1 | 7/2007 | Kapoor | |
| 2007/0188615 A1 | 8/2007 | Beniyama | |
| 2007/0282944 A1 | 12/2007 | Odaka et al. | |
| 2008/0009964 A1 | 1/2008 | Bruemmer | |
| 2008/0009965 A1 | 1/2008 | Bruemmer | |
| 2008/0009966 A1 | 1/2008 | Bruemmer | |
| 2008/0009967 A1 | 1/2008 | Bruemmer | |
| 2008/0009968 A1 | 1/2008 | Bruemmer | |
| 2008/0009969 A1 | 1/2008 | Bruemmer | |
| 2008/0009970 A1 | 1/2008 | Bruemmer | |
| 2008/0079561 A1 | 4/2008 | Trundle | |
| 2008/0098068 A1 | 4/2008 | Ebata | |
| 2008/0211929 A1 | 9/2008 | Uchihara | |
| 2008/0252448 A1 | 10/2008 | Agarwalla | |
| 2008/0303903 A1 | 12/2008 | Bentley | |
| 2009/0070477 A1 | 3/2009 | Baum et al. | |
| 2009/0198384 A1 | 8/2009 | Ahn | |

(56) References Cited

U.S. PATENT DOCUMENTS

| | | |
|---|---|---|
| 2009/0234499 A1 | 9/2009 | Nielsen |
| 2009/0262206 A1 | 10/2009 | Park |
| 2009/0288011 A1 | 11/2009 | Piran |
| 2009/0307255 A1 | 12/2009 | Park |
| 2010/0023865 A1 | 1/2010 | Fulker |
| 2010/0082954 A1 | 4/2010 | Lim |
| 2010/0088970 A1* | 4/2010 | Miller ............... E04C 2/296 52/1 |
| 2010/0097473 A1 | 4/2010 | Park |
| 2010/0106801 A1 | 4/2010 | Bliss |
| 2010/0138363 A1* | 6/2010 | Batterberry ........... G06Q 10/04 705/412 |
| 2010/0150157 A1 | 6/2010 | Wang |
| 2010/0152897 A1 | 6/2010 | Muller |
| 2010/0238082 A1 | 9/2010 | Kits van Heyningen et al. |
| 2010/0256823 A1* | 10/2010 | Cherukuri et al. ........... 700/277 |
| 2010/0280635 A1 | 11/2010 | Cohn |
| 2010/0280637 A1 | 11/2010 | Cohn |
| 2010/0298957 A1 | 11/2010 | Sanchez |
| 2011/0046792 A1* | 2/2011 | Imes ................. H04L 67/42 700/278 |
| 2011/0046805 A1* | 2/2011 | Bedros et al. ................ 700/291 |
| 2011/0058036 A1 | 3/2011 | Metzger |
| 2011/0072441 A1* | 3/2011 | Parks et al. .................. 719/313 |
| 2011/0106279 A1 | 5/2011 | Cho |
| 2011/0115816 A1 | 5/2011 | Brackney |
| 2011/0138458 A1 | 6/2011 | Kumar |
| 2011/0173490 A1 | 7/2011 | Narayanaswamy |
| 2011/0178762 A1 | 7/2011 | York |
| 2011/0211584 A1* | 9/2011 | Mahmoud .................... 370/401 |
| 2011/0254697 A1* | 10/2011 | Casey ................. G01D 4/002 340/870.02 |
| 2011/0283121 A1* | 11/2011 | Kuroda ................ G06F 1/3203 713/310 |
| 2012/0001487 A1 | 1/2012 | Pessina |
| 2012/0130513 A1* | 5/2012 | Hao et al. ...................... 700/90 |
| 2012/0158161 A1 | 6/2012 | Cohn |
| 2012/0166538 A1* | 6/2012 | Son et al. ..................... 709/204 |
| 2012/0210147 A1 | 8/2012 | Musti |
| 2012/0226366 A1 | 9/2012 | Lee |
| 2012/0282974 A1 | 11/2012 | Green |
| 2012/0306661 A1* | 12/2012 | Xue et al. ................ 340/870.02 |
| 2013/0035774 A1 | 2/2013 | Warren |
| 2013/0049466 A1* | 2/2013 | Adams .................. G06F 1/266 307/39 |
| 2013/0159237 A1 | 6/2013 | Nath |
| 2013/0201316 A1 | 8/2013 | Binder |
| 2013/0257315 A1 | 10/2013 | Restrepo |
| 2013/0297550 A1 | 11/2013 | Shircliff |
| 2014/0025650 A1 | 1/2014 | Lee |
| 2014/0115660 A1 | 4/2014 | Chinta |
| 2014/0250092 A1 | 9/2014 | Nakayama |

OTHER PUBLICATIONS

Title: STUN—Simple Traversal of User Datagram Protocol (UDP) Through Network Address Translators (NATs) Authors: Network Working Group, J. Rosenberg, J. Weinberger, dynamicsoft, C. Huitema, Microsoft, R. Mahy, and Cisco Date: Mar. 2003.*

Title: Reverse Ajax, Part 1: Introduction to Comet Author: Mathieu Carbou Date: Jul. 19, 2011.*

J. Rosenberg, "Session Traversal Utilities for NAT (STUN)", Oct. 2008, Internet Engineering Task Force (IETF), Standards Track, p. 1-8, 24-27.

S. Loreto, "Known Issues and Best Practices for the Use of Long Polling and Streaming in Bidirectional HTTP", Apr. 2011, Internet Engineering Task Force (IETF), ISSN: 2070-1721, p. 1-5.

Kris Zyp, Dojo Websocket, Oct. 31, 2010, SitePen, www.sitepen.com/blog/2010/10/31/dojo-websocket/ downloaded Jan. 29, 2016.

S. Loreto, "Known Issues and Best Practices for the Use of Long Polling and Streaming in Bidirectional HTP", Apr. 2011.

Lewis, F.L. Wireless Sensor Networks. Smart Environments: Technologies, Protocols, and Applications. 2004.

Liang et al. Design and Implementation of Wireless Smart-home Sensor Network Based on ZigBee Protocol. IEEE. 2008.

Netvox. Intellegent Home Automation System. Product Catalogue. 2013.

Rosenberg, J. Session Traversal Utilities for NAT (STUN) Network Working Group.

Russell et al. The Bayeux Specification. 2007.

Kris Zyp, Dojo WebSocket, Oct. 31, 2010, SitePen, www.sitepen.com/blog/2010/10/31/dojo-websocket/.

Mohammad et al. Smart Home Design Using Wireless Sensor Network and Biometric Technologies. Internatinoal Journal of Application or Innovation in Engineering & Management. vol. 2.Issue 3. Mar. 2013.

S. Loreto et al. "Known Issues and Best Practices for the Use of Long Polling and Streaming in Bidirectional HTTP", rfc-6202, Apr. 2011.

J. Rosenberg et al. "Session Traversal Utilities for NAT (STUN)", rfc-5389, Oct. 2008.

* cited by examiner

METHOD AND APPARATUS FOR MONITORING AND PROCESSING SENSOR DATA FROM AN ELECTRICAL OUTLET

RELATED APPLICATIONS

This application claims the benefit of U.S. Provisional Application No. 61/665,238, entitled "INTELLIGENT SENSOR CONTROL SYSTEM," by inventors Randall W. Frei, Linker Cheng, and Robert J. Pera, filed 27 Jun. 2012; U.S. Provisional Application No. 61/665,839, entitled "SYSTEM AND METHOD FOR INTELLIGENT CONTROL OF DEVICES," by inventors Randall W. Frei, Linker Cheng, and Robert J. Pera, filed 28 Jun. 2012; U.S. Provisional Application No. 61/716,429, entitled "SYSTEM AND METHOD FOR INTELLIGENT CONTROL OF DEVICES," by inventors Randall W. Frei, Linker Cheng, and Robert J. Pera, filed 19 Oct. 2012; U.S. Provisional Application No. 61/665,772, entitled "INTELLIGENT SENSOR COMMUNICATION SYSTEM," by inventors Randall W. Frei, Linker Cheng, and Robert J. Pera, filed 28 Jun. 2012; U.S. Provisional Application No. 61/665,769, entitled "INTELLIGENT POWER MONITOR AND CONTROL SYSTEM," by inventors Randall W. Frei, Linker Cheng, and Robert J. Pera, filed 28 Jun. 2012; and U.S. Provisional Application No. 61/716,392, entitled "NETWORK-CONTROLLABLE INTELLIGENT POWER DEVICES," by inventors Randall W. Frei, Linker Cheng, and Robert J. Pera, filed 19 Oct. 2012.

The subject matter of this application is related to the subject matter of the following co-pending non-provisional applications by the same inventors as the instant application and filed on the same day as the instant application:

U.S. patent application Ser. No. 13/736,767, entitled "METHOD AND APPARATUS FOR CONFIGURING AND CONTROLLING INTERFACING DEVICES," by inventors Randall W. Frei, Linker Cheng, and Robert J. Pera, having filing date Jan. 8, 2013;

U.S. patent application Ser. No. 13/736,838, entitled "METHOD AND APPARATUS FOR MAINTAINING NETWORK CONNECTIONS BETWEEN DEVICES," by inventors Randall W. Frei, Linker Cheng, and Robert J. Pera, having filing date Jan. 8, 2013;

U.S. patent application Ser. No. 13/736,859, entitled "METHOD AND APPARATUS FOR DISTRIBUTED CONTROL OF AN INTERFACING-DEVICE NETWORK," by inventors Randall W. Frei, Linker Cheng, and Robert J. Pera, having filing date Jan. 8, 2013;

U.S. patent application Ser. No. 13/736,883, entitled "METHOD AND APPARATUS FOR MONITORING AND PROCESSING SENSOR DATA IN AN INTERFACING-DEVICE NETWORK," by inventors Randall W. Frei, Linker Cheng, and Robert J. Pera, having filing date Jan. 8, 2013;

U.S. patent application Ser. No. 13/736,869, entitled "METHOD AND APPARATUS FOR MONITORING AND PROCESSING SENSOR DATA USING A SENSOR-INTERFACING DEVICE," by inventors Randall W. Frei, Linker Cheng, and Robert J. Pera, having filing date Jan. 8, 2013; and U.S. patent application Ser. No. 13/736,872, entitled "METHOD AND APPARATUS FOR CONTROLLING POWER TO AN ELECTRICAL LOAD BASED ON SENSOR DATA," by inventors Randall W. Frei, Linker Cheng, and Robert J. Pera, having filing date Jan. 8, 2013.

BACKGROUND

Field

This disclosure is generally related to the control of multiple devices. More specifically, this disclosure is related to intelligent control of the multiple devices.

Related Art

Home automation, or smart homes, has enhanced quality of life of their users. More specifically, a home automation system enables centralized control of lighting, HVAC (heating, ventilation, and air conditioning), appliances, and other systems, thus providing improved convenience, comfort, energy efficiency, and security. Some automation systems provide a way to automate the control of a device based on timed or environmental factors, such as in an HVAC unit or a sprinkler system. However, these typical automation systems provide automated control for an individual type of appliance, and the different automation systems do not interface with one another to provide a complete home automation solution.

In contrast, in a smart home, all electrical devices/appliances in the house are integrated together to provide convenience and a better living experience for its users. Moreover, the ubiquitousness of the Internet connection has also made it possible for a user to monitor and/or control his home remotely. For example, while vacationing in Europe, a user may connect to a surveillance system for his home at Washington D.C. to monitor activities in his home; or the user may turn off his home sprinkler system in response to receiving a storm forecast for the Washington D.C. area.

Typical home automation technologies are often implemented using specially designed control and monitor devices that communicate with one another using a dedicated communication protocol. Because this communication protocol between devices is proprietary, home owners are having trouble to customize the system to include new or different monitor devices from other vendors. In the example of the home surveillance system, the surveillance system controller is connected to various specially designed sensors and/or cameras that are manufactured by the same vendor. Moreover, to implement the centralized control, the appliances (or at least the controllers for each appliance) also need to be manufactured by the same vendor. In the aforementioned example, the home surveillance system and the sprinkler system (or the controllers for these systems) have to be the products of the same vendor to allow the user to access both systems using a single interface. However, installing these dedicated devices or appliance controllers can be costly and wasteful as many existing homes may already be equipped with sensors and appliances that are manufactured by various different vendors.

SUMMARY

One embodiment of the present invention provides a device-controlling system that configures, monitors, and/or controls one or more interfacing devices An interfacing device can obtain and disseminate sensor data from one or more attached physical devices, such as devices that include sensors for measuring physical attributes. During operation, the system can configure an interfacing device by establishing a network connection with the interfacing device, and selecting one or more rules that are to be processed by the interfacing device. The system configures the interfacing device to process its associated rules.

One embodiment of the present invention provides a system that establishes a network connection to a plurality of network devices to facilitate an interfacing device communicating with a device-controlling system, a peer interfacing device, or other computing devices. The system can receive data from a network device, and forwards the data to a peer network device that is subscribed to the data. The system sends the data to the peer network device via a network connection that has been established with the peer network device.

One embodiment of the present invention provides an interfacing device that communicates with other devices over an established network connection to send and/or receive real-time sensor data. During operation, the local device can establish a network connection with a remote network device, such as with a peer interfacing device, or a data-forwarding system. The local device can maintain data subscriptions to other peer devices to obtain real-time data elements associated with a rule, such as by sending a data-subscription request to a peer network device that generates a data element, via the established network connection.

One embodiment of the present invention provides a local controller that maintains a local database which stores information associated with a set of interfacing devices of a local-area network. The local database can include a database mirror for a remote database, of a remote controller, that stores information for a set of provisioned interfacing devices. During operation, the local controller maintains the local database synchronized with at least a subset of the remote database. However, when the local controller determines that the remote controller has gone offline, if the remote controller has primary control of interfacing devices in the local area network, the local controller can obtain primary control of the interfacing devices within the local area network.

One embodiment provides an interfacing device that is configured to process one or more rules, based on sensor data, to perform a predetermined action. During operation, the device can receive a device configuration that includes a rule for the interfacing device. The rule can include an action description for performing an action, and can include a condition that takes sensor data as input and indicates criteria for performing the action. The device can store the rule in a rule repository, and determines a remote interfacing device that generates a piece of data associated with the rule's condition. The device can also subscribe to the piece of data from the remote interfacing device.

One embodiment provides a sensor-monitoring interfacing device, coupled to one or more physical devices that include sensors for measuring physical attributes. During operation, the interfacing device obtains and processes sensor data from the physical devices. When the interfacing device determines that a rule's condition is satisfied based on the sensor data, the interfacing device can process the rule's action description to perform a corresponding action.

One embodiment provides a load-controlling interfacing device that obtains and processes sensor data received from a user interface and/or from a remote interfacing device. During operation, the load-controlling interfacing device processes rules based on the sensor data to control an electrical load, such as a light fixture.

One embodiment provides a load-monitoring interfacing device that obtains and processes sensor data from an electrical load. The interfacing device can include at least one power outlet to provide power to a corresponding electrical load. During operation, the interfacing device can obtain sensor data from a local power outlet coupled to an electrical load, such that the sensor data can indicate an electrical measurement associated with the electrical load. The interfacing device can process a rule associated with the sensor data, such as to enable or disable a power outlet, or to perform any other pre-defined action.

DETAILED DESCRIPTION

The following description is presented such that one of ordinary skilled in the art can make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a controller that can use various sensors and devices from various vendors to implement a unified "intelligent" environment, such as a "smart" home system or industrial environment. More specifically, these various physical devices are coupled to one or more interfacing devices that continuously monitor and control the physical devices, such that these interfacing devices can be accessed and configured via the controller. For example, the centralized controller can reside in a server cluster (e.g., the "cloud"), and allows a user to access a control UI via a Web browser or an application on the user's computer. Also, the interfacing device and physical devices can be distributed over a wide area (e.g., throughout a city, or at various cities across the globe). The user can interact with the centralized controller to configure how the interfacing devices are to monitor data from the physical devices in near real-time, and to control how the interfacing devices are to control one or more physical devices based on the monitored data.

Each interfacing device includes a plurality of device couplers and one or more network interfaces, which enables the coupling between the interfacing device and the centralized controller via a public or private network. In one embodiment, the interfacing device is coupled to the controller via an IP (Internet Protocol)-based network. Communication between the interfacing devices and the centralized controller is realized by exchanging IP packets. The centralized controller can provide a graphic user interface (GUI), which a user can use while the user is away at a remote location, to monitor and control how the devices are to operate. Moreover, the GUI enables the user to set up compound rules that govern the operations of the devices automatically.

The System Architecture

Figure 1A:
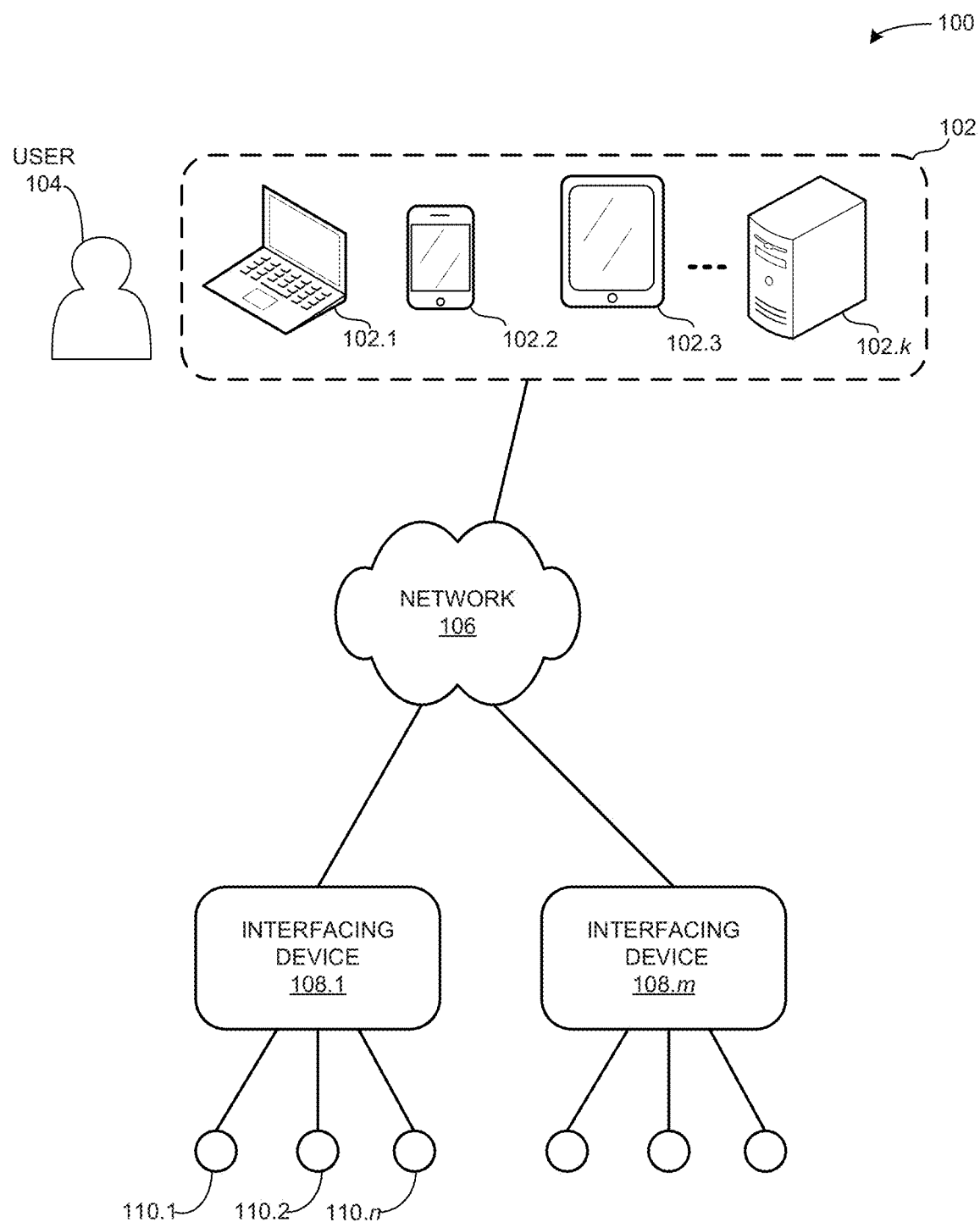
FIG. 1A illustrates an exemplary system architecture of a monitor-and-control system in accordance with an embodiment of the present invention.

FIG. 1A illustrates an exemplary system architecture of a monitor-and-control system 100 in accordance with an embodiment of the present invention. Monitor-and-control system 100 includes a controller 102, a network 106, a number of interfacing devices 108 (e.g., interfacing devices 108.1 and 108.m), each coupled to a number of physical devices 110 under control. For example, interfacing device 108.1 is coupled to physical devices 110.1, 110.2, and 110.n.

Controller 102 can include any computing device that communicates with interfacing devices 108, and which executes a software application used by a user 104 to monitor and control the operations of the physical devices coupled to interfacing devices 108. For example, controller 102 can reside and run on a stand-alone computing device, including, but not limited to a desktop or laptop computer 102.1, a personal digital assistant (PDA) or smartphone 102.2, a tablet computer 102.3, and a mainframe computer 102.*k*. In some embodiments, controller 102 resides and runs on a server cloud. Further, in some embodiments (not shown), controller 102 resides and runs on one or more interfacing devices (e.g., interfacing device 108.1 and/or 108.*m*) to implement a distributed controller.

Network 106 can generally include any type of wired or wireless communication channel capable of coupling together computing nodes. Network 106 includes, but is not limited to a local area network, a wide area network, a private network, a public network, or a combination of networks. In addition, network 106 can include a wired network, a wireless network, or a combination thereof. In some embodiments, network 106 includes an IP-based network. In a further embodiment, network 106 includes the Internet.

Each interfacing device 108, such as interfacing device 108.1 or 108.*m*, includes a number of physical ports that enable coupling between the interfacing device and a number of physical devices. Further, physical devices 110 (e.g., devices 110.1-110.*n*) can include any type of physical device, such as a sensor, a machine, or any type of electrically operated component now known or later developed. The devices can include a sensor (e.g., a temperature sensor, a humidity sensor, a current sensor, a motion sensor, and a door/window sensor), or a controllable device (e.g., a light switch, a power outlet, a power strip, a relay, etc.).

In some embodiments, physical devices 110 can be "dumb" devices that do not possess any intelligence, such as computational or networking capabilities. In a further embodiment, physical devices 110 can include any type of off-the-shelf sensors that detect environment factors, including but not limited to a temperature, a sound, a light level, a humility measurement, a motion, an electric current, an opening or closing of a door/window, etc. The output of a sensor can include an analog or a digital signal. For example, the output of a temperature sensor may be an analog voltage signal within a certain range, and the output of a motion sensor may be a binary digital signal with "1" indicating that a motion has been detected.

In some embodiments, interfacing devices 108 can include a serial port (such as an RS232 or RS485 port), and a device 110 can be a serial-based device that communicates with an interfacing device 108 via a serial port. For example, device 110.1 can include an appliance that can be controlled via a serial port, and interfacing device 108.1 can be coupled to the appliance via a serial port. Thus, interfacing device 108.1 can receive state information from the appliance via the serial port, and can communicate commands via the serial port to control the appliance. As another example, device 110.*n* can include a router, and interfacing device 108.1 can be coupled to a console port of the router, thus enabling remote monitoring and controlling of the router.

Figure 1B:
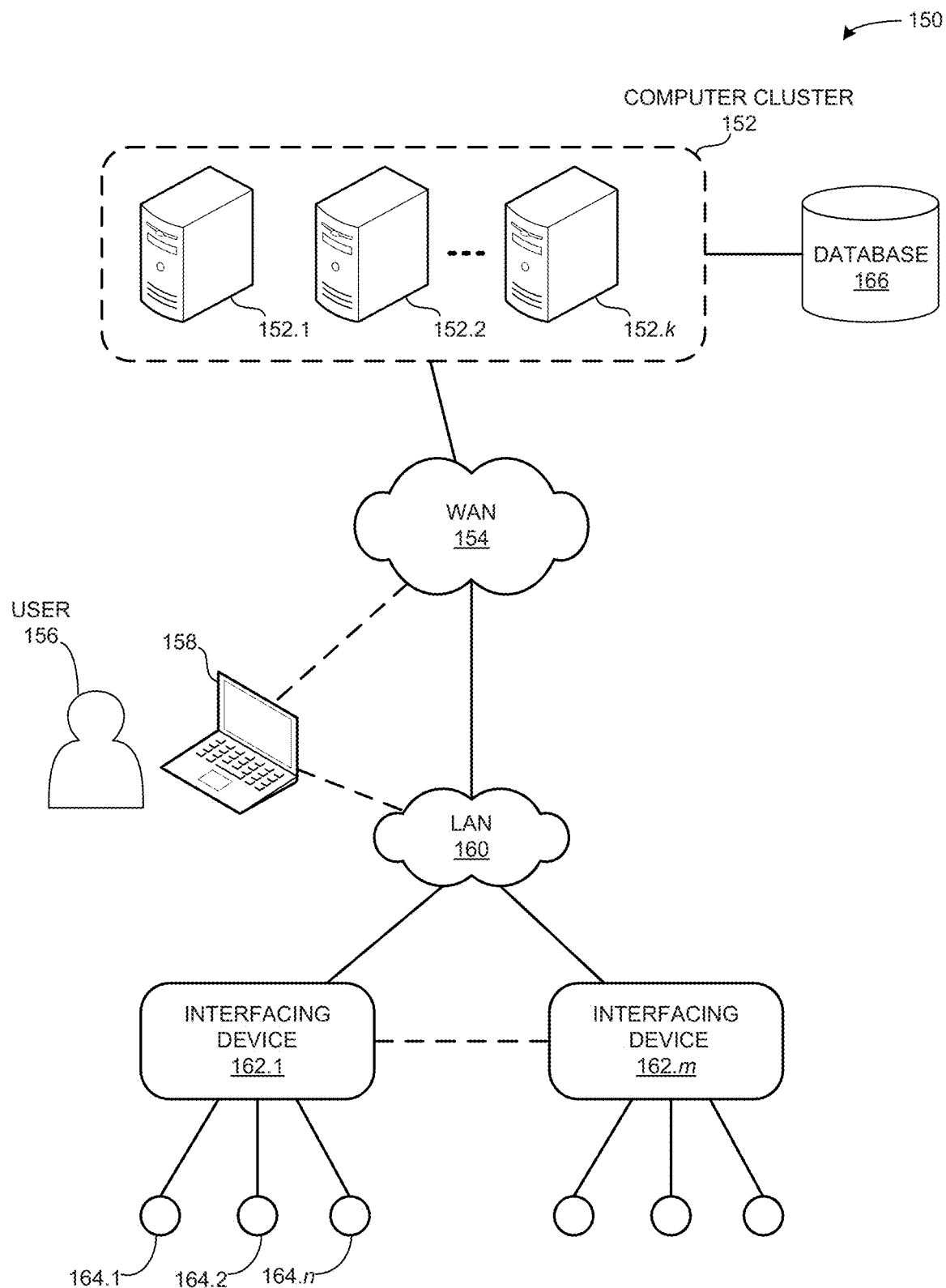
FIG. 1B illustrates an exemplary system architecture of a monitor-and-control system that includes a controller deployed on a computer cluster accessible via a wide-area network in accordance with an embodiment of the present invention.

FIG. 1B illustrates an exemplary system architecture of a monitor-and-control system 150 that includes a controller deployed on a computer cluster 152 accessible via a wide-area network 154 in accordance with an embodiment of the present invention. In some embodiments, computer cluster 152 can include a plurality of server computers 152.1-152.*k*, which use load-balancing to distribute loads across computer cluster 152.

Over time, a system administrator can add additional servers to computer cluster 152 as the load across computer cluster 152 increases. Specifically, server computers 152.1-152.*k* can be distributed across various geographic locations, such that the number of servers for a specific geographic location can be adjusted based on the demands of that geographic location. This allows computer cluster 152 to provide serve requests from and push data to a plurality of devices in near real-time.

During operation, computer cluster 152 can maintain a persistent or continuous network connection to a plurality of client devices (e.g., a computing device 158, and/or interfacing devices 162). The network connection can include a bidirectional channel established using the WebSocket protocol, or a network connection that is maintained using the STUN protocol, the Comet protocol, or any other communication protocol now known or later developed. Computer cluster 152 can receive real-time data from these client devices, and can forward a piece of real-time data to a client device that has subscribed to the piece of data. For example, in some embodiments, computer cluster 152 can include a database 166 associated with the controller, such that database 166 can maintain a list of "tailable cursors." These tailable cursors implement a queue for forwarding data to the client devices that have subscribed to a piece of data. The client devices can bind on, and wait on, these tailable cursors.

In some embodiments, device 158 can include a client computing device, such as a computer (e.g., a laptop), a mobile device (e.g., a smartphone or tablet), etc. Device 158 can communicate with computer cluster 152 and/or interfacing devices 162 by establishing and maintaining a network connection to the desired target device. For example, a user 156 can use an application running on device 158 (e.g., a laptop or a smartphone) to establish a session with a controller running on computer cluster 152, and receives network-addressing information for one or more interfacing devices 162 from the controller. Device 158 can then use an interfacing-device's network-addressing information to send data to the interfacing device, and/or to establish a network connection with the interfacing device.

In some embodiments, device 158 and/or interfacing device 162 can determine when they can communicate with each other peer-to-peer, and when they need to communicate with each other via a forwarding service (e.g., via computer cluster 152). For example, device 158 can remember a configuration snapshot for the distributed interfacing-device network by storing the device-accessing information for interfacing devices 158 and/or any other computing devices. This device-accessing information can include network-addressing information such as an IP address and port number for the remote device, and/or can include authentication information for accessing the remote device (e.g., a digital certificate, a username, a password, an authorization token, etc.). Thus, if interfacing devices 162 within LAN 160 lose their connection to the controller (e.g., LAN 160 becomes decoupled from WAN 154), the application on device 158 can use the stored configuration snapshot to communicate directly with interfacing devices 162 via LAN 160. This allows a software application that monitor the interfacing-device network to communicate directly with the interfacing devices 162, without first contacting a controller on computer cluster 152.

In some embodiments, device 158 can test a connection to an interfacing device by sending a request to the interfacing device using the known network-addressing information (e.g., via a JSONP message). The request can indicate device-identifying information for the desired interfacing device (e.g., a logical identifier, a MAC address, etc.), which allows device 158 to test the connection without requesting sensitive information from the remote device. If the request reaches an interfacing device, the interfacing device compares this device-identifying information with its local device-identifying information, and acknowledges its identity if it is indeed the target interfacing device. In some embodiments, the interfacing device acknowledges its identity to device 158 by providing authentication information, such as a digital certificate.

If the network-addressing information includes an IP address for the interfacing device, device 158 can use this IP address to communicate with the interfacing device while coupled to the same local-area network as the interfacing device (e.g., LAN 160). However, if device 158 is not coupled to the same LAN as the interfacing device and cannot establish a peer-to-peer connection across domains (e.g., due to a firewall), device 158 can communicate with the interfacing device using a data-forwarding service (e.g., computer cluster 152, or another server computer coupled to WAN 154).

Additionally, in some embodiments, device 158 can auto-discover the presence of other devices (e.g., using universal plug-and-play (UPnP), or other auto-discovery protocols). For example, if an interfacing-device's network information has changed, and device 158 cannot establish a network connection to the central controller, device 158 can auto-discover the presence of other devices to obtain device-identifying information (e.g., a MAC address, a digital certificate, etc.). Device 158 can compare received device-identifying information of the discovered devices to that of a set of desired interfacing devices. If an auto-discovered device matches a desired interfacing device, device 158 can obtain and store network-addressing information for the discovered device (e.g., to replace old or invalid information), and can use this network-addressing information establish a network connection to the discovered device.

User 156 can interact with the central controller using an Internet web browser on device 158 (e.g., to access the controller hosted by computer cluster 152), which allows the user to browse real-time data from various interfacing devices 162. The controller can generate a web page for the user that includes the network-addressing information for the various interfacing devices. If device 158 is within the same domain as an interfacing device (e.g., a local-area network, or a virtual private network), the web browser on device 158 can obtain the real-time data directly from the interfacing device. For example, the web browser can use JSONP (JavaScript object notation, with padding) or CORS (cross-origin resource sharing) to request data from the interfacing device that may reside on a different domain as the controller that hosts the web page.

In some embodiments, the devices within system architecture 150 can communicate with each other in near real-time by establishing and maintaining a persistent or continuous network connection. For example, interfacing devices 162 can subscribe to data from each other, and can push real-time data to the subscribing devices using the network connection. As another example, device 158 can establish a network connection to a plurality of interfacing devices 162, and receives real-time data to present to the user.

Further, a local device within LAN 160 can establish and maintain a persistent network connection with computer cluster 152 by determining its external address and sharing this address with computer cluster 152 (e.g., using STUN, or by maintaining a port tunnel through a firewall within LAN 160 (e.g., using Comet). Alternatively, the local device can also establish a persistent bidirectional network connection, such as using the Web Socket protocol or any other bidirectional communication protocol.

To maintain the network connection using Comet, the local device can send long-polling requests to computer cluster 152 (e.g., as an XMLHttpRequest (XHR) message), which opens a temporary port within the firewall through which computer cluster 152 can use to provide a response message. If computer cluster 152 has new data to provide to the local device, computer cluster 152 can respond to the XHR message using an XHR response that includes the new data. Otherwise, if computer cluster 152 does not have new data for the local device, computer cluster 152 does not respond to the XHR request, thus allowing the XHR request to expire.

Once an XHR request expires, a network router or firewall may close a port associated with the XHR request, which prevents computer cluster 152 from providing new data to the local device. Thus, to maintain a network connection with computer cluster 152, the local device can periodically send additional long-polling requests before the existing request times-out (e.g., at 30 second intervals). Computer cluster 152 can associate the recent XHR request with the local device (e.g., replacing the previous XHR request), and uses network-addressing information from the recent XHR request to push real-time data to the local device.

To establish a network connection using the WebSocket protocol, the local device can send to computer cluster 152 a WebSocket handshake request, which upgrades an HTTP session to a WebSocket session and includes a Sec-Web-Socket-Key token for the controller on computer cluster 152. The controller responds by sending to the local device a response that acknowledges the WebSocket session, and includes a Sec-WebSocket-Accept token that is derived from the Sec-WebSocket-Key token.

The Device Architecture

Figure 2A:
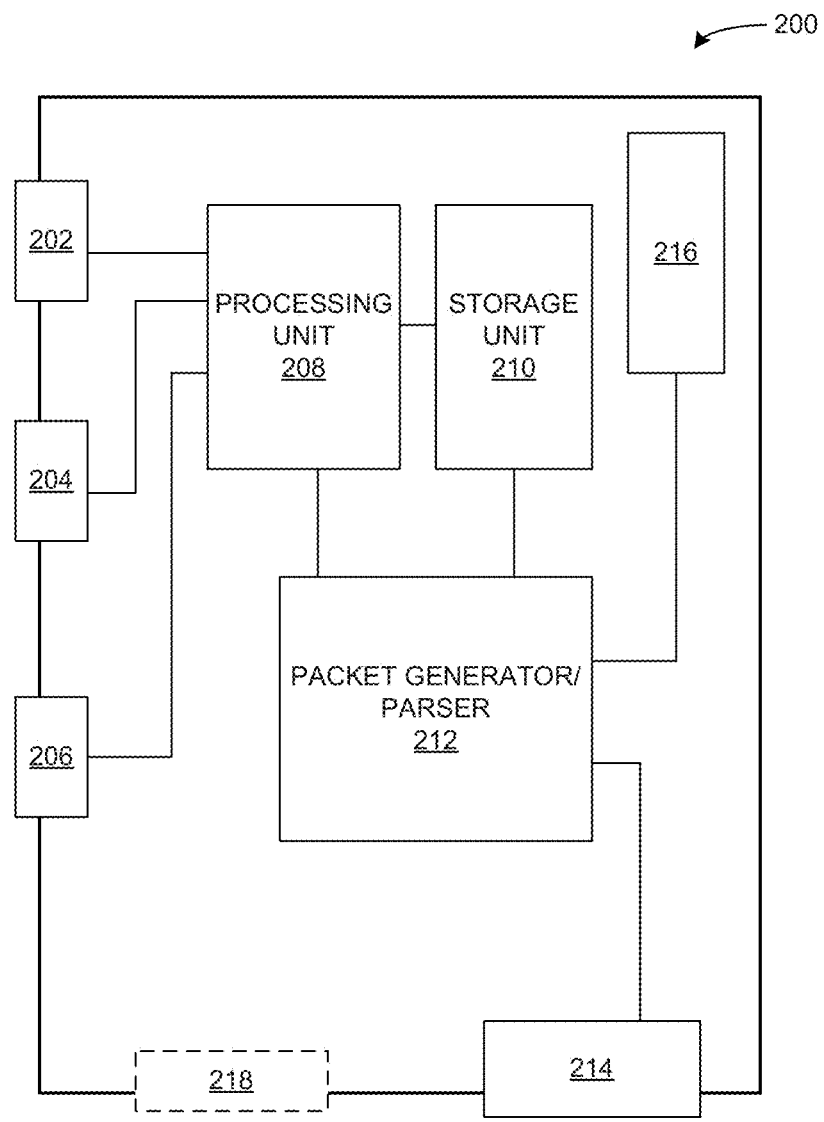
FIG. 2A presents a diagram illustrating an exemplary device architecture of an interfacing device in accordance with an embodiment of the present invention.

FIG. 2A presents a diagram illustrating an exemplary device architecture of an interfacing device 200 in accordance with an embodiment of the present invention. Interfacing device 200 includes a number of physical ports, such as ports 202, 204, and 206, for providing physical connectivity to a number of physical devices; a processing unit 208, a storage unit 210, a packet generator/parser 212 for generating or parsing communication packets, a wired network interface 214, and a wireless network interface 216. Interfacing device 200 may optionally include a universal serial bus (USB) port 218.

Physical ports 202-206 provide coupling between interfacing device 200 and a number of physical devices. More particularly, physical ports 206-208 can provide power to, receive input signals from, and send output signals to the coupled physical devices. In some embodiments, these functions are realized by wired connections between a physical port and a physical device. For example, a typical temperature sensor may include three pins, one for ground, one for power input, and one for analog voltage output. When the temperature sensor is coupled to a physical port, each of the three pins are wired to corresponding connecting point inside the physical port, thus enabling interfacing device 200 to provide power to and receive output voltages from the temperature sensor via those wired connections. In some embodiments, the physical ports include at least an RJ45 port (which is an RJ45 female jack) that provides eight equally spaced conducting channels. An RJ45 cable plugged into the jack provides wired connections to a device, which may or may not include an RJ45 jack. In some embodiments, the physical ports include a terminal-block port, which includes eight equally spaced metal posts each can be wired to a device terminal. Note that this simple terminal-block port enables coupling between interfacing device 200 and almost any type of device as long as the device has equal or less than eight connections.

Processing unit 208 is responsible for sampling, analyzing, and interpreting raw input signals (either analog or digital) received from the physical devices. For example, if a coupled physical device is a temperature sensor, raw input signals received by the corresponding physical port will be analog voltages within a certain range (such as from 0 to 2 Volts), and processing unit 208 can convert the analog voltages to corresponding temperatures using calibration information associated with the temperature sensor. In some embodiments, calibration information associated with a sensor can be provided by the user. In some embodiments, the monitor-and-control system maintains a record of many off-the-shelf sensors, and can perform a lookup for the calibration information based on the make and model of a sensor. In addition, processing unit 208 is also responsible for executing control commands received from the controller. For example, if the controller sends a command for turning off a temperature sensor, processing unit 208 will stop providing power to corresponding terminals.

Storage unit 210 is responsible for storing various types of information, such as historical data, associated with the coupled devices. Packet generator/parser 212 generates communication packets using information obtained from processing unit 208 and storage unit 210, and parses communicate packets received from the controller. In some embodiments, packet generator/parser 212 is capable of generating and parsing IP packets.

Wired network interface 214 and wireless network interface 216 provide coupling between interfacing device 200 and a network, thus coupling between interfacing device 200 and the controller. In some embodiments, wired network interface 214 and wireless network interface 216 allow interfacing device 200 to be coupled to the Internet. In some embodiments, wired network interface 214 includes an Ethernet port. In a further embodiment, the Ethernet port also provides power to interfacing device 200 via Power over Ethernet (PoE). In addition to providing a communication interface to the controller, wired network interface 214 and wireless network interface 216 also enable interfacing device 200 to communicate with other peer interfacing devices.

In some embodiments, if interfacing device 200 has not been configured, interfacing device 200 can configure wireless network interface 216 to function as an access point. The user can use a personal computing device to gain access to the access point by connecting to a wireless LAN associated with interfacing device 200 (e.g., the user can determine an SSID and passcode for the wireless LAN, for example, from printed text on the chassis of interfacing device 200). Once the user's computing device is connected to the access point, interfacing device 200 can provide a configuration GUI to the user, for example, via an HTTP (hypertext transfer protocol) session.

When the user launches a web browser on his personal computer, interfacing device 200 can redirect the user's web browser to the configuration GUI that allows the user to configure the access point as desired. For example, the user can configure a connection to the user's personal access point (e.g., a wireless router connected to the Internet), and can enter his personal login information for a service that allows the user to control interfacing device 200 via the Internet.

Once the user has finished configuring interfacing device 200, interfacing device 200 proceeds to save the configuration and reboots itself. While interfacing device 200 is rebooting, if interfacing device 200 determines that it has been configured properly, interfacing device 200 can configure wireless network interface 216 to function as a wireless client device, and connects to the user's personal wireless access point.

In some embodiments, an interfacing device can also be a specially designed, web-enabled power strip that can monitor the energy usage (such as current and/or voltage) of a device coupled to the power strip. This power strip device can control a coupled device, for example, by turning on or off a corresponding power socket locally or remotely.

Figure 2B:
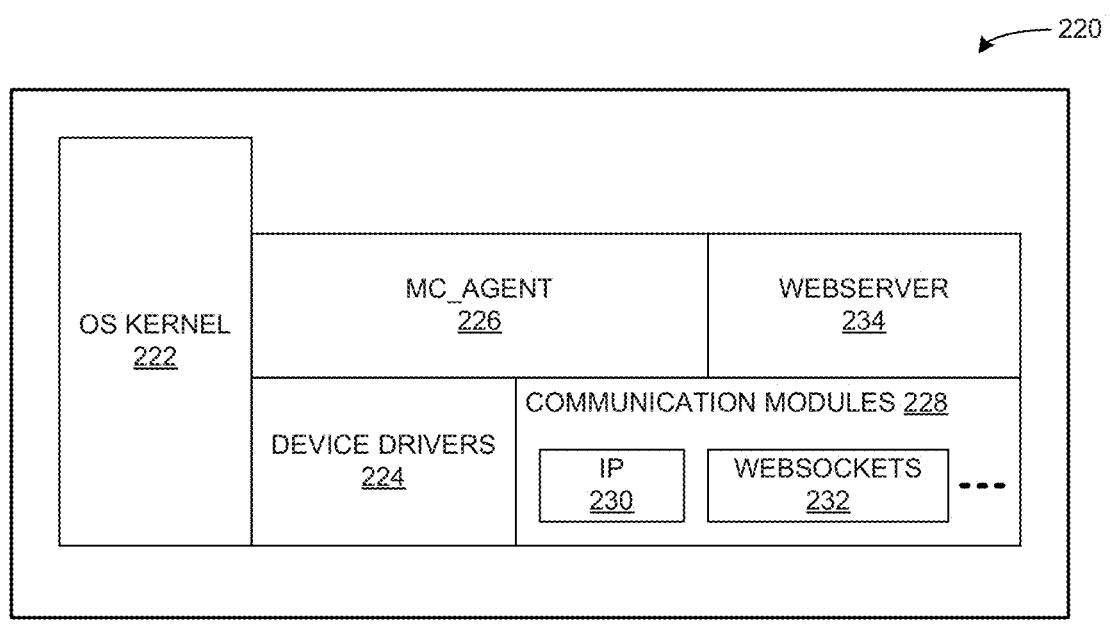
FIG. 2B presents a diagram illustrating an exemplary software architecture of an interfacing device in accordance with an embodiment of the present invention.

FIG. 2B presents a diagram illustrating an exemplary software architecture 220 of an interfacing device in accordance with an embodiment of the present invention. Software architecture 220 can include an operating system kernel 222, device drivers 224, communication modules 228, a webserver 234, and a micro-controller agent module (mcAgent 226). Specifically, interfacing device 200 can store software architecture 220 within storage unit 210 and can execute one or more modules of software architecture 220 using processing unit 208.

Communication modules 228 can include an internet-protocol (IP) module 230 for establishing and maintaining a network connection with a remote device based on an IP-level protocol, such as using the STUN protocol, the Comet protocol, etc. In some embodiments, communication modules 228 can include can include a WebSocket module 232 for establishing and maintaining a network connection with a remote device based on the WebSocket protocol. WebSocket module 232 can include a user-space application or service that utilizes other kernel-space services (e.g., device drivers 224) and/or other user-space services to establish and maintain the network connection.

OS kernel 222 can include any operating system, such as a variant of the Linux operating system. Microcontroller agent (mcAgent) 226 can include a user-space application that runs on OS kernel 222 to realize the functionality of interfacing device 200 as described herein. For example, mcAgent can interact with device drivers 224 to detecting a user-driven event (e.g., from a user-input device, such as a light switch), for periodically monitoring a sensor input (e.g., a motion sensor), and/or for controlling an output device (e.g., a power supply). Also, mcAgent can interact with communication modules 228 to establish a network connection to a remote controller and/or to one or more remote interfacing devices, and/or for sending or receiving data to/from the controller or a remote interfacing device via the corresponding network connection.

Device drivers 224 can include one or more kernel-space driver modules accessible via a virtual file interface (e.g., a virtual file under the "/proc" directory of the Linux file system). Communication modules 228 and/or mcAgent 226 can interact with device drivers 224 by reading from and/or writing to a virtual file that corresponds to a target device.

Device drivers 224 can include, for example, a network-device driver for accessing and controlling a network interface, such as an Ethernet controller, a Wi-Fi controller, or a Bluetooth controller. OS kernel 222 may access the network-device driver to communicate with a remote computing device. Also, communication modules 228 may access the network-device driver to establish and maintain a network connection with a controller and/or to a peer interfacing device.

As another example, device drivers 224 can include driver modules for monitoring or controlling a peripheral device via a general-purpose input-output (GPIO) port of the processing unit, via a serial interface of the processing unit, or via a universal asynchronous receiver/transmitter (UART) port of the processing unit. The serial interface, for example, can include a serial peripheral interface (SPI) bus, an inter-integrated circuit ($I^2C$) bus, or any serial interface now known or later developed.

In some embodiments, the peripheral device can include a volatile storage device (e.g., a random-access memory (RAM) module), or a non-volatile storage device (e.g., a flash memory device). In some other embodiments, the peripheral device can include a shift register, an analog-to-digital converter (ADC), a digital-to-analog converter (DAC), a power-output regulator, a relay, a triode for alternating current (TRIAC)-based device, etc. Further, the peripheral device can also include a user-input device, such as a touch-sensitive user interface.

MicroController Agent

In some embodiments, microcontroller agent (mcAgent) 226 manages the performed by an interfacing device, such as to manage data subscriptions from a plurality of remote devices, and to process rules that are triggered when new events are detected. During operation, mcAgent 226 can receive a data-subscription request from a remote device (e.g., a controller or an interfacing device), at which point mcAgent 226 can insert the data-subscription request into a repository of data subscriptions. The data-subscription request can indicate a type of data being subscribed to, and a condition (e.g., a minimum or maximum threshold value) that needs to be satisfied for mcAgent 226 to push the data to the remote device.

Also, mcAgent 226 can periodically sample data from various input sensors, and can push data to a remote device that has subscribed to a certain type of data updates. mcAgent 226 can sample data from an input sensor or device periodically at a predetermined interval (e.g., every 15 milliseconds). Each time mcAgent 226 obtains a data sample, mcAgent 226 can compare the sampled value (or a change in value from the last sampled value) to one or more threshold values associated with a set of data subscriptions. If the sampled data value (or the change in value) satisfies a subscription request, mcAgent determines a remote device associated with the data subscription, and pushes the sampled data value to the remote device. In some embodiments, the system can push the sampled data value to the remote device, for example, using network-addressing information associated with a persistent network connection to the remote device (e.g., using WebSocket module 232).

In some embodiments, the remote device an interfacing device that uses the sampled data to determine whether to perform a rule's action.

In some other embodiments, the remote device can include a controller that gathers and/or presents data to a user. For example, a user can configure the controller to store an event log for events that satisfy certain conditions at interfacing device 200. The controller can establish and maintain a network connection with interfacing device 200, and populates the event log by subscribing to sampled data from interfacing device 200, under the conditions specified by the user.

As another example, the user can use a personal computing device to monitor data from various interfacing devices via the controller. The user accesses a "map" user interface (UI) from the controller, such that the map UI illustrates sensors associated with interfacing device 200 on a map, and can also illustrate the sampled real-time data on the map. Thus, to display the real-time data to the user, the controller can establish and maintain a persistent network connection to interfacing device 200, and subscribes to data sampled by interfacing device 200. The subscription can indicate that the sampled data is to be pushed to the controller periodically at a predetermined time interval (e.g., every second), or when the sampled data changes in value by at least a threshold amount. This way, while the user is browsing the map UI, the controller can receive and display the sensor data to the user in near real-time. When the user navigates away from the sensor on the map UI, or when the user closes the map UI, the controller can send a request to interfacing device 200 to cancel the data subscription. The controller can also terminate the network connection to interfacing device 200 if controller does not need to send or receive data to/from interfacing device 200.

Exemplary Interfacing Devices

Figure 2C:
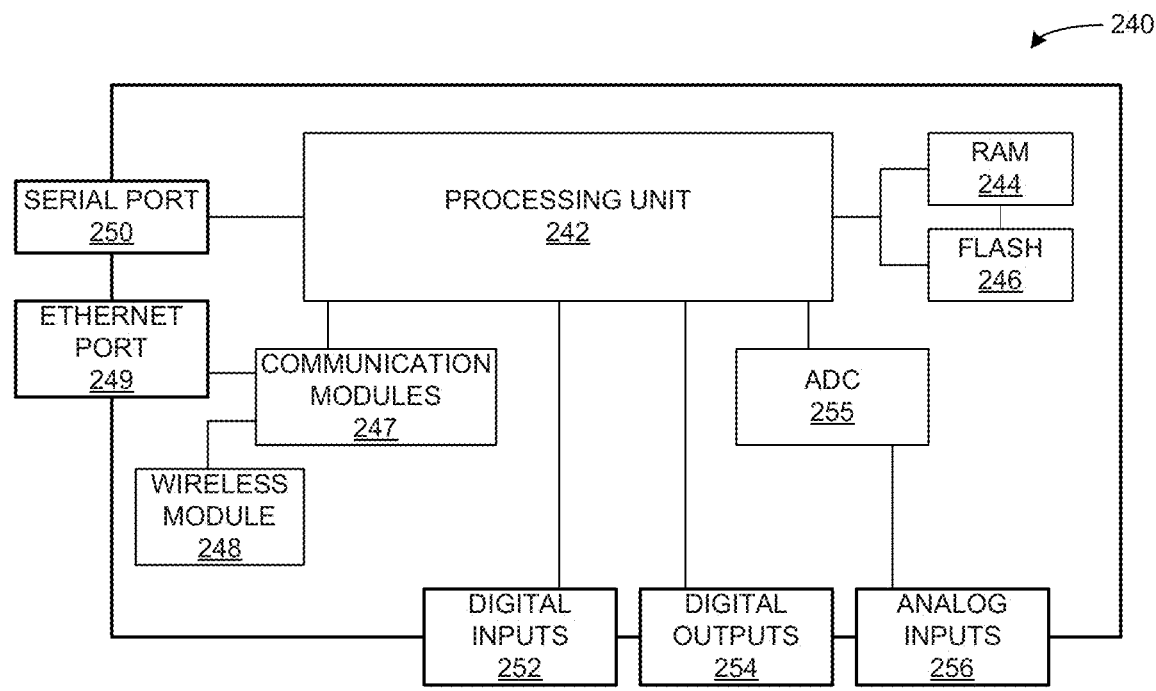
FIG. 2C presents a diagram illustrating an exemplary device architecture of an mPort interfacing device in accordance with an embodiment of the present invention.

FIG. 2C presents a diagram illustrating an exemplary device architecture 240 of an mPort interfacing device in accordance with an embodiment of the present invention. Device architecture 240 can include a flash storage device 246 that stores data and software instructions for operating the mPort interfacing device, as well as a processing unit 242 and a memory device 244 for executing the instructions.

Device architecture 240 can include digital inputs 252, and digital outputs 254. Digital inputs 252 can be coupled to digital output signals of one or more external devices, such as a door sensor, a toggle switch, etc. Digital outputs 254 can be coupled to an external device to configure or control the external device, or can be coupled to an output display of the mPort device (e.g., a liquid-crystal display (LCD), or light-emitting diode (LED) indicators).

Device architecture 240 can also include at least one analog-to-digital converter (ADC) 255, which converts an analog signal's physical quantity into a digital signal (e.g., a binary number) that represents the physical quantity's amplitude. In some embodiments, ADC can be coupled to an external device via analog inputs 256, such as a sensor, to sample a physical quantity associated with the sensor. Analog inputs 256 can include a differential pair from which ADC 255 samples a corresponding analog signal. Processing unit 242 can read data from ADC 255 via digital interface pins or via a serial bus, and stores or operates on the data that represents a physical quantity associated with the attached sensor.

For example, in some embodiments, analog inputs 256 can be coupled to a differential pair from a temperature sensor (not shown). The temperature sensor can provide a continuous analog signal over the differential pair, such that the analog signal represents a physical temperature quantity detected by a sensing portion of the temperature sensor. Further, processing unit 242 can interface with the sensor via digital outputs 254, for example, to calibrate the sensor, or to configure the sensor's operation (e.g., to configure a sensing period).

Device architecture 240 can include one or more modules for communicating with external devices. For example, device architecture 240 can include communication modules 247, which can include an Ethernet module coupled to an Ethernet port 249, and/or can include or be coupled to a wireless module 248 (e.g., a Wi-Fi module, or a Bluetooth module). Device architecture 240 can also include a serial port 250 (e.g., an RS-232 jack for a UART port), which can be coupled to an external peripheral device, and can be used by processing unit 242 to monitor and/or control the peripheral device. The peripheral device can include an appliance (e.g., an HVAC system), or any electronic or computing device that can communicate via UART port 250.

Figure 2D:
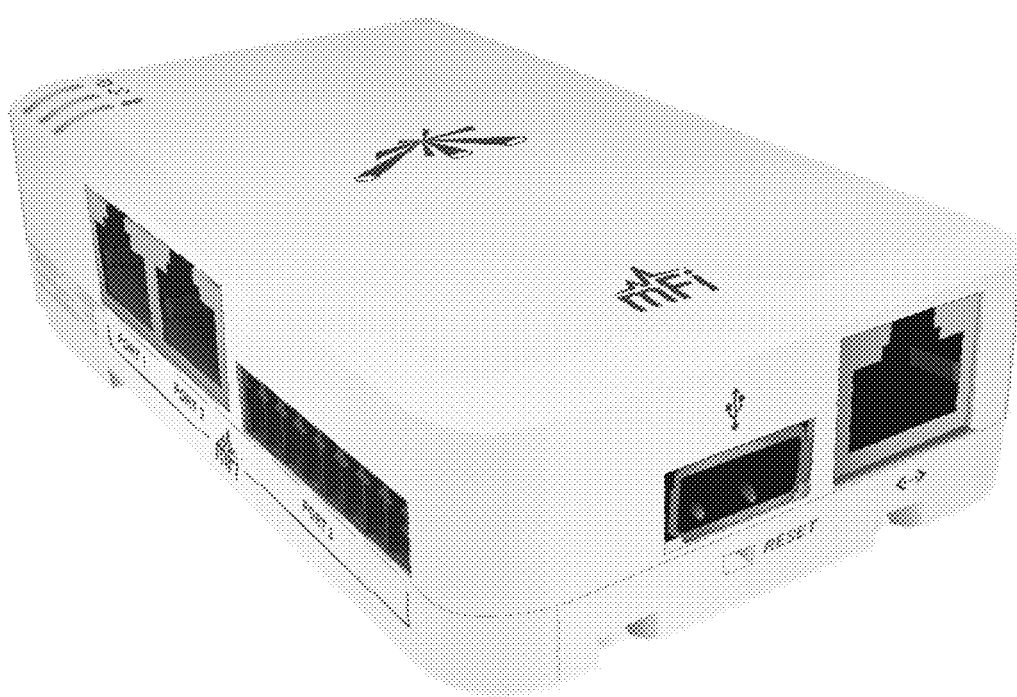
FIG. 2D illustrates an mPort interfacing device in accordance with an embodiment of the present invention.

FIG. 2D illustrates an mPort interfacing device 258 in accordance with an embodiment of the present invention. Specifically, the chassis for device 258 includes access to at least a reset switch, an Ethernet port, a universal serial bus (USB) port, an Ethernet port, a serial port, and a set of connections to one or more external physical devices (e.g., via an RJ-45 port, or via connection terminals). Device 258 can also include wireless networking devices, such as an internal Wi-Fi module.

Also, mPort interfacing device 258 can include a set of LED indicators. A power LED indicator becomes steady green when mPort interfacing device 258 is properly connected to a power source. An Ethernet LED indicator lights steady green when an active Ethernet connection is made, and flashes when the Ethernet connection has activity. A status LED lights yellow when mPort interfacing device 258 is first powered on in factory default mode out of the box, and lights steady green when device 258 has been successfully integrated into a network and is working properly. Also, the status LED flashes when the Locate button is used in the mFi Controller software to display device 258 on a map.

Figure 14A:
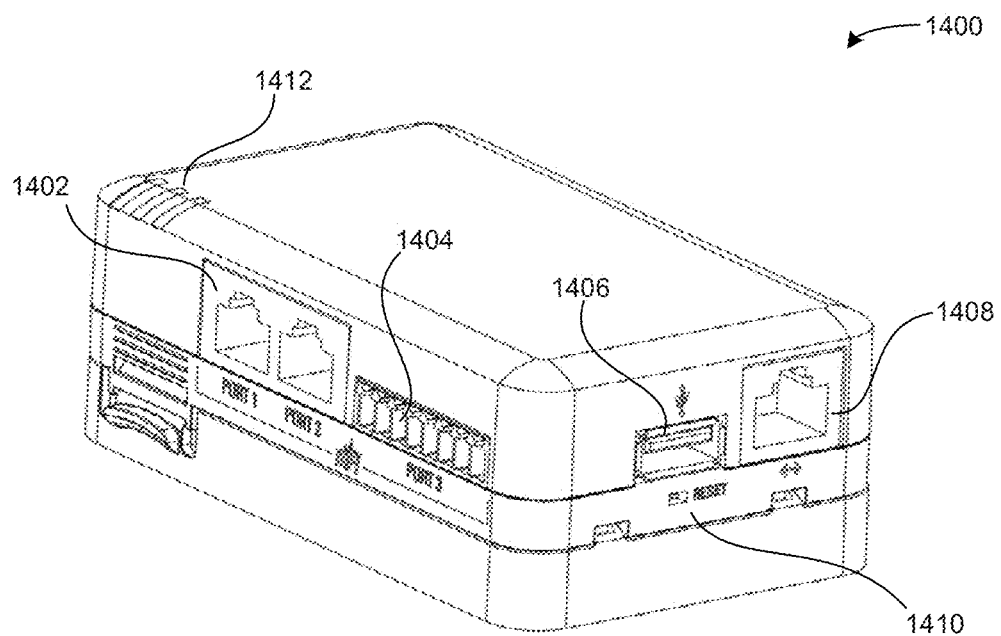
FIG. 14A illustrates an angled view of an mPort interfacing device in accordance with an embodiment of the present invention.

FIG. 14A illustrates an angled view of an mPort interfacing device 1400 in accordance with an embodiment of the present invention. Specifically, the device 1400 includes a set of connections to one or more external physical devices (e.g., via an RJ-45 port 1402, or via connection terminals 1404), includes a reset button 1410, and includes LED indicators 1412. Device 1400 can also include a universal serial bus (USB) connector 1406 and an Ethernet port 1408, which facilitates connecting device 1400 to a computer network or to another device (e.g., a personal computer for configuring device 1400).

Figure 14B:
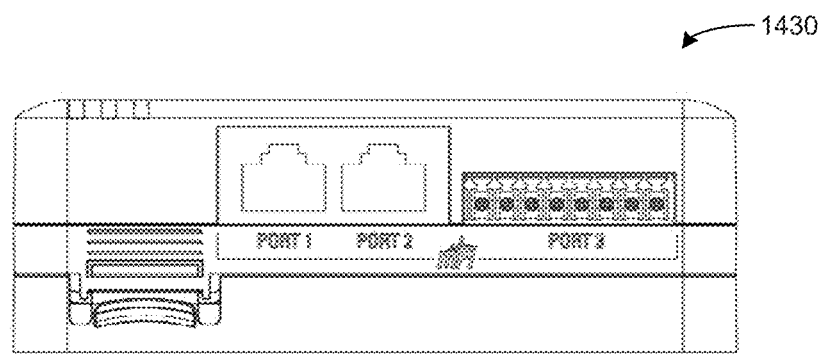
FIG. 14B illustrates a side view of an mPort interfacing device in accordance with an embodiment of the present invention.

FIG. 14B illustrates a side view of an mPort interfacing device 1430 in accordance with an embodiment of the present invention. Specifically, the side view of device 1430 illustrates a set of LED indicators, and illustrates two RJ-45 ports and a set of connection terminals, which can be coupled to one or more external physical devices.

Figure 14C:
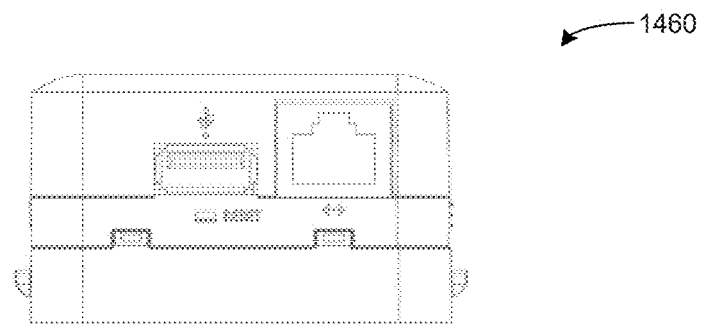
FIG. 14C illustrates a side view of an mPort interfacing device in accordance with an embodiment of the present invention.

FIG. 14C illustrates a side view of an mPort interfacing device 1460 in accordance with an embodiment of the present invention. Specifically, the side view of device 1430 illustrates a USB port, an Ethernet port, and a reset button.

Figure 15A:
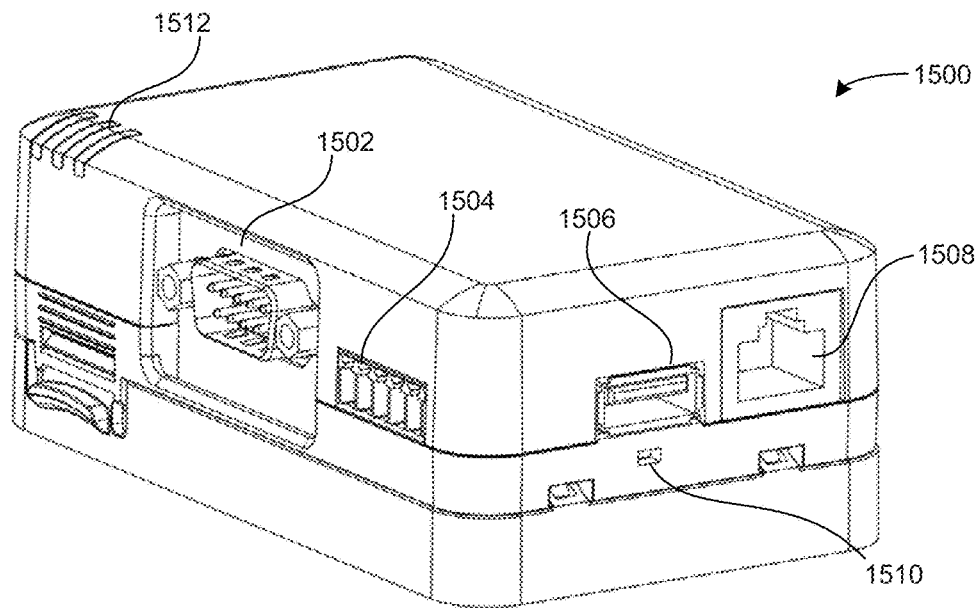
FIG. 15A illustrates an angled view of an mPort interfacing device in accordance with an embodiment of the present invention.

FIG. 15A illustrates an angled view of an mPort interfacing device 1500 in accordance with an embodiment of the present invention. Specifically, the device 1500 includes a serial connector 1502 (e.g., an RS-232 port, RS-422 port, and/or RS-485 port) that can be coupled to a peripheral device (e.g., an appliance), and includes connection terminals 1504 that can be coupled to a physical device (e.g., a sensor). Device 1500 also includes a reset button 1510, and LED indicators 1512. Device 1500 can also include a universal serial bus (USB) connector 1506 and an Ethernet port 1508, which facilitates connecting device 1500 to a computer network or to another device (e.g., a personal computer for configuring device 1500).

Figure 15B:
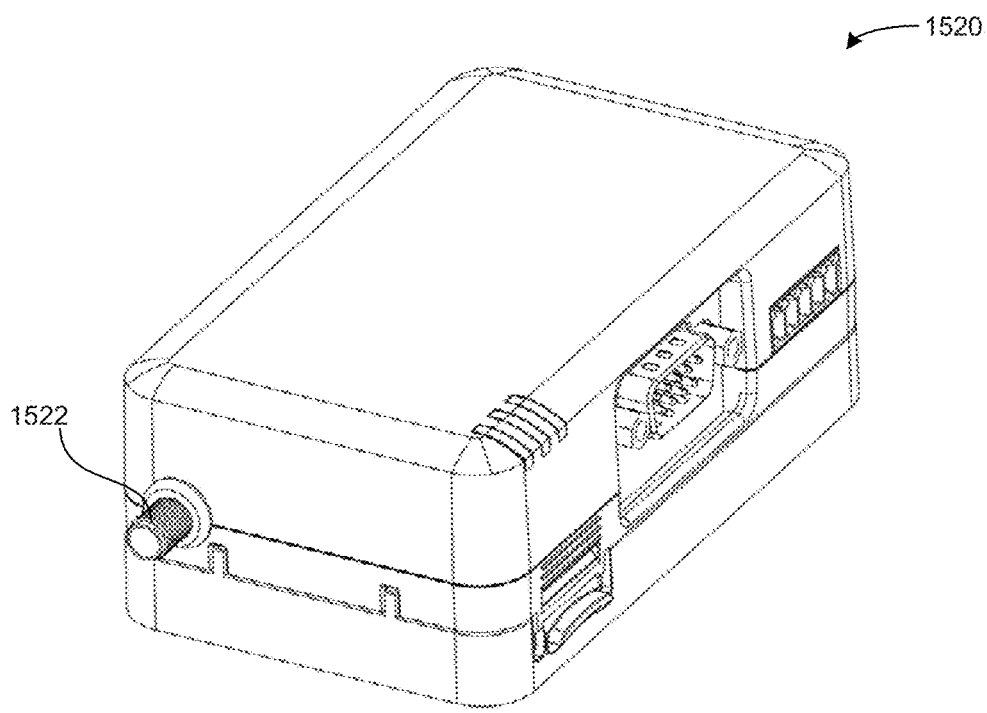
FIG. 15B illustrates an angled view of an mPort interfacing device that includes an antenna connector in accordance with an embodiment of the present invention.

FIG. 15B illustrates an angled view of an mPort interfacing device 1520 that includes an antenna connector 1522 in accordance with an embodiment of the present invention. Specifically, antenna connector 1522 can include a male coaxial connector, which can be coupled to an antenna for use by a wireless module, such as a Wi-Fi module (e.g., wireless module 248 of FIG. 2C).

Figure 15C:
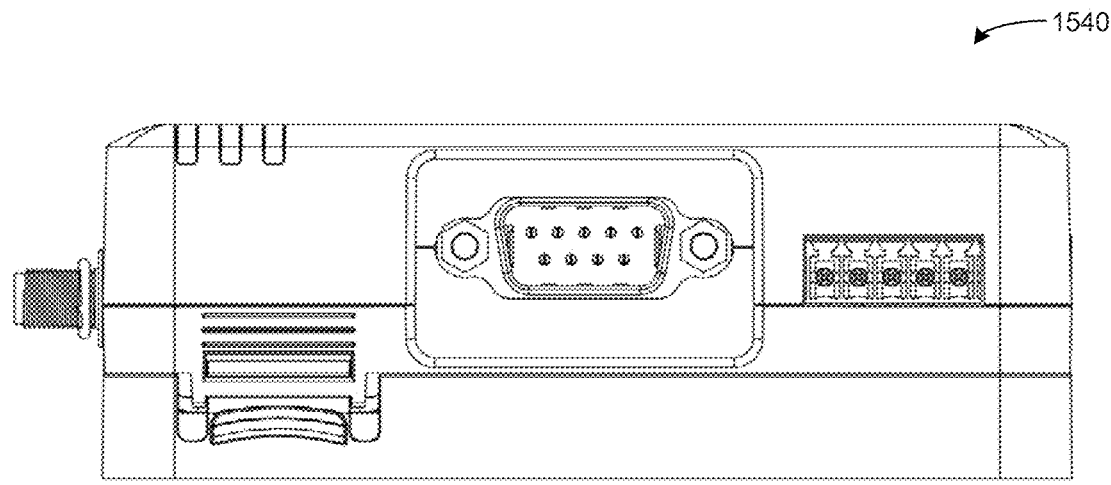
FIG. 15C illustrates a side view of an mPort interfacing device in accordance with an embodiment of the present invention.

FIG. 15C illustrates a side view of an mPort interfacing device 1540 in accordance with an embodiment of the present invention. Specifically, the side view of device 1540 illustrates a set of LED indicators, an antenna connector, as well as a serial connector and a set of connection terminals that can be coupled to one or more external physical devices.

Figure 15D:
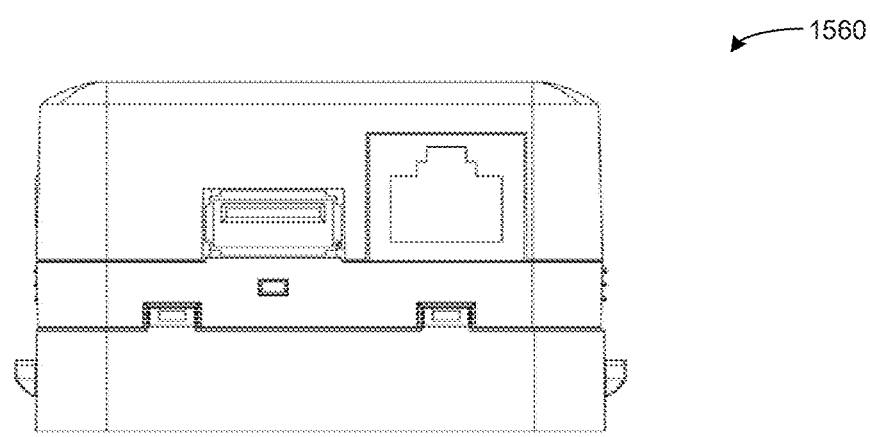
FIG. 15D illustrates a side view of an mPort interfacing device in accordance with an embodiment of the present invention.

FIG. 15D illustrates a side view of an mPort interfacing device 1560 in accordance with an embodiment of the present invention. Specifically, the side view of device 1560 illustrates a USB port, an Ethernet port, and a reset button.

Figure 2E:
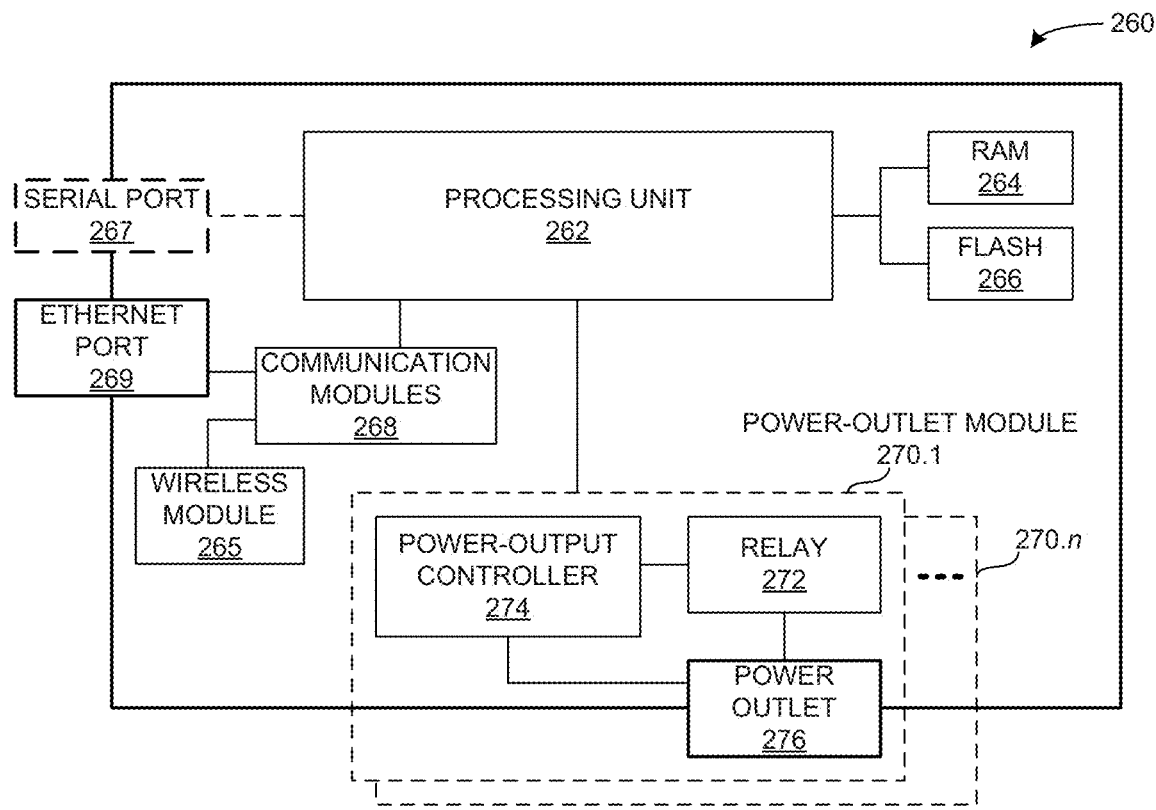
FIG. 2E presents a diagram illustrating an exemplary device architecture of an mPower interfacing device in accordance with an embodiment of the present invention.

FIG. 2E presents a diagram illustrating an exemplary device architecture 260 of an mPower interfacing device in accordance with an embodiment of the present invention. Device architecture 260 can include a flash storage device 266 that stores data and software instructions for operating the mPower interfacing device, as well as a processing unit 262 and a memory device 264 for executing the instructions.

Device architecture 260 can include one or more power-output modules 270, and each power-output module 270 can include a power-output controller 274 (e.g., a Prolific PL7221 integrated circuit (IC) device), a relay 272, and a power outlet 276. Processing unit 262 can enable or disable power transmitted via power outlet 276 by controlling the corresponding power-output controller 274 via digital interface pins or via a serial bus, at which point power-output controller 274 can generate an electrical signal for opening or closing relay 272 to enable or disable the power transmission to power outlet 276. Processing unit 262 can also configure power-output controller 274 to monitor an amount of power dissipated by power outlet 276, for example, to periodically obtain a power measurement for a corresponding electrical load.

Processing unit 262 can configure power-output controller 274 to sample physical quantities of the power signal on power outlet 276, and can obtain the sampled value via the digital interface pins or the serial bus. The sampled physical quantities can include an electric current, an electric voltage, a real power, a reactive power, an apparent power, and/or other physical quantities of a power signal.

In some embodiments, device architecture 260 can include a current-regulating device (e.g., a TRIAC device, not shown) to control an amount of power that is provided to an external device. Power-output controller 274 can provide a trigger pulse to the current-regulating device for a determinable time interval, when the power signal's phase reaches a certain phase angle, to provide a desired power level to the external device. When power outlet 276 is coupled to a light fixture, for example, power-output controller 274 can control the current-regulating device as a means to adjust the light fixture's brightness level. As another example, when power outlet 276 is coupled to an induction motor (e.g., a ventilation fan), power-output controller 274 can control the current-regulating device as a means to adjust the rotational speed of the motor's shaft (e.g., the fan's blades).

Device architecture 260 can also include a serial port 267, which can be coupled to an external peripheral device that receives power from power outlet 276. For example, processing unit 262 can use serial port 267 to configure the peripheral device after powering up the peripheral device via power outlet 276 (e.g., a computing device), and/or to monitor and control the peripheral device while the device is operational. In some embodiments, if the device fails to respond to commands via serial port 267, processing unit 262 can determine that the peripheral device has experienced a failure event, and can re-set the device by performing a power cycling operation via power outlet 276. If processing unit 262 needs to disable power to the peripheral device while the peripheral device is operational, processing unit 262 can use serial port 267 to perform a shut-down sequence on the peripheral device.

Device architecture 260 can also include one or more modules for communicating with external devices. For example, device architecture 260 can include communication modules 268, which can include an Ethernet module coupled to an Ethernet port 269, and/or can include or be coupled to a wireless module 265 (e.g., a Wi-Fi module, or a Bluetooth module).

Figure 2F:
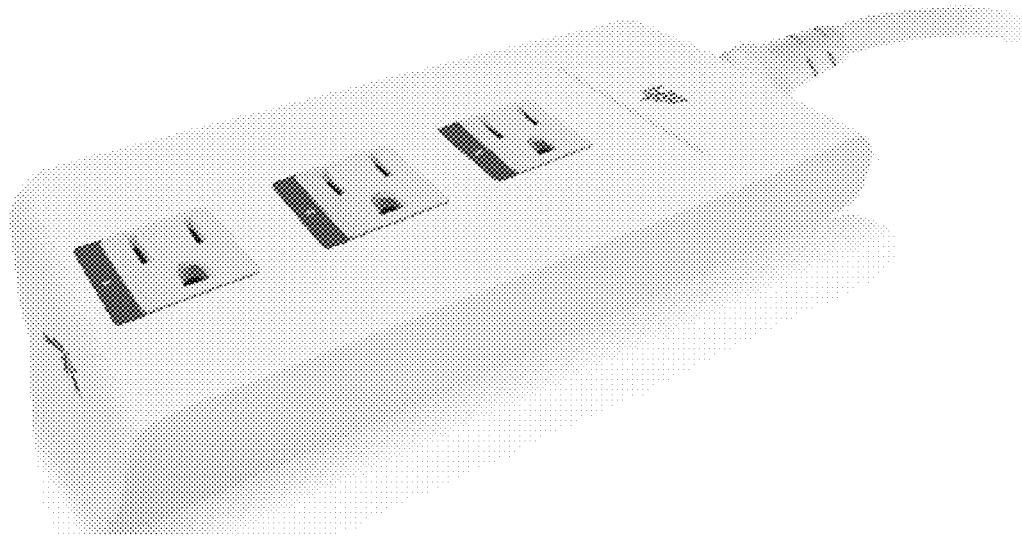
FIG. 2F illustrates an mPower interfacing device in accordance with an embodiment of the present invention.

FIG. 2F illustrates an mPower interfacing device 278 in accordance with an embodiment of the present invention. Specifically, device 278 includes at least a reset button, a status LED indicator, one or more power outlets, and a power plug. The status LED indicator lights yellow when device 278 is first powered on in factory default mode out of the box, and lights steady green when device 278 has been successfully integrated into a network and is working properly. Also, the status LED flashes when the Locate button is used in the mFi Controller software to display device 278 on a map.

Figure 2G:
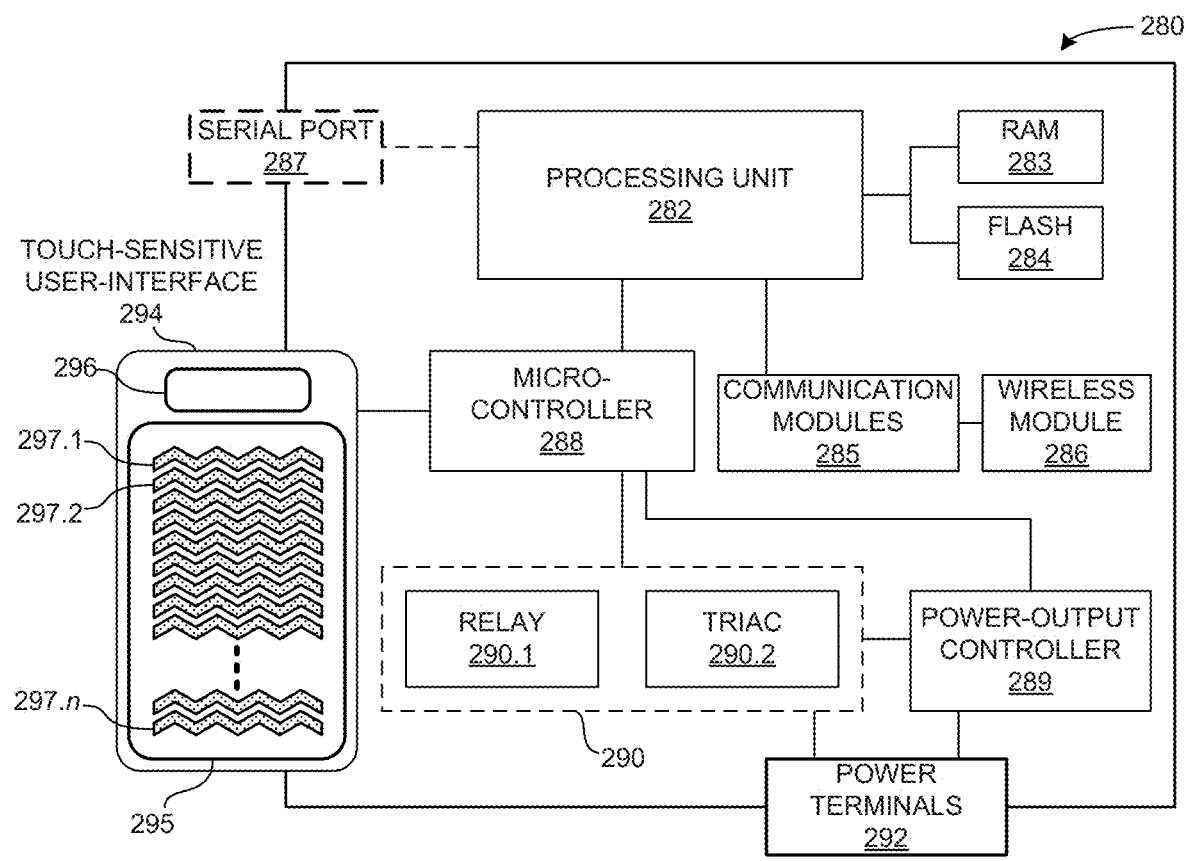
FIG. 2G presents a diagram illustrating an exemplary device architecture of an mDimmer or an mSwitch interfacing device in accordance with an embodiment of the present invention.

FIG. 2G presents a diagram illustrating an exemplary device architecture 280 of an mDimmer or an mSwitch interfacing device in accordance with an embodiment of the present invention. Device architecture 280 can include a flash storage device 284 that stores data and software instructions for operating the mDimmer interfacing device, as well as a processing unit 282 and a memory device 283 for executing the instructions. Device architecture 260 can also include a touch-sensitive user-interface 294 and a microcontroller 288 for controlling touch-sensitive user-interface 294. Touch-sensitive user-interface 294 can include a proximity sensor 295, a motion sensor 296, and a plurality of touch-sensitive sensors 297.

Proximity sensor 295 can detect when an object (e.g., a user's hand) is within a close proximity of touch-sensitive user-interface 294, and generates an analog signal based on the proximity of the detected object to proximity sensor 295. For example, proximity sensor 295 can include an infrared proximity sensor, which emits an infrared signal from an infrared emitter, and generates the analog signal based on an amount of infrared light detected by an infrared detector (e.g., infrared light that reflected off the user's hand).

Touch-sensitive sensors 297 can include resistive-touch sensors, capacitive-touch sensors, or any touch-screen sensors now known or later developed. When a user touches a respective touch-sensitive sensor (e.g., sensor 297.n), the touch-sensitive sensor detects an increase in capacitance on the surface of its touch screen, and generates an analog voltage which reflects the amount of capacitance that was detected.

A respective touch-sensitive sensor can include a jagged shape along one dimension, such as a plurality of chevron shapes adjoined along a horizontal dimension, and the set of touch-sensitive sensors 297.1-297.n can be arranged along a dimension of user-interface 294 perpendicular to the jagged shape (e.g., along a vertical dimension of user-interface 294). Further, two neighboring touch-sensitive sensors can be placed in close proximity, for example, so that a lowest point on one touch-sensitive sensor (e.g., sensor 297.1) has a vertical coordinate along user-interface 294 that is less than or equal to a highest point on a lower-neighboring touch-sensitive sensor (e.g., sensor 297.2).

Alternatively, a respective touch-sensitive sensor can include any other shape suitable for implementing a touch-sensitive grid, and the set of touch-sensitive sensors 297.1-297.n can be arranged along two dimension of user-interface 294 to create a touch-sensitive surface (e.g., a grid or any other user-interface pattern) associated with a pre-determined set of touch-surface gestures.

Regarding motion sensor 296, motion sensor 296 can include an ultrasonic motion sensor, a microwave motion sensor, a tomographic motion sensor, or any motion sensor now known or later developed. When a user or an object moves in front of touch-sensitive user-interface 294, motion sensor 296 can detect the motion and can generate a binary value that indicates that an object has been detected. In some embodiments, motion sensor 296 can generate an analog or digital value that indicates, for example, a change in an ultrasonic measurement, a change in a microwave measurement, etc.

Touch-sensitive user-interface 294 generates a digital output signal for each of proximity sensor 295, touch-sensitive sensors 297.1-297.n, and motion sensor 296. In some embodiments, touch-sensitive user-interface 294 can include an ADC device for each sensor, which converts the sensor's analog signal value to a digital binary signal. Touch-sensitive user-interface 294 can provide the digital binary signal to microcontroller 288 via a parallel bus (e.g., a plurality of GPIO pins on microcontroller 288), or via a serial bus (e.g., an SPI or an I$^2$C bus on microcontroller 288).

In some other embodiments, touch-sensitive user-interface 294 can include a Schmitt trigger device for each sensor, and a respective Schmitt trigger generates a binary output signal which indicates whether a corresponding sensor has detected an object. Touch-sensitive user-interface 294 can transmit the binary values for the various sensors to microcontroller 288 via a parallel bus (e.g., a plurality of GPIO pins on microcontroller 288, one pin per sensor), or via a serial bus (e.g., an SPI or an I$^2$C bus on microcontroller 288).

Microcontroller 288 can periodically monitor the state for the various sensors of touch-sensitive user-interface 294, for example, at approximately 15 millisecond intervals. If microcontroller 288 determines that proximity sensor 295 detects an object, microcontroller 288 can activate a light source for touch-sensitive user-interface 294 to allow the user to see user-interface 294 while the user is entering a device-controlling command via user-interface 294. Microcontroller 288 can activate the light source, for example, by ramping up the brightness of the light source over a determinable time interval to a determinable level (e.g., to a fixed level, or to a level derived from an amount of ambient light).

Also, if microcontroller 288 determines that a touch-sensitive sensor has detected an object's touch, microcontroller 288 can determine a gesture based on the current state and the previous state of touch-screen user-interface 294. For example, microcontroller 288 can determine a current region of user-interface 294 that the user is touching (e.g., the current state), and can determine a direction for a gesture based on a previous touch-sensitive sensor that detected an object's touch (e.g., the previous state). Once the user has completed his interaction with user-interface 294, microcontroller 288 can generate a gesture that indicates a speed and a direction of the user's gesture, and/or a distance traveled by the user's gesture. Thus, microcontroller 288 may determine that the user is making an upward finger-swipe gesture or a downward finger-swipe gesture, as well as a speed and distance traveled by the finger-swipe gesture.

If the user is not swiping his finger across the surface of touch-sensitive user-interface 294 (e.g., the previous state did not involve the user touching or swiping across user-interface 288), microcontroller 288 can determine a region of user-interface 294 that the user has touched. Microcontroller 288 can generate and store a gesture that indicates the surface portion of user-interface 294 that the user has touched, for example, using a numeric value that indicates a vertical coordinate of the user-interface 294 touched by the user. Processing unit 282 can configure the power output to the light fixture to reach a light intensity that corresponds to the numeric value.

In some embodiments, processing unit 282 periodically polls the sensor readings (e.g., at approximately 15 millisecond intervals) and/or detected gestures from microcontroller 288. Also, processing unit 282 can use the obtained data to select a set of rules to evaluate, and can perform an action associated with any rules whose conditions have been met. Processing unit 282 can also select a set of remote devices that have subscribed to a piece of data (e.g., data for a detected motion and/or a detected gesture), and can send the piece of data to the selected devices using network addressing information associated with their corresponding network connections.

Device architecture 280 can include one or more communication modules 285 for communicating with external devices. Communication modules 285 can include or be coupled to a wireless module 286 (e.g., a Wi-Fi module, or a Bluetooth module), and/or can include an Ethernet module coupled to an Ethernet port (not shown). Device architecture 280 can also include a serial port 287 (e.g., an RS-232 jack for a UART port), which can be coupled to an external peripheral device, and can be used by processing unit 282 to monitor and/or control the peripheral device. The peripheral device can include an appliance (e.g., an HVAC system), or any electronic or computing device that can communicate via serial port 287.

Device architecture 280 can also include power-controlling modules 290 to control and/or regulate an output power signal, and can include a power-output controller 289 to configure and monitor the power output by power-controlling modules 290. Device architecture 280 can also include power terminals 292 for providing the output power signal to an electrical load, such as a light fixture, an electric motor, an HVAC system, etc. In some embodiments, device architecture 280 implements a light switch (e.g., an mSwitch device), and power-controlling modules 290 includes a relay 290.1. When processing unit 282 determines that the user has touched a surface of touch-sensitive user-interface 294 (e.g., touched any of touch-sensitive sensors 297), processing unit 282 can configure microcontroller 288 to open relay 290.1 if it is closed, or to close relay 290.1 if it is open. This configuration enables the user to turn on or turn off a light fixture electrically coupled to power terminals 292. Microcontroller 288 opens or closes relay 290.1 by configuring power-output controller 289 to generate the electrical signals necessary for opening or closing relay 290.1. Microcontroller can also configure power-output controller 289 to monitor an amount of power dissipated by power-terminals 292, for example, to periodically obtain a power measurement for an electrical load.

In some embodiments, device architecture 280 implements a light dimmer (e.g., an mDimmer device), and power-controlling modules 290 includes a TRIAC 290.2. When processing unit 282 detects a touch-screen gesture from a user (e.g., via microcontroller 288), processing unit 282 can configure microcontroller 288 to adjust a brightness level for a light fixture electrically coupled to power terminals 292. For example, as the user performs an upward finger swipe on touch-sensitive user-interface 294, processing unit 282 can determine a brightness level for the light fixture based on the current (or most recent) position, direction, and/or velocity of the user's finger on touch-sensitive user-interface 294. Processing unit 282 can select the highest brightness level if the user taps on touch-sensitive sensor 297.1, or can select the lowest (or off) brightness level if the user taps on touch-sensitive sensor 297.n. Processing unit 282 can configure microcontroller 288 to adjust the power output transmitted by triac 290.2 to correspond to the user's desired brightness level. Microcontroller 288 controls the power output by configuring power-output controller 289 to generate the electrical signals necessary for configuring triac 290.2 to reach and maintain the power output at the desired level.

In some embodiments, power-output controller 289 also monitors an amount of current, an amount of power, and/or a phase of the power being transmitted via power terminals 292. Microcontroller 288 can calibrate power output controller 289, based on the measured values, to stabilize the power transmitted via power terminals 292. If microcontroller 288 detects a change in the electrical load, for example due to a dimming light fixture, microcontroller 288 can adjust power output controller 289 to compensate for the change in the electrical load to reach a desired power output. Thus, microcontroller 288 can use power output controller 289 to implement a feedback loop that adjusts power to a light fixture to ensure a steady (non-fluctuating) light intensity, even as the light fixture ages over time.

In some embodiments, processing unit 282 can store a previous lighting level for the user. For example, the user can perform a finger-swipe gesture to adjust the lighting level to a desired level (e.g., by swiping his finger to a position associated with the desired lighting level). Then, to turn off the light, the user can tap anywhere on touch-sensitive user-interface 294, at which point processing unit 282 stores the current lighting level for the user, and configures power-output controller 289 to disable power to power terminals 292. If a user taps anywhere on touch-sensitive user-interface 294 at a later time to turn on the lights, processing unit 282 can restore power to the light fixtures to the previous lighting level based on the stored settings.

Further, processing unit 282 can quickly ramp up or ramp down the brightness level if the user performs a fast upward or downward finger swipe. Alternatively, processing unit 282 can perform fine-grained adjustments to the light fixture's brightness level if the user performs a slow upward or downward finger swipe, for example, to increase or decrease the brightness level by a finer granularity than can be achieved by tapping on any of touch-sensitive sensors 297.

In some embodiments, processing unit 282 can control a light fixture that is not electrically coupled to power terminals 292. When processing unit 282 detects a gesture event performed by the user (e.g., via microcontroller 288), processing unit 282 can send the gesture event to a remote interfacing device that has subscribed to events from the local interfacing device. The remote interfacing device can include a device that provides power to a light fixture, such as an mPower device illustrated in FIG. 2E. When the remote interfacing device receives the gesture event, the remote interfacing device can use the event information to control power to a light fixture based on a rule stored in the device's local rule repository.

In some embodiments, the electrical load coupled to power terminals 292 can include an HVAC system. For example, processing unit 282 can be configured to control an HVAC system based on the user-input commands received via touch-sensitive user-interface 294. The user can perform an upward finger swipe to increase the temperature, a downward finger swipe to decrease the temperature, and can toggle the HVAC system's power by tapping on the surface of touch-sensitive user-interface 294. Further, microcontroller 288 can configure power-output controller 289 to monitor an amount of energy consumed by the HVAC system, which facilitates the user to create rules for controlling the HVAC unit based on the user's commands as well as an amount of power being consumed by the HVAC system and/or other appliances.

Figure 2H:
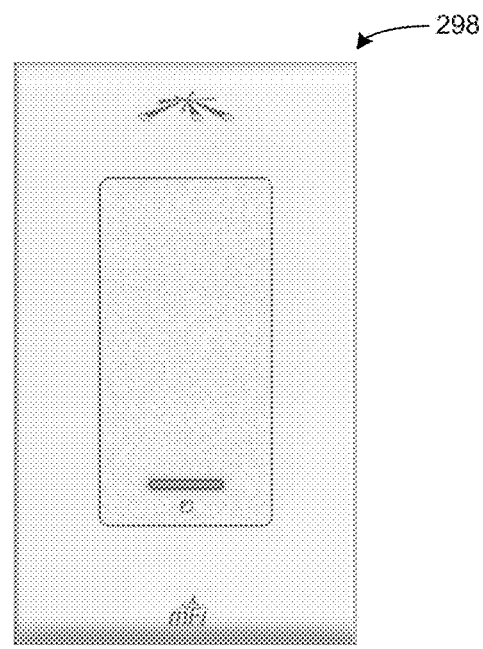
FIG. 2H illustrates an mDimmer interfacing device in accordance with an embodiment of the present invention.

FIG. 2H illustrates an mDimmer interfacing device 298 in accordance with an embodiment of the present invention. Specifically, device 298 includes at least a reset button, a touch-pad area, and a status LED indicator. The status LED indicator lights yellow when device 298 is first powered on in factory default mode out of the box, and lights steady green when device 298 has been successfully integrated into a network and is working properly. Also, the status LED flashes when the Locate button is used in the mFi Controller software to display device 298 on a map.

In some embodiments, an mDimmer or mSwitch device can communicate with a network-bridging interfacing device via a serial communication interface, such as an SPI or an I²C interface. The network-bridging interfacing device can include a wired or wireless network connection to a local area network.

Figure 2I:
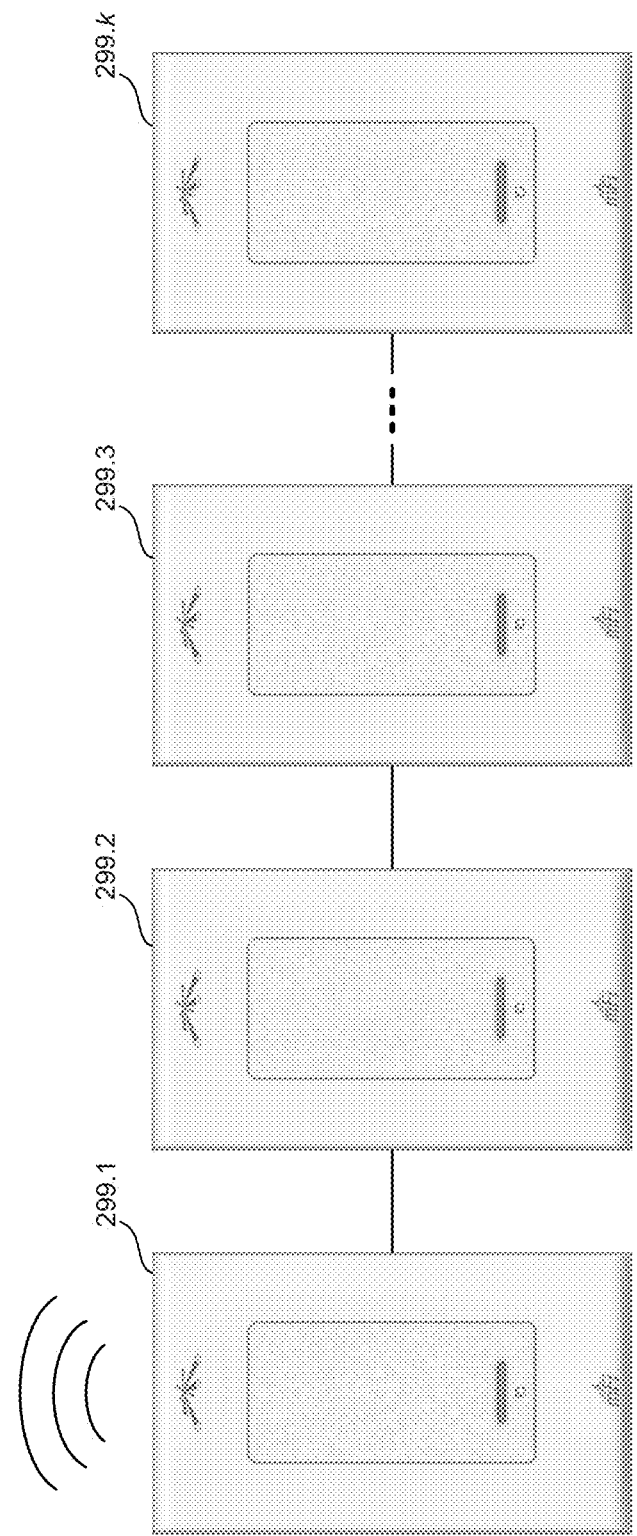
FIG. 2I illustrates a plurality of mDimmer interfacing devices coupled via a serial communication interface in accordance with an embodiment of the present invention.

FIG. 2I illustrates a plurality of mDimmer interfacing devices 299 coupled via a serial communication interface in accordance with an embodiment of the present invention. Specifically, an mDimmer device 299.1 includes a network module, such as an Ethernet module or a Wi-Fi module. Also, mDimmer devices 299.2-299.$k$ may or may not include a networking module, and can be coupled to device 299.1 via a serial connection. For example, mDimmer device 299.1 can serve as a network gateway to mDimmer devices 299.2-299.$k$. If an mDimmer device 299.$k$ subscribes to data from a remote interfacing device, mDimmer device 299.$k$ can receive real-time data (e.g., a sensor event from a remote device) via mDimmer device 299.1. Once mDimmer device 299.$k$ receives the real-time data, device 299.$k$ can process one or more rules that are activated by the received data.

Interfacing Device as a Data Server

In some embodiments, interfacing device 200 can function as a data server to send real-time data from an attached physical device to a remote device that has subscribed to this data (e.g., a controller hosted by computer cluster 152 of FIG. 1B). For example, packet generator/parser 212 can receive a condition-subscription request from the remote device, which subscribes the remote device to receiving condition-alert messages from interfacing device 200.

The condition-subscription request can indicate a condition for when interfacing device 200 is to send updated state and/or sensor measurement data from an attached physical device to the remote device. Interfacing device 200 can store the received condition within storage unit 210 in association with the remote device (e.g., in association with an IP address for the remote device, and/or any other network-reachability information or device identifier for the remote device). Then, when interfacing device 200 determines that the condition has been met (e.g., when a sensor measurement from an attached physical device satisfies the condition), interfacing device 200 can send a corresponding condition-alert message to the remote device (e.g., based on the device's network-reachability information). Interfacing device 200 can send the corresponding condition-alert message to the remote device using network-addressing information associated with a network connection to the remote device. The condition-alert message can indicate that the condition has been met, and/or can indicate a state and/or sensor measurement from the physical device coupled to interfacing device 200.

Interfacing Device as a Data Client

In some embodiments, interfacing device 200 can function as a data client to receive state and/or sensor measurement data from a remote interfacing device (e.g., for one or more physical devices attached to the remote interfacing device) or from a central controller. Interfacing device 200 can use the data it receives to modify its operating state. Specifically, storage unit 210 can store one or more compound rules that are to be executed by interfacing device 200. A compound rule can indicate a set of conditions that trigger an action, and can indicate an action description for the action. Interfacing device 200 can select and process a rule based on the received data, and modifies its operating state based on a rule's action description.

The central controller can analyze a set of rules to identify a remote interfacing device from which interfacing device 200 needs to receive data for a physical device, and to identify conditions associated with the data. For example, the controller may determine that it needs to receive a temperature measurement from a physical device X attached to a remote interfacing device Y when physical device X determines that the temperature has reached above 100° F. The controller can provide interfacing device 200 with device-accessing information for the remote device, which interfacing device 200 uses to establish a network connection with the remote device.

Specifically, interfacing device 200 can use packet generator/parser 212 to send a condition-subscription request to the remote interfacing device, which subscribes interfacing device 200 to receiving condition-alert messages from the remote interfacing device. Once interfacing device 200 has successfully subscribed to receiving condition-alert messages, the remote interfacing device will send a condition-alert message to interfacing device 200 once the desired condition has been met. The condition-alert message can indicate that the condition has been met, and/or can indicate a state and/or sensor measurement from a physical device coupled to the remote interfacing device.

Once packet generator/parser 212 receives a condition-alert message, interfacing device 200 can use storage unit 210 to store the state/measurement data from the condition-alert message. Further, processing unit 208 identifies one or more rules from storage unit 210 whose conditions are met by the state/measurement data received from the condition-alert message and/or from other recent state/measurement data stored in storage unit 210. Processing unit 208 can execute an action description for any rule whose conditions have been met.

System Operation

Returning to FIG. 1, communications between controller 102 and interfacing devices 106 and 108 are achieved by exchanging communication packets, such as IP packets, over network 106, which can be an IP network. In some embodiments, intermediate device 108 processes raw input data received from coupled devices 110.1-110.$n$ (e.g., by translating the raw analog or digital data into meaningful information, such as temperature or humidity readings). Interfacing device 108.1 packages the translated data into IP packets, and sends the packets to controller 102, thus enabling user 104 to view such information. In addition, user 104 may issue a command, such as setting up a rule governing operations of the coupled physical devices. Controller 102 can package the user command into IP packets, and sends these packets to the corresponding interfacing devices (e.g., devices 108.1 and 108.*m*), which in turn parse these packets and execute the user command. Note that, because network 106 can include the Internet, user 104 and controller 102 can be at any location where he has access to network 106, and still be able to monitor and control physical devices 110.

Figure 3A:
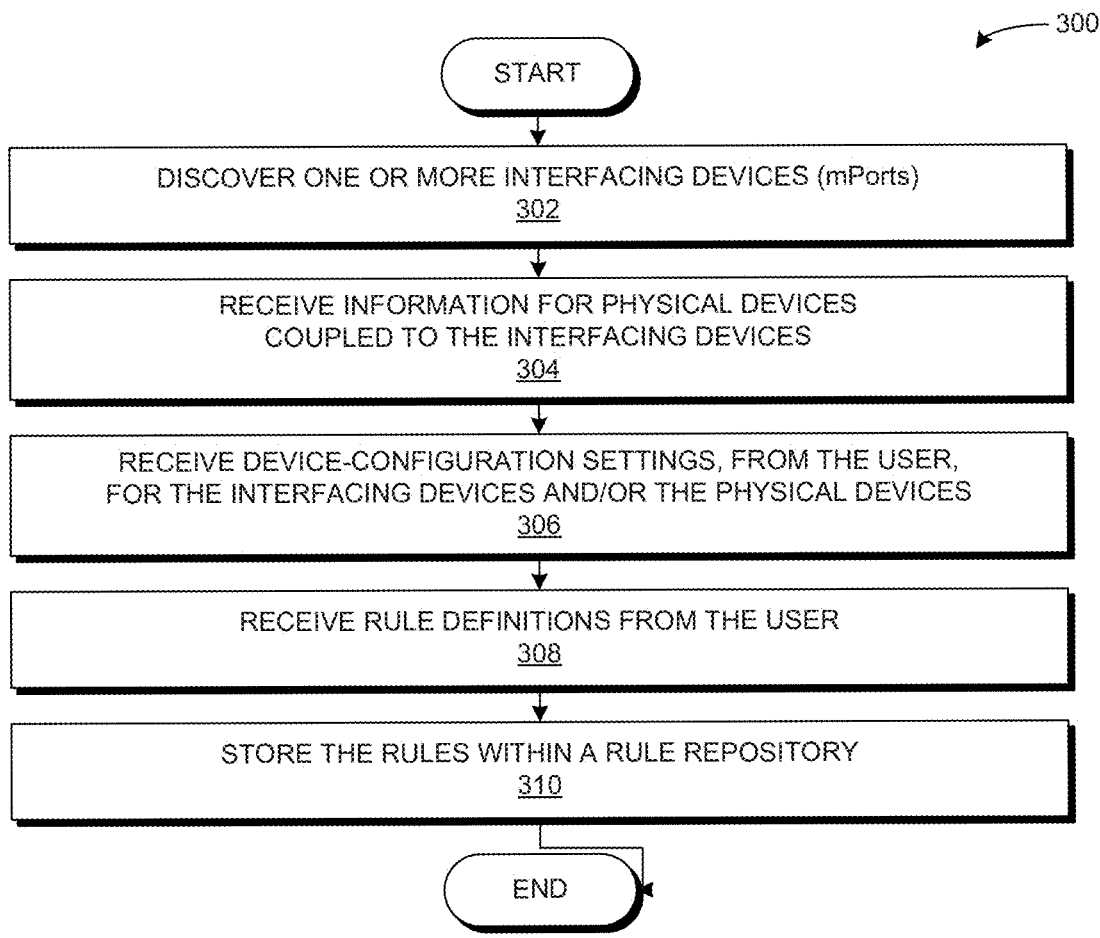
FIG. 3A presents a flowchart illustrating an exemplary method for configuring a device controller in accordance with an embodiment of the present invention.

FIG. 3A presents a flowchart illustrating an exemplary method 300 for configuring a device controller in accordance with an embodiment of the present invention. During the initialization process of the system, the controller discovers a number of interfacing devices (also called mPorts) that are part of the system (operation 302). In some embodiments, the controller and the mPorts are within a same local area network (LAN) domain. In some other embodiments, the controller interfaces with the mPorts via a wide area network (WAN), such as the Internet.

To discover the interfacing the device, the controller can receive user-login information from the user, and the controller identifies the interfacing devices associated with the user's account. The controller can identify each interfacing device by its MAC address, and/or by its IP address. Also, during the discovery phase, the controller can also automatically detect certain physical devices (such as devices manufactured by the same vendor of the mPorts) coupled to the user's interfacing devices, regardless of whether the user has registered these devices to be associated with his user account.

Subsequently, the system can receive information for third-party physical devices coupled to the interfacing devices (e.g., for special-purpose devices coupled to the mPorts) (operation 304). For example, the user can interact with a GUI provided by the controller to input a model number for the third-party device, and to identify which mPort (e.g., identified by its MAC address) and which port on that mPort the third-party device is coupled to. Recall that the mPort device can interface with a physical device via an analog terminal, or via a serial communication port. The system can use the physical device's model number to determine a descriptive label for the device, to determine types of data that can be observed from the device (e.g., an analog or digital value, and a descriptive label for the observed value), as well as which types of data values can be provided to the physical device. In some embodiments, if the system does not recognize the physical device, the user can use the GUI to enter parameters which indicate the data values that are to be expected from the physical device or can be provided to the physical device, as well as descriptive labels for these data values.

The system can also receive device-configuration settings from the user for the interfacing devices (operation 306). During this process, the user can interact with the GUI to indicate locations on a map where the user has placed or installed the devices, and can indicate how these devices are to operate. For example, the user can indicate an operation schedule for an mPort device, and can indicate a schedule and/or frequency for monitoring a port on the device.

The controller further receives one or more rules defined by the user (operation 308). Each rule defines the conditions that trigger an action, and which action(s) are to occur once those conditions are met. A rule's condition can include condition elements that take as input sensor measurements for one or more physical values. The sensed physical values can include, for example, a time value, a temperature, a humidity level, a power level, a voltage, a current, a detected motion, an on/off state (e.g., for an electrical load), an open/close state (e.g., for a door), light level, (e.g., an ambient light), and a moisture level.

Further, a condition element can include a comparison operation, which can be evaluated by comparing a sensor measurement to a predetermined value (e.g., to a constant value), or to another sensor measurement. The comparison can include, for example, whether the sensor measurement is a greater-than, less-than, or equal to the predetermined value or other sensor measurement. A condition element can also include an evaluation or comparison of a time-related physical value. For example, the condition element can take the current time as input, and compares the current time to a predetermined time value. As another example, the condition element can take a time duration for a sensor's current state, such as an amount of time that the sensor state has remained at its current value, or remained above or below a predetermined threshold value. The condition element can compare the time duration to a predetermined time, for example, to determine whether a sensor's state has been at the current value (or above a given threshold) for at least 10 minutes.

In some embodiments, a rule can be a compound rule that involves multiple devices. A condition element can include a logical operator, which can be evaluated by performing a logic operation on the outcome of one or more condition elements. For example, a rule can state that once a door sensor detects that a door has been opened and a motion-sensor determines that no motion has been detected in the room (e.g., meaning a person is entering the room), a light switch is to automatically turn on a light in the room. Also, another rule can state that once the door has been opened and motion was previously detected in the room (e.g., meaning the person is leaving the room), the light switch is to turn off the light. Note that these rules define conditions (e.g., a door being opened and motion/no motion being detected) that trigger a corresponding action (e.g., turn the light on or turn off), and can involve multiple devices (e.g., the door sensor, the motion sensor, and the light switch). The controller can then store the rules within a rule repository (operation 310), thus configuring the controller to perform actions based on the rule definitions and data from the physical devices.

A rule's action description indicates one or more operations that are to be performed when the condition's criteria is met. The action description can include one or more actions that are to be performed, such as to turn a digital output signal on or off, with an optional time limit (e.g., turn the digital output signal on or off for 10 minutes, or to do so after 10 minutes). As another example, the action description can specify a script that is to be processed by the interfacing device. The script can include a sequence of instructions that are to be performed by the interfacing device to achieve a desired outcome. Also, the action description can indicate that the interfacing device is to send an message to a target entity (e.g., an email message), or to generate an event, which is stored within an event log for an administrator to see.

In some embodiments, if the interfacing devices (the mPorts) are to execute the rules (e.g., implementing a distributed-control system), the local controller (e.g., the user's personal computing device) can send the defined rules to the interfacing devices to which the involved physical devices are coupled. For example, the local controller can send the rules to an IP address associated with an interfacing device that is to execute the rule, or can send the rules to the interfacing device via a network connection to the device.

Figure 3B:
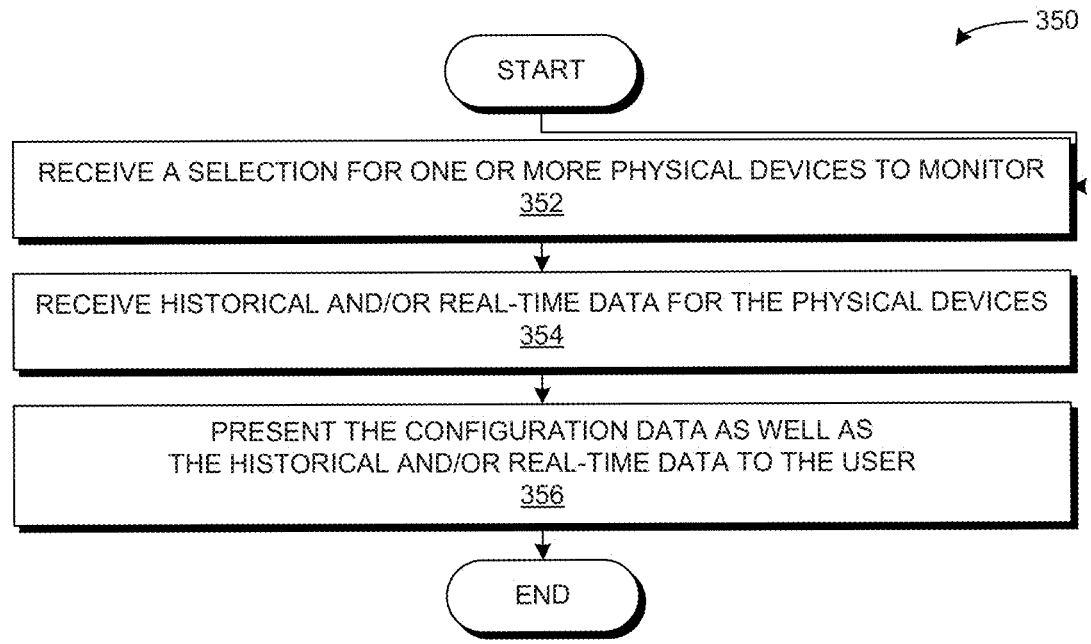
FIG. 3B presents a flowchart illustrating an exemplary method for presenting configuration data and/or sensor data in accordance with an embodiment of the present invention.

FIG. 3B presents a flowchart illustrating an exemplary method 350 for presenting configuration data and/or sensor data in accordance with an embodiment of the present invention. During operation, the controller can present to the user a GUI that allows the user to select one or more physical devices to monitor. The controller can receive a selection from the user for one or more interfacing devices to monitor (operation 352), and in response to receiving the selection, the controller obtains historical and/or real-time data for the physical devices (operation 354). The system can obtain the data from a local sensor-data repository (e.g., in a local database), or can request the data from interfacing devices to which the physical devices are coupled. The controller can then present device-configuration information associated with these physical devices, and can also present historical and/or real-time data to the user via the GUI (operation 356). For example, the user can select a temperature sensor, and the mPort associated with the temperature sensor sends temperatures detected by this sensor over a specified time period to the controller. The GUI can include a map that illustrates an icon for temperature sensor at its corresponding location, can display a current or recent temperature measurement next to the sensor's icon on the map. The GUI can also include a table or line graph that presents historical temperature measurements from the temperature sensor.

User Interface Views

Figure 4A:
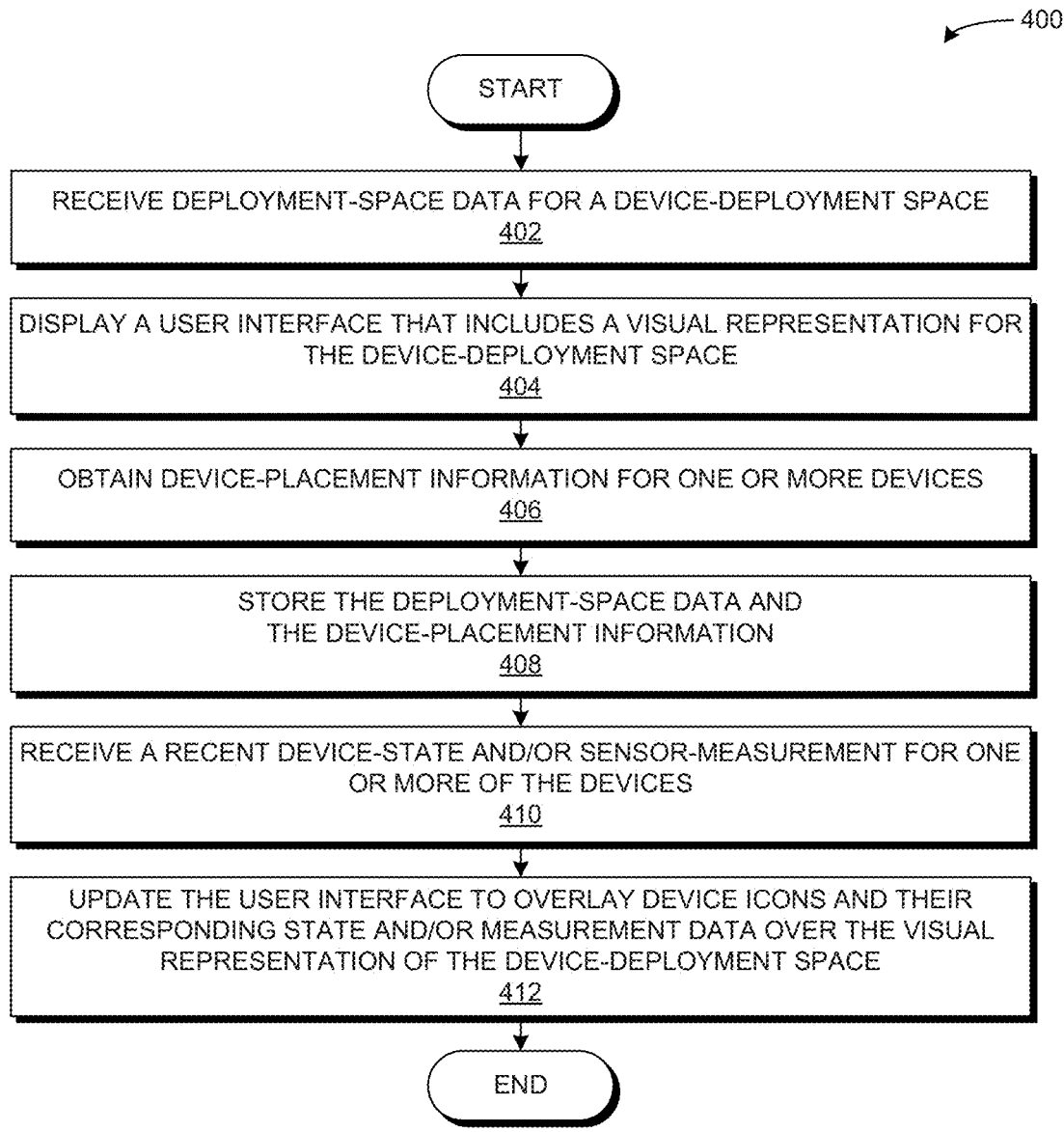
FIG. 4A presents a flowchart illustrating an exemplary method for configuring a device-placement space for a space-view graphic user interface (GUI) in accordance with an embodiment of the present invention.

FIG. 4A presents a flowchart illustrating an exemplary method for configuring a device-placement space for a space-view graphic user interface (GUI) in accordance with an embodiment of the present invention. During operation, the controller can receive deployment-space data for a device-deployment area (operation 402). The deployment-space data can include, for example, map coordinates for an outdoor area (e.g., a street map) within which a set of physical and/or interfacing devices have been deployed, or an image which represents a map for an indoor area (e.g., a floor plan) or an outdoor area. As another example, the deployment-space data can include a static picture of a room within which a set of physical devices have been deployed, or can include a live video feed for the room or space (e.g., from a tilt-zoom camera). The user can upload an image for a given space by selecting an existing image file from a storage device accessible from his personal computing device, or by selecting a source for the image or real-time feed (e.g., a network address, a port number, and/or client credentials). The user can also upload the image by taking a picture of the space (e.g., using a camera attached to a smartphone, tablet computer, or laptop computer), and uploading the resulting picture to the controller.

If the deployment-space data is for a map of an outdoor area, the user can provide the deployment-space data to the controller by indicating a geographic area which covers the set of deployed devices. The user can indicate the geographic area by providing two or more sets of geographic coordinates associated with the deployed devices (e.g., by providing the geographic coordinates of an area that covers the devices, or the geographic coordinates of the devices themselves), and the system can determine a geographic region to present to the user so that the region covers the deployed devices. Alternatively or additionally, the controller can provide a space-view GUI that allows the user to navigate an interactive map (e.g., a street map or a satellite-view map). The user can provide the geographic area by navigating the interactive map to the area that covers the deployed devices (e.g., by entering a city name or zip code into a search field and/or by panning across the interactive map), and by adjusting the zoom level to cover a desired area that surrounds the deployed devices.

Once the controller receives the deployment-space data, the controller can provide a space-view GUI that includes a visual representation for the device-deployment space (operation 404), and can obtain device-placement information for one or more devices deployed in this space (operation 406). The controller can obtain the device-placement information from a device repository that includes configuration information for a plurality of physical and interfacing devices. The controller can also obtain the device-placement information from the user when the user drags an icon of a physical device or an interfacing device onto a location on the visual representation for the deployment space, such that the target location represents the deployment location for the device. Once the user finishes placing the deployed devices on the visual representation, the user can click on a "Save" button of the space-view GUI to finalize settings, at which point the controller can store the deployment-space data and the device-placement information (operation 408).

In some embodiments, while the user is interacting with the space-view GUI, the controller can receive a recent device-state and/or a sensor measurement for one or more of the deployed devices (operation 410). In response to receiving this new data, the controller can update the space-view GUI to present this information to the user, for example, by overlaying the device icons and their recent state and/or measurement data over the visual representation of the device-deployment space (operation 412).

Figure 4B:
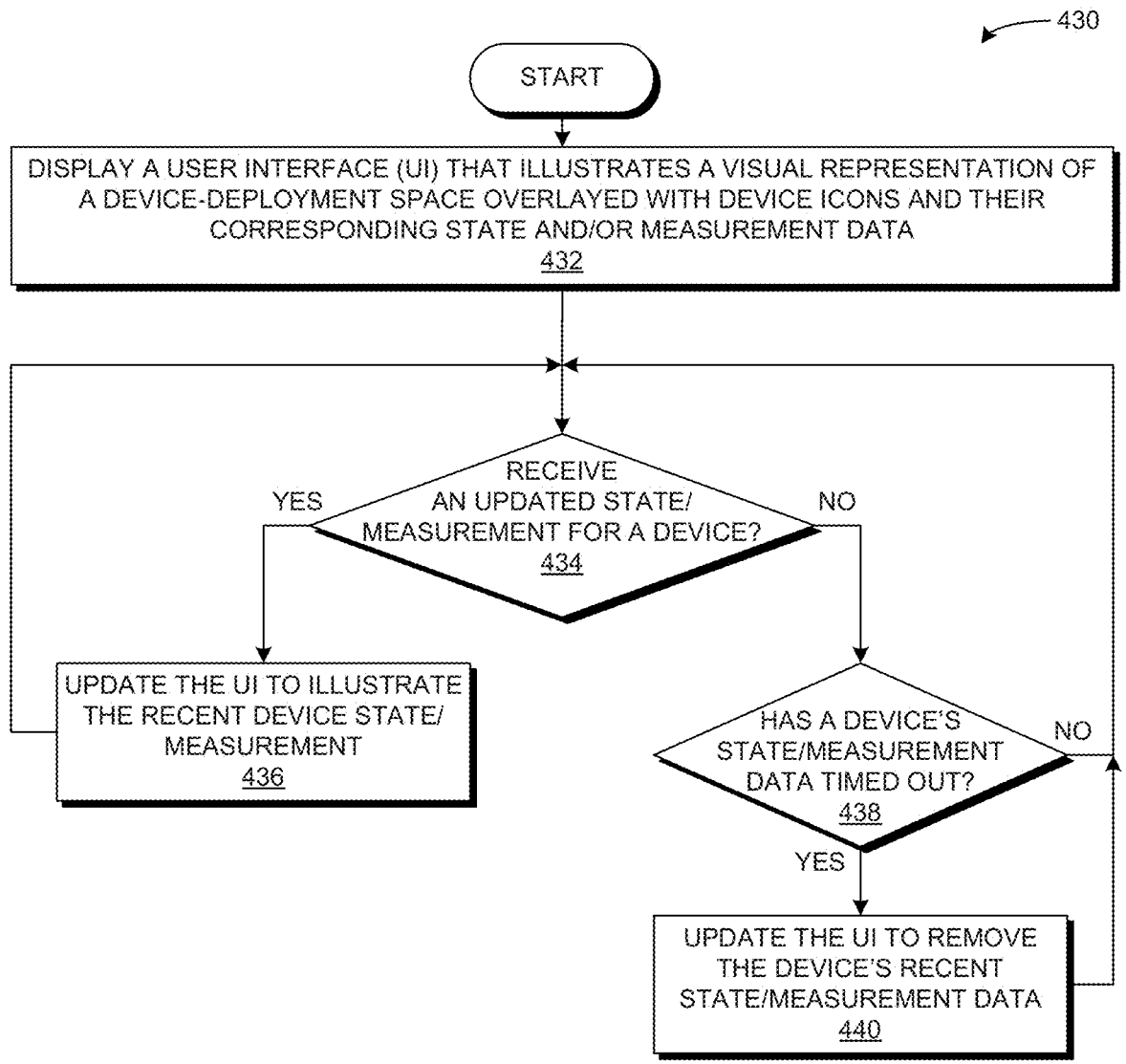
FIG. 4B presents a flowchart illustrating an exemplary method for displaying and updating a space-view GUI in accordance with an embodiment of the present invention.

FIG. 4B presents a flowchart illustrating an exemplary method 430 for displaying and updating a space-view graphic user interface (GUI) in accordance with an embodiment of the present invention. During operation, the controller can display a space-view GUI that illustrates a visual representation of a device-deployment space overlaid with device icons and their corresponding state and/or sensor-measurement data (operation 432). For example, the controller can present the device's state using an icon which indicates whether the device is active (e.g., being utilized), available but inactive (e.g., not being utilized), or non-responsive (e.g., turned off, without network connectivity, or malfunctioning). Further, the controller can present the device's sensor-measurement data by displaying an alphanumeric value or any graphical image which represents the recently measured value (e.g., a numeric value for a temperature reading, or an image of an LED for an on/off value or any binary value).

In some embodiments, the controller can determine whether it has received an updated state or measurement from a device (operation 434). If so, the controller can update the space-view GUI to illustrate the updated device state and/or the updated sensor measurement (operation 436). The controller can then return to operation 434 (e.g., after a determinable delay period) to receive an updated state or measurement from the same device or from a different device.

Otherwise, if the controller has not received an updated state or measurement, the controller can determine whether the currently displayed state or measurement data has timed out (operation 438). If the currently displayed data has timed out, the controller can update the space-view GUI to remove the timed-out data, and/or to indicate that the data has timed out (operation 440). The controller can then return to operation 434 to determine whether it has received an updated state or measurement from the same device or from a different device.

Figure 4C:
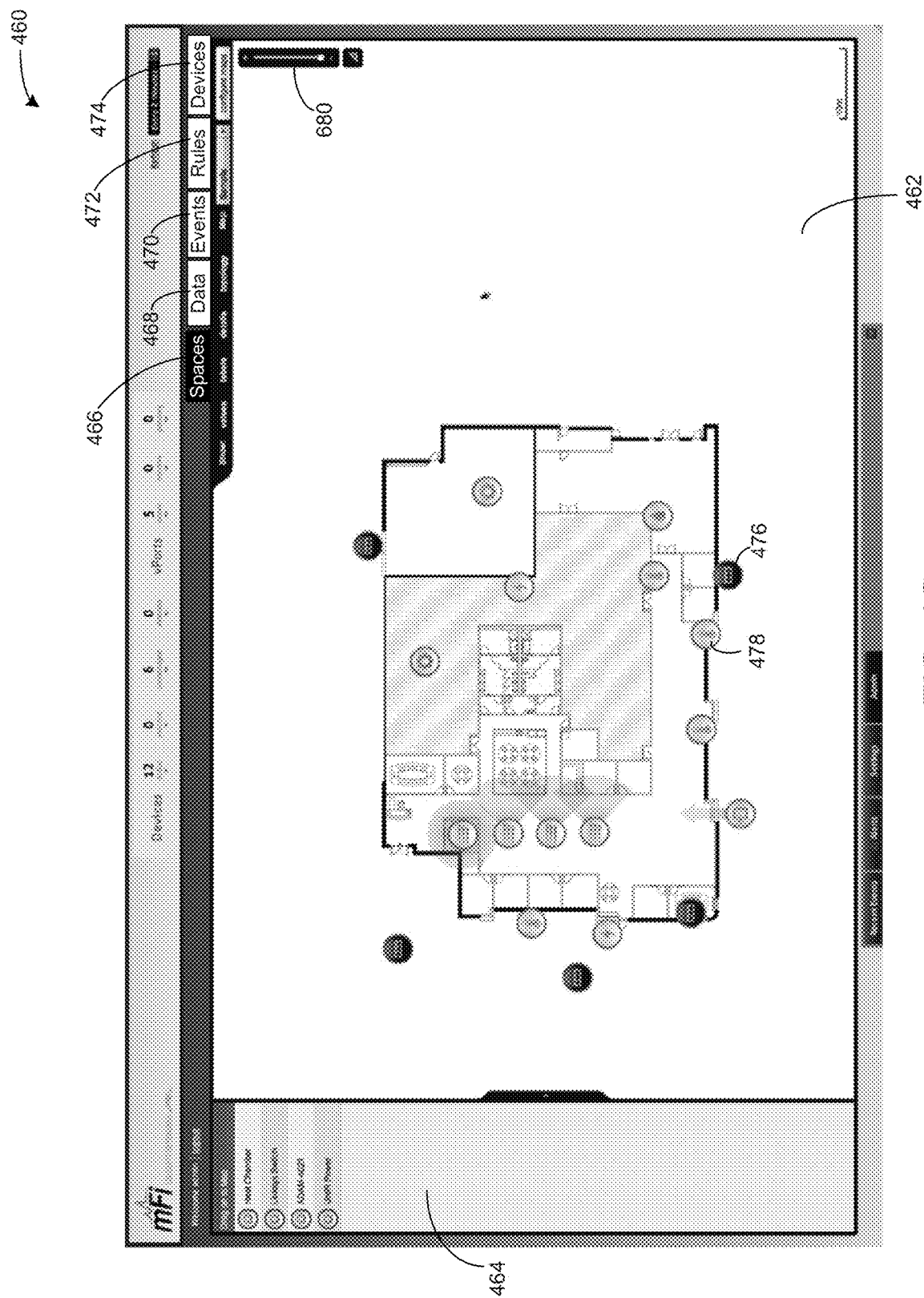
FIG. 4C presents a diagram illustrating an exemplary space-view GUI of the controller in accordance with an embodiment of the present invention.

FIG. 4C presents a diagram illustrating an exemplary space-view GUI 460 provided by the controller in accordance with an embodiment of the present invention. GUI 460 includes a central display area 462, a side panel 464, and a number of selectable tabs, such as a spaces tab 466, a data tab 468, an events tab 470, a rules tab 472, and a device tab 474. Central display area 462 displays information, such as images, graphs, and control panels, associated with a selected tab. In FIG. 4C, the selected tab is "spaces" tab 466, and the central display area 462 displays the layout of a building showing the locations of a set of interfacing devices (mPorts) and physical devices using appropriate icons. For example, an icon 476 represents an mPort, and an icon 478 represents a temperature sensor.

In some embodiments, a user can upload a space-view image by selecting an existing image of a map or a room on the user's computer, or by taking a picture of a room using the user's smartphone camera. In some other embodiments, the space-view image can include a captured image or real-time feed from a security camera. In some embodiments, the user can use an image obtained from an Internet-based map service (e.g., the Google Maps web service) to demonstrate the location of mPorts and physical devices.

The content of side panel 464 is also associated with the "spaces" tab, and can display a list of available devices that can be dragged to appropriate locations on the space shown in central display area 462. In addition, a user can also drag a device icon (e.g., an icon for an mPort device) from its current location on the space-view image to a new location. In FIG. 4C, central display area 462 also includes a zoom slider 480 that can be used to zoom the map in and out.

Figure 4D:
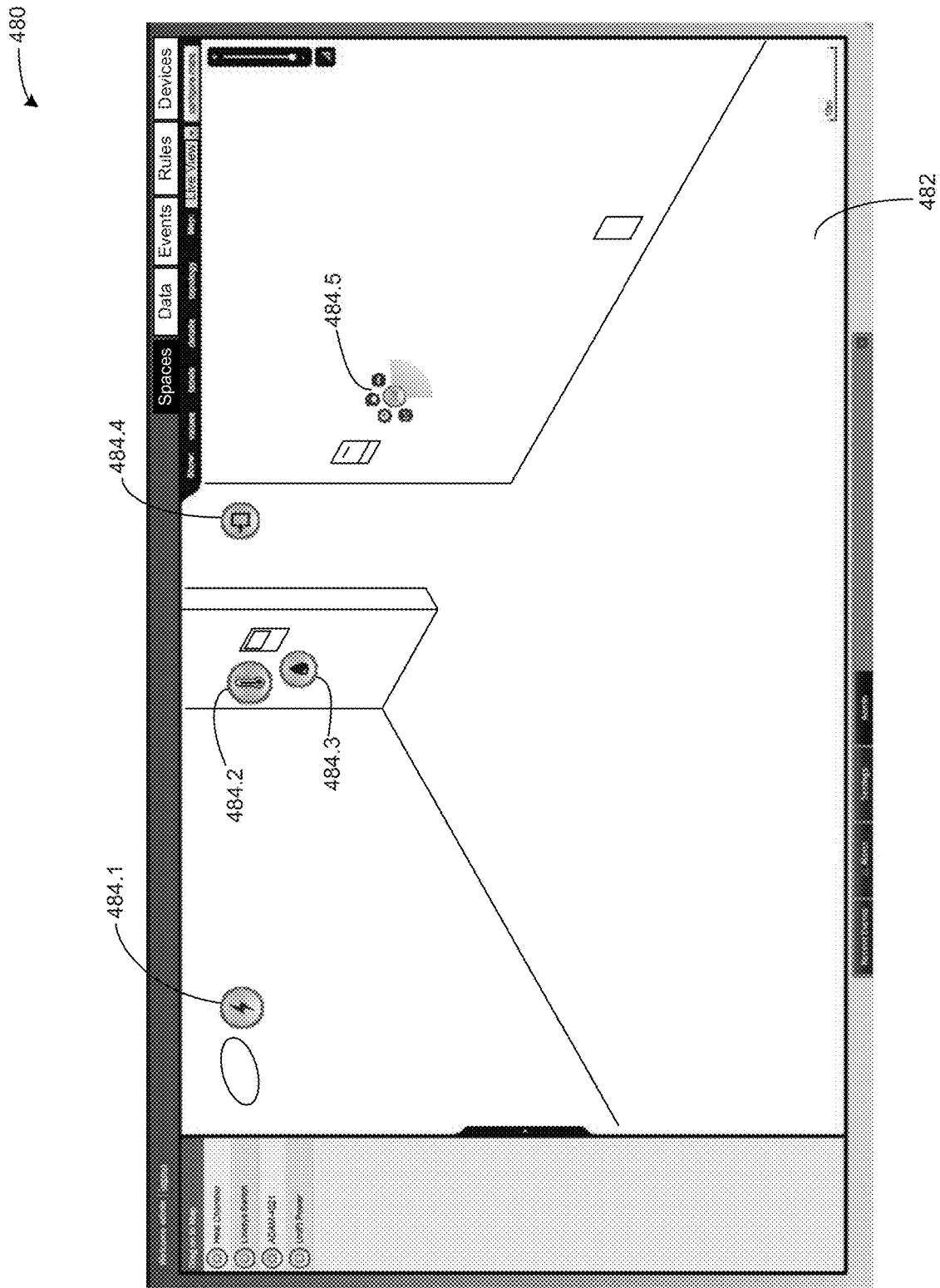
FIG. 4D presents a diagram illustrating an exemplary space-view GUI provided by the controller in accordance with an embodiment of the present invention.

FIG. 4D presents a diagram illustrating an exemplary space-view GUI 480 provided by the controller in accordance with an embodiment of the present invention. GUI 480 includes a central display area 482, which can display a user-selected image of a room within which a set of sensors are deployed, or can display a real-time feed from a security camera that covers a desired portion of the room, or a real-time feed from a user's hand-held portable device.

The user can drag a device icon from the side panel of GUI 480 onto a location of display area 482 associated with the corresponding device. The controller can store a display location for the device, which allows the system to overlay the device icon over the same location of display area 482 relative to the image of the "space." In some embodiments, if display area 482 is presenting a real-time feed from a pan/tilt/zoom security camera, the controller can adjust the location of the device icon along display area 482 as the camera pans, tilts, and/or zooms. This causes the device icon to appear to remain locked to a portion or location of the room. Similarly, if display area 482 is presenting a real-time feed from the user's hand-held portable device, the controller can obtain geographic coordinates and an orientation for the portable device. The controller then determines a set of device icons to display, and can adjust the location of the device icons along display area 482 as the user moves, pans, tilts, and/or zooms his portable device's camera.

In some embodiments, a user can interact with a device icon to control the type of information that is presented, or to control the interfacing device and/or physical device associated with the device icon. For example, device icon 484.1 corresponds to a current-metering device for a wall-mounted light fixture. The user can view an amount of current being consumed by the light fixture to determine whether fixture's light bulb is wearing out or has gone out. Also, device icons 484.2 and 484.3 may correspond to a thermostat, and may indicate a current room temperature and a humidity measurement, respectively.

Device icon 484.4 can correspond to a sensor that indicates whether a door is open or closed, and device icon 484.5 can correspond to a motion sensor (e.g., a sensor built into a light switch). In FIG. 4D, the user has activated device icon 484.5, which causes the controller to display a detected motion level using a color within a quarter circle. The controller also overlays a set of control icons surrounding the device icon. The control icons allow the user to control the information that is presented from the corresponding device, and/or to control the device itself. For example, the control icons can include: a "chart" icon; a "details" icon; a "lock" icon; and a "remove" icon.

The "chart" icon Displays a chart of color coded values representing low, average, and high values or event frequency based on the type of device. The "details" icon allows the user to open a details-view window for viewing detailed information for the physical device, such as a name, model, and mPort identifier for the interfacing device, and a port associated with the physical device. The detailed information can also include historical state/sensor data, as well as historical events. In some embodiments, the details-view window also allows the user to control the device, such as to turn a light on or off.

The "lock" icon for locking the selected sensor to the current location on the space's image, and disables the "remove" icon functionality for the sensor while the sensor icon is locked. The "remove" icon allows the user to remove the sensor from the location in display area 482.

If the device is a serial-based sensor, the controller also displays a "shell" icon, which allows the user to open a command-line interface shell for interacting with or controlling the device.

Figure 4E:
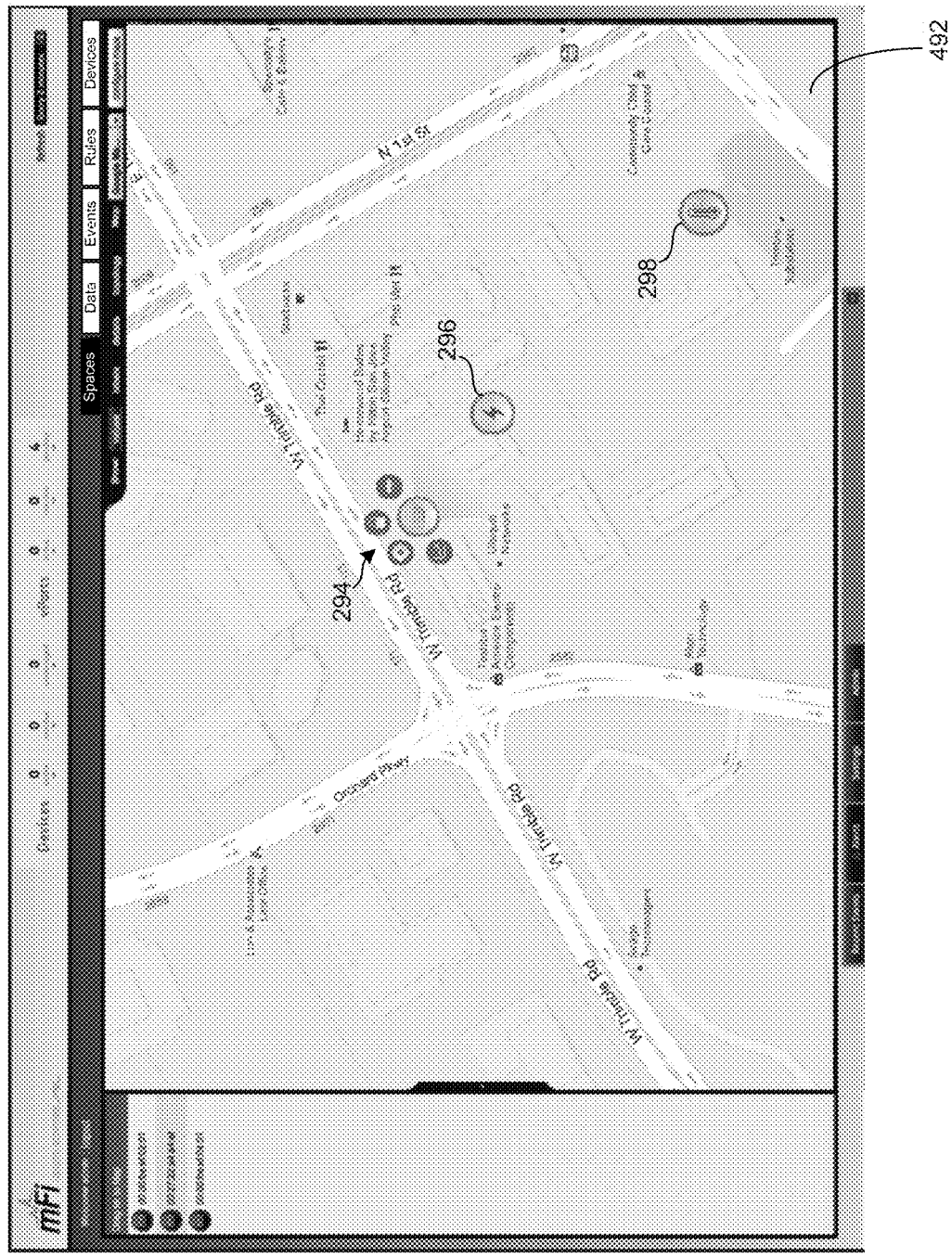
FIG. 4E presents a diagram illustrating an exemplary space-view GUI provided by the controller in accordance with an embodiment of the present invention.

FIG. 4E presents a diagram illustrating an exemplary space-view GUI 490 provided by the controller in accordance with an embodiment of the present invention. GUI 490 includes a central display area 492, which can display a geographic map for a geographic region selected by the user. The controller can present a map, for example, from an Internet-based map service (e.g., the Google Maps web service) to the user, and the user can interact with the map to navigate to a desired location by scrolling and/or zooming to a desired view for display area 492.

The user can drag a device icon from the side panel of GUI 490 onto a location of display area 492 associated with the corresponding device. GUI 490 includes a set of exemplary device icons, such as a motion-sensing device icon 294, a power-sensing device icon 295, and a temperature-sensing device icon 297. In some embodiments, the controller can determine a geographic location associated with a device icon based on the location of display area 492 onto which the user placed the device icon. The controller associates this geographic location with the device (e.g., in a device-location repository), which allows the controller to display the device icon in the same location of display area 492 relative to the "space" image, even as the user scrolls or zooms through the space. Also, by attributing a geographic location to the device icon, the user can monitor and/or control the device by using an augmented-reality application on a mobile device.

Location-Based Device Visualizations

In some embodiments, the controller allows a user to view data from one or more devices based on their location or geographic location. The controller can determine a device's geographic location from the device's built-in GPS (global positioning system) sensor, by performing Wi-Fi triangulation, or by obtaining the device's location identifier or geographic location from a device-location repository.

For example, if the user is using a geographic map UI to view the device data (e.g., GUI 490), the controller can overlay the data so that it includes data from sensors associated with the geographic region covered by the map UI. If the map UI is zoomed out so that multiple device icons are overlapping, the controller can replace the overlapping device icons with an aggregated-device icon. In some embodiments, the aggregated-device icon indicates a number of devices that are overlapping within the corresponding region. In some embodiments, if the aggregated-device icon is replacing icons for devices of the same type, controller can generate the aggregated-device icon so that it indicates an aggregated value. The aggregated value can indicate, for example, a mean or median sensor measurement, a sum of the sensor measurements, or any result computed from the sensor measurements using a mathematical function.

Then, if the user zooms further into the map so that one or more of the devices are no longer overlapping with other devices, the controller can update the overlaying icons as necessary. For example, the controller can update the map UI to display the non-overlapping device icons explicitly, and to generate the aggregated-device icon so that it indicates a value computed from the remaining overlapping device icons.

In some embodiments, the controller can provide device data to a user's mobile device for display within an augmented-reality visualization. Similar to GUI 490 (FIG. 4E), the controller provides the mobile device with device data for interfacing devices and/or physical devices that are within the UI display area (e.g., within the user's current view). Because the user may be aiming his mobile device's camera in a direction that includes distant devices (e.g., temperature sensors distributed across a city), the controller may only provide the mobile device with data for devices within a threshold distance from the user's mobile device.

Similar to UI 480 (FIG. 4D), the user's mobile device overlays device icons on top of a real-time image feed captured from the mobile device's camera. As the user pans, tilts, or zooms his mobile device's camera, the augmented reality system updates the overlaid device icons to only include icons for those devices that are within the user's field of view. The augmented reality system selects the icons to overlay on top of the captured images based on the orientation and geographic location for the user's mobile device, as well as known geographic locations for the interfacing devices and physical devices. The user can interact with a device icon to control the type of information that is presented, or to control the interfacing device and/or physical device associated with the device icon.

Generating and Processing Rules

Figure 5A:
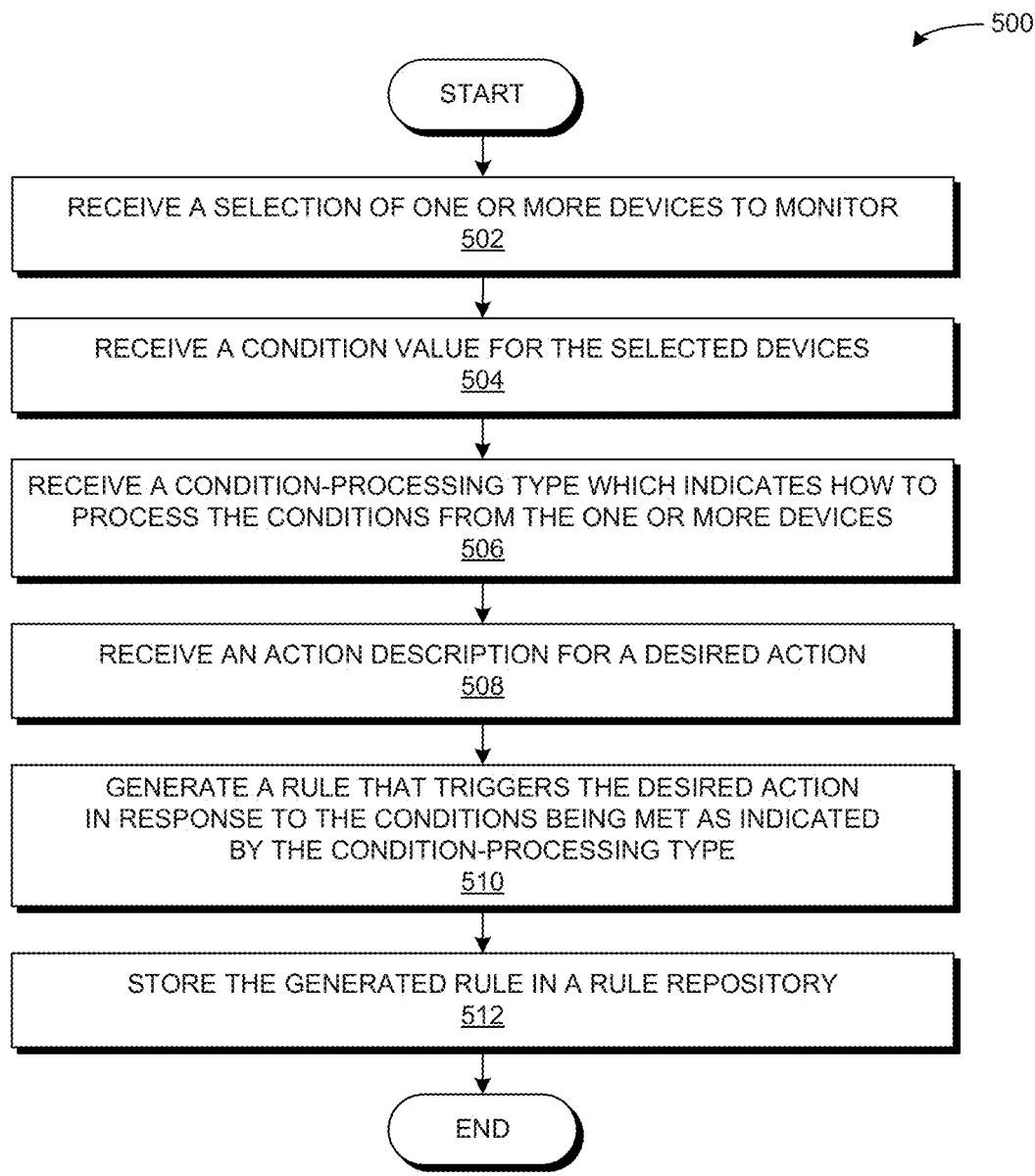
FIG. 5A presents a flowchart illustrating an exemplary method for generating and storing rules for controlling a device in accordance with an embodiment of the present invention.

FIG. 5A presents a flowchart illustrating an exemplary method 500 for generating and storing rules for controlling an interfacing device or a physical device in accordance with an embodiment of the present invention. A rule can include one condition, or can include a plurality of conditions. For example, a single device can be associated with two or more conditions, or there may be a plurality of devices that are each associated with at least one condition. A rule can also include an action that is to be performed when the conditions are met.

During operation, the controller can receive (e.g., via a rule-view GUI) a selection from a user for one or more devices to monitor (operation 502). An interfacing device can include an mPort interfacing device, an mPower or mOutlet interfacing device, or an mSwitch or mDimmer interfacing device.

As mentioned earlier, the mPower or mOutlet interfacing device can implement a power strip that can provide the controller with an amount of power being consumed by each of its outlets, and can control power to an outlet based on an outcome of processing a rule's action description. The interfacing device or controller can determine from the power measurements whether a certain appliance is being used or is in a standby mode. Thus, the user can select an outlet of the power strip to monitor an operating state of a corresponding appliance being powered by the selected outlet, and the user can specify a voltage value as the condition for triggering an action.

The mPort interfacing device can interface with one or more physical sensors to obtain an analog or digital value from each sensor. Thus, the user can select a sensor coupled to the interfacing device, and can specify a raw value (or a descriptive label associated with the raw value) as the condition for triggering an action.

The controller can also receive a condition value for each of one or more devices or nested conditions (operation 504), and a condition-processing type, which indicates how to process the conditions from the one or more devices (operation 506). For example, the condition-processing type can indicate that the rule's conditions are met when either any, all, or a certain number of the individual condition elements have been met (e.g., none, one, two, all, etc.). In some embodiments, a condition element can include a target value for a physical device being monitored.

In some embodiments, a condition element can include a nested condition, which itself has a condition type. Hence, a rule's condition can implement complex logic statements, such as a sum-of-products (SoP) or a product-of-sums (PoS) logic expression. As an example, the rule's condition can include a top-level condition which indicates that all condition elements need to be met (e.g., implementing an "AND" logic expression), and a nested condition can indicate that at least one of the nested condition's elements need to be met (e.g., implementing an "OR" logic expression).

In some other embodiments, a condition element can include a "schedule" condition, which indicates a time instance or time range during which the rule can be processed. An interfacing device can use a schedule's time (e.g., a starting time) to trigger the evaluation of the rule, and/or to determine whether the rule can be processed if the rule is triggered by another event (e.g., by a condition element associated with a physical device).

Further, the controller can receive an action description for a desired action (operation 508). The user can provide the action description by interacting with a rule-view GUI to indicate one or more actions that are to be taken by one or more interfacing devices. These actions can include setting an output voltage for a certain port of the interfacing device to a predetermined target value. In some embodiments, the action description can be in the form of a script that is to be executed by one or more target interfacing devices.

Once the user has configured the rule elements, the controller can generate the rule, which triggers the desired action in response to the conditions being met as indicated by the condition-processing type (operation 510). The controller then stores the generated rule in a rule repository (operation 512), for example, at an interfacing device and/or within a database of an application server.

Figure 5B:
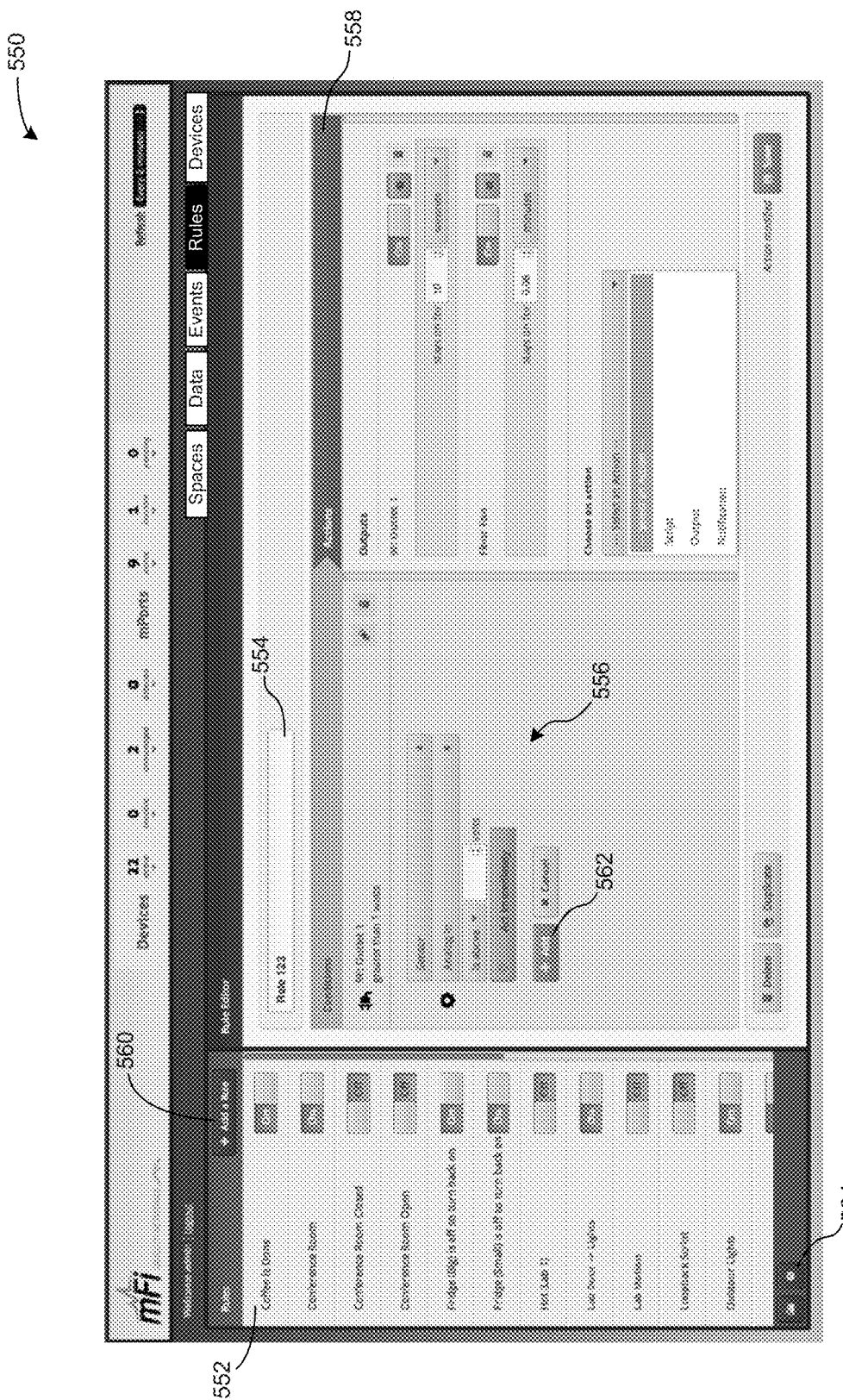
FIG. 5B presents a diagram illustrating an exemplary rule-view GUI of the controller in accordance with an embodiment of the present invention.

FIG. 5B presents a diagram illustrating an exemplary view of the graphic user interface (GUI) of the controller in accordance with an embodiment of the present invention. Like FIG. 4C, GUI 550 includes the central display area, the side panel, and the selectable tabs. In FIG. 5B, the selected tab is the "action" tab, which allows the user to define a set of rules. The side panel displays a list of previously defined rules, such as a door-open rule 552. By clicking on a rule, the user can view the rule in the central display area, which includes a rule-name field 554, a condition field 556, and an action field 558.

Condition field 556 includes a set of condition elements that can trigger the evaluation of the rule, and which are analyzed to determine whether to process the rule's action description. Condition field 556 can. A condition element can include variable that selects a device or nested condition, and can include another variable that defines which conditions associated with the device or condition will trigger the rule. Condition field 556 can also define whether the rule is triggered by meeting any or all listed condition elements (not shown).

In the example illustrated in FIG. 5B, the rule name is "Rule 123," a first device associated with the rule is "Outlet 1," and the corresponding condition-value indicates that the outlet's power needs to be greater than 1 watt for the condition element to be satisfied. A second device associated with the rule is a "Sensor" that monitors an analog input signal, and the user can set a corresponding condition-value indicates a minimum voltage that needs to be reached for the condition element to be satisfied. The user can add a condition element for another physical or interfacing device by selecting an "add" button 562. Also, the user can add a condition element that indicates a schedule for the rule by selecting a "schedule" button 564.

Action field 558 displays actions to be taken once the conditions are met. In the example illustrated in FIG. 5B, once the conditions are met, the system can cause Outlet 1 to remain on for 10 seconds, and can configure a "floor fan" physical device to be turned on for 0.08 minutes. The user can also add other actions to action field 558, such as to execute a script, to configure an output of an interfacing device (e.g., an output that controls the "floor fan"), and/or to send a notification (e.g., by sending an email to a specified email address and/or generates a system alert).

Also, the user can use GUI 550 to edit and update an existing rule 552, to define a new rule by clicking a new-rule button 560, and/or to enable or disable a rule.

Figure 5C:
FIG. 5C presents a user interface illustrating exemplary pre-defined conditions that can be incorporated into a rule's condition set in accordance with an embodiment of the present invention.

FIG. 5C presents a user interface 560 illustrating exemplary pre-defined conditions that can be incorporated into a rule's condition set in accordance with an embodiment of the present invention. Specifically, condition sets 562 include a set of conditions associated with various physical contexts. For example, the conditions "motion by window 2," "motion by window 3," "conference room motion," "Motion: mFi Lab 1" evaluate to "true" when a motion detector has detected a motion near a specific physical space. The condition "beam detector" evaluates to "true" whether an infrared beam has been broken, which indicates that an object has passed through a specific location (e.g., at a door's threshold). The condition "Door 1" and "Door 2" evaluate to "true" when a corresponding door is left open.

Also, "schedules" set 564 can indicate a plurality of time schedules associated with a user context. For example, a "night-time" schedule can indicate when light fixtures should not be turned on within a given building or space, and a "security" schedule can correspond to a time period when nobody is expected to be within a given building. A "water back yard" and a "water front yard" can indicate a time range when sprinklers can be activated to water a back yard, or a front yard, respectively.

Figure 6A:
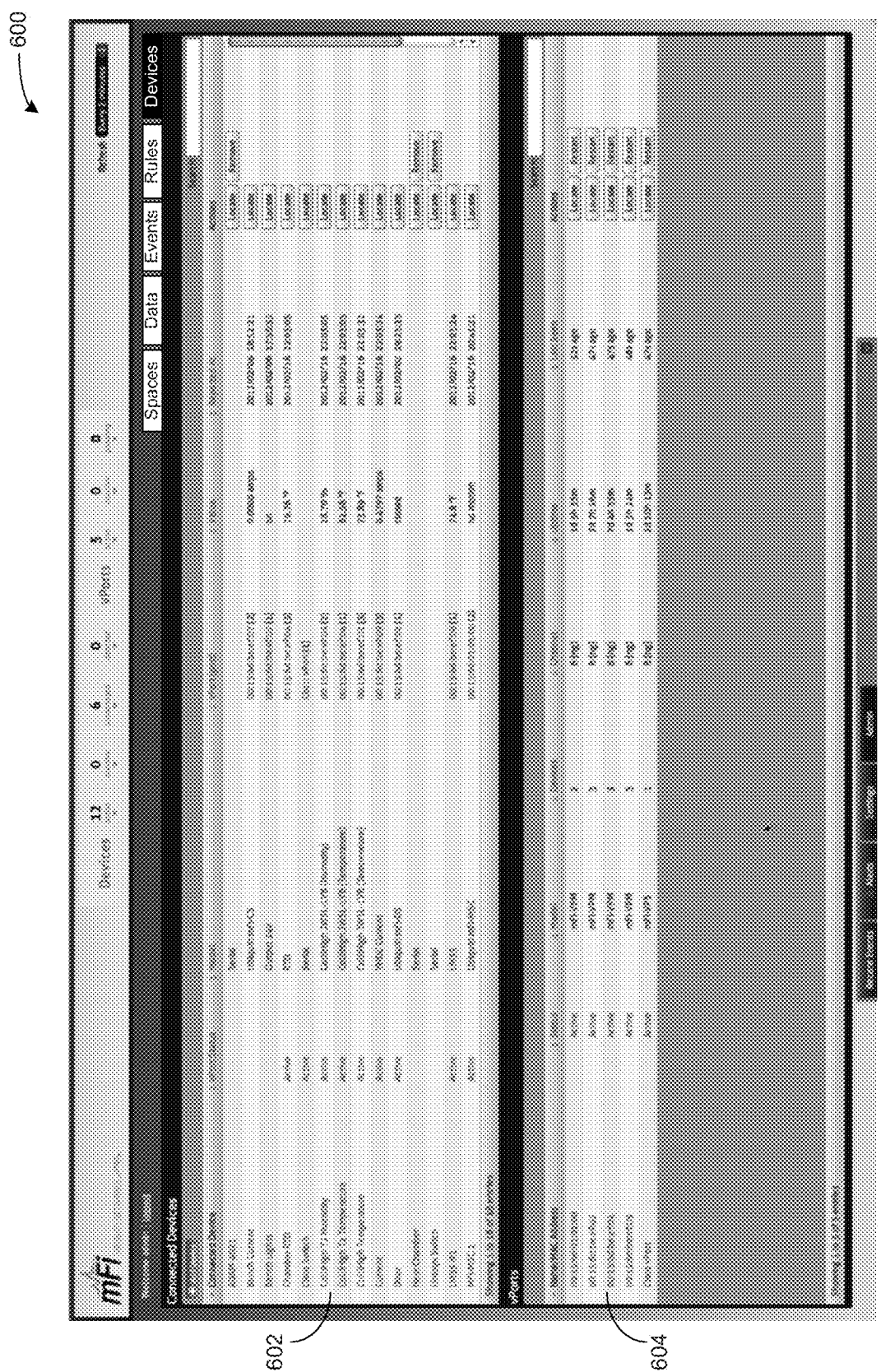
FIG. 6A presents a diagram illustrating an exemplary device-view GUI of the controller in accordance with an embodiment of the present invention.

FIG. 6A presents a diagram illustrating an exemplary device-view GUI 600 of the controller in accordance with an embodiment of the present invention. In FIG. 6, the selected tab is the "device" tab, and the central display area of GUI 600 displays two panels for viewing data related to a set of devices. Specifically, panel 602 displays a list of physical devices that the user can monitor, and a panel 604 displays a list of interfacing devices (mPorts) associated with the user. The user can interact with GUI 600 to manually add or remove physical and/or interfacing devices, and to view a current operating state for these devices.

Figure 6B:
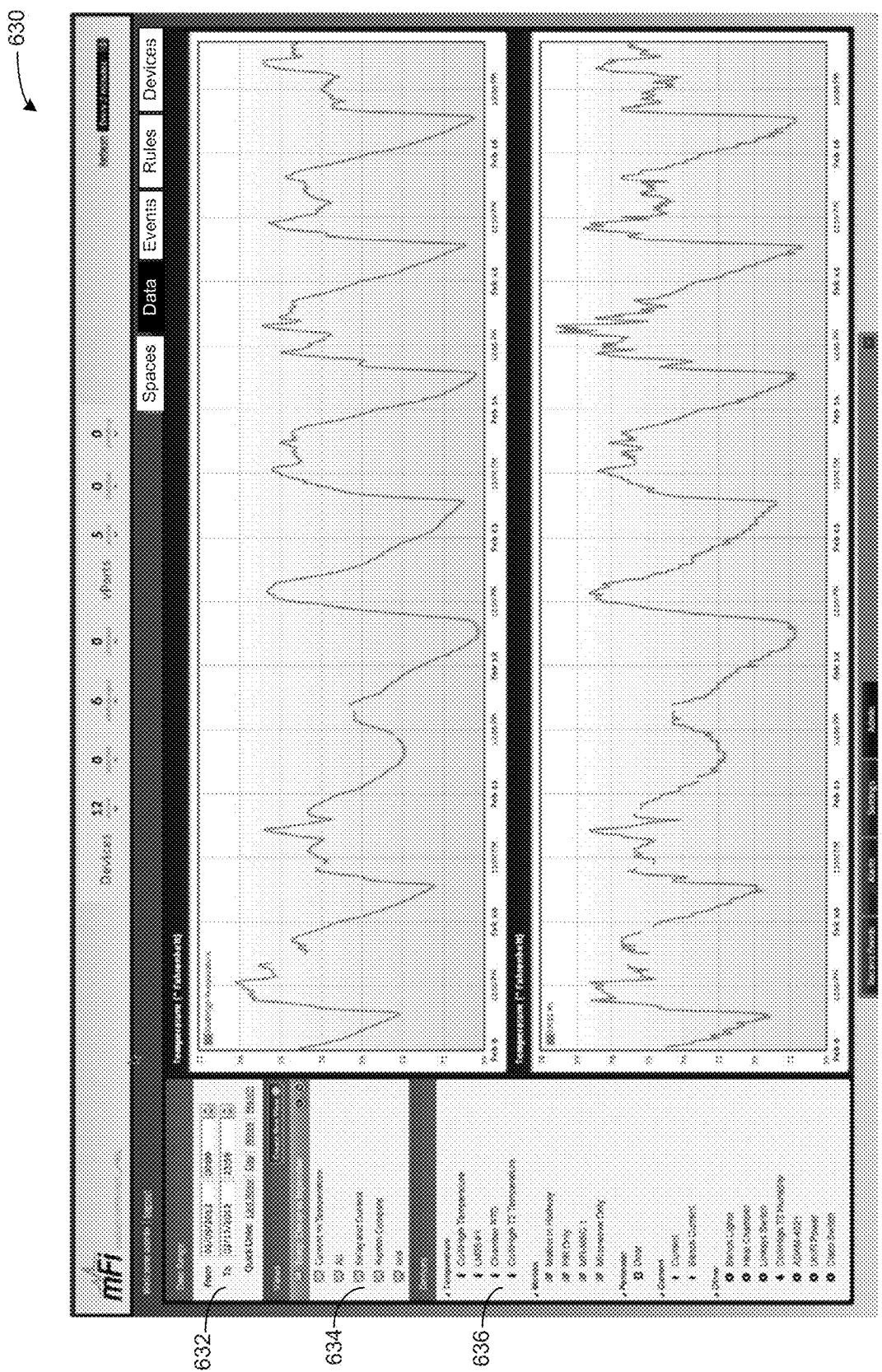
FIG. 6B presents a diagram illustrating an exemplary data-view GUI of the controller in accordance with an embodiment of the present invention.

FIG. 6B presents a diagram illustrating an exemplary data-view GUI 630 of the controller in accordance with an embodiment of the present invention. GUI 630 includes a central display area, a side panel, and a set of selectable tabs associated with various views. In FIG. 6B, the selected tab is the "data" tab, which allows the user to view data gathered from one or more physical and interfacing devices.

The side panel shows three selection panels: a date-range panel 632, a view-selection panel 634, and a device panel 636. Device panel 636 displays a list of available devices categorized by type. By clicking on one or more devices, a user can view the data for the devices on the central display area. The user can use date-range panel 632 to specify a time period for the displayed data, and can use view-selection panel 634 to create a customized view of the data within the specified time period. If the user creates a customized view, the system can re-use the customized view to present data to the user in the format desired by the user. In the exemplary view provided in FIG. 6B, the central display area displays two graphs showing temperature vs. time for two selected temperature sensors.

In some embodiments, the central display area can also display the historical sensor data on a map or space (not shown). For example, the user can select a time period or time range, and the system can update GUI 630 to place a sensor value (e.g., an average sensor value or a graph of sensor values) next to a device icon overlaid over an image for the map or space. GUI 630 can also present the user with a set of events that were triggered by the devices over time. The user may select a "play," "rewind," or "fast forward" button to select a rate for viewing how the sensor event notifications were triggered over time, and/or see how the sensor values change over time. Alternatively, the user can control a scrubber to select a specific time instance or time interval for which to display sensor events and/or sensor values.

GUI 630 also enables mouse-over functions that allow a user to use the mouse to hover over the data timeline to view specific details and to click and highlight specific areas of the timeline to zoom in on a specific section of the timeline. In one embodiment, a magnifying glass icon appears as the user hovers a mouse pointer over the data timeline, and the time frame selected by the user will be highlighted as the user clicks and drags the mouse pointer across the timeline. Once the user completes his time frame selection, all devices in the view will zoom into the selected time frame.

Figure 6C:
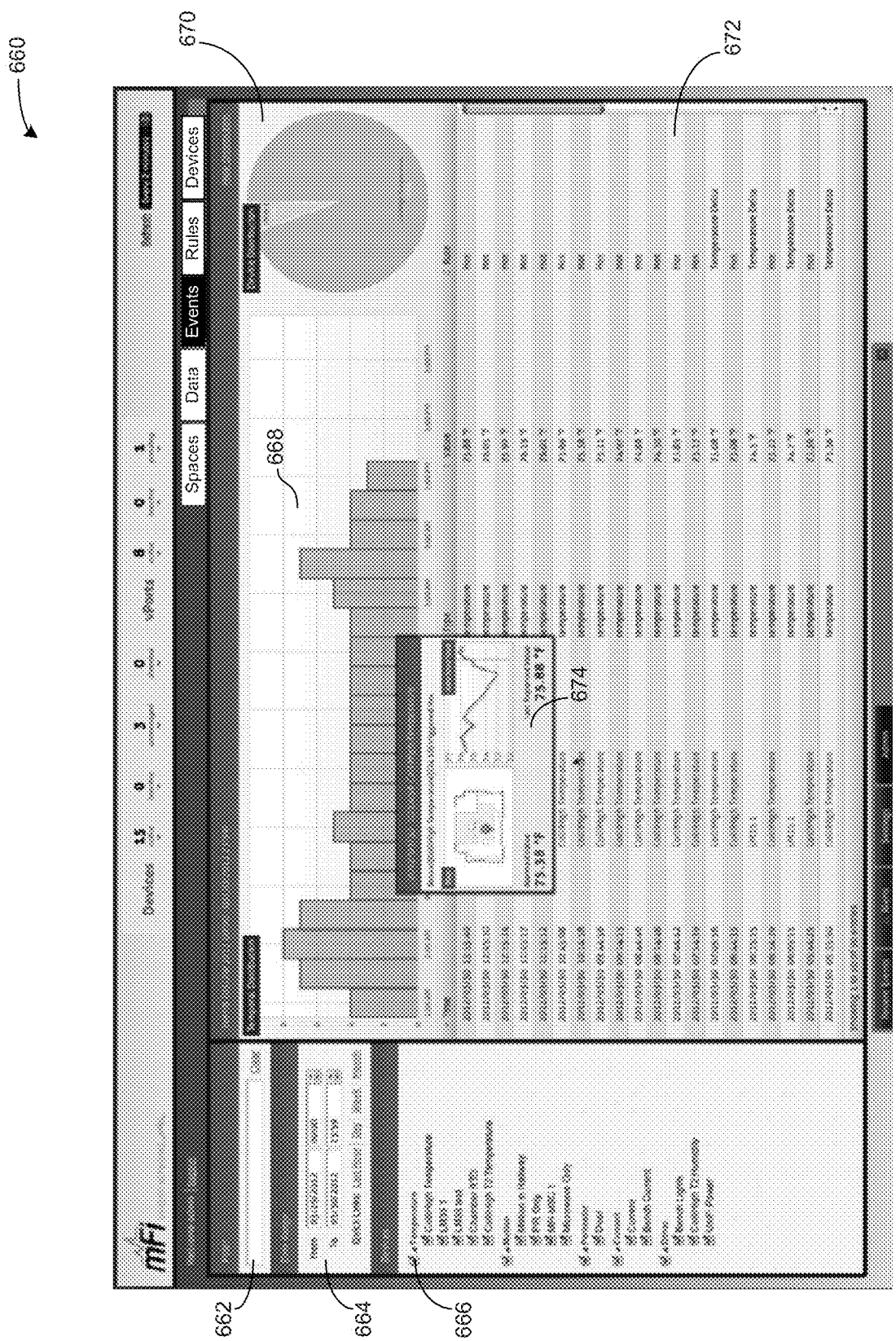
FIG. 6C presents a diagram illustrating an exemplary events-view GUI of the controller in accordance with an embodiment of the present invention.

FIG. 6C presents a diagram illustrating an exemplary events-view GUI 660 of the controller in accordance with an embodiment of the present invention. GUI 660 includes a central display area, a side panel, and a set of selectable tabs. The selected tab in GUI 660 is the "event" tab, which allows the user to see historical events associated a set of devices. Note that an event is referred to a one-time execution of a rule.

The side panel shows three panels: a filter panel 662; a date-range panel 664; and a device panel 666. The central display area displays the historical event information. Device panel 666 displays a list of available devices categorized by type, and the user can select one or more devices for which to view historical event data. Filter panel 662 allows the user to filter data using specific search criteria.

More specifically, a user can enter a text string in filter panel 662, and the controller uses the entered text string to perform a real-time search by removing event data that does not match the entered text string. The user can also use date-range panel 664 to specify a time period for the event data that is to be displayed in the central display area. The controller does not display events that occurred outside of the specified time period.

In GUI 660, the central display area includes multiple display regions, such as regions 668, 670, and 672. Region 668 uses a bar graph to display a temporal distribution of the events generated during the specified timeframe. Each bar represents events that occurred within a unit of time, which by default is set to 2-hour blocks of time. A user can click on a bar to display the events associated with the block.

Region 670 displays a pie graph showing a device-based distribution for events that occurred during the specified time period. The controller can update the temporal distribution graph and the device distribution graph each time the user modifies the search or filter criteria. Region 672 is the main display region that displays the list of events that fit the search or filter criteria. Each event entry indicates: a time field that displays the date and time when the event occurred; a device field that displays the name of the device that generated the event; a type field that display the type of event; a value field that displays the value that triggered the event; and a rule-name field that displays the name of the rule that triggered the event. When the user hovers the mouse over an event, the controller can respond by displaying a window that presents the current location of the device in a corresponding "space" (e.g., by overlaying a device icon on a map, a stored image, or over a real-time video feed for a "space"), a 24-hour snapshot of values, when the event occurred, the alarmed value, and the last reported value, as shown by a region 674.

Interfacing Device Runtime Functionality

Figure 7:
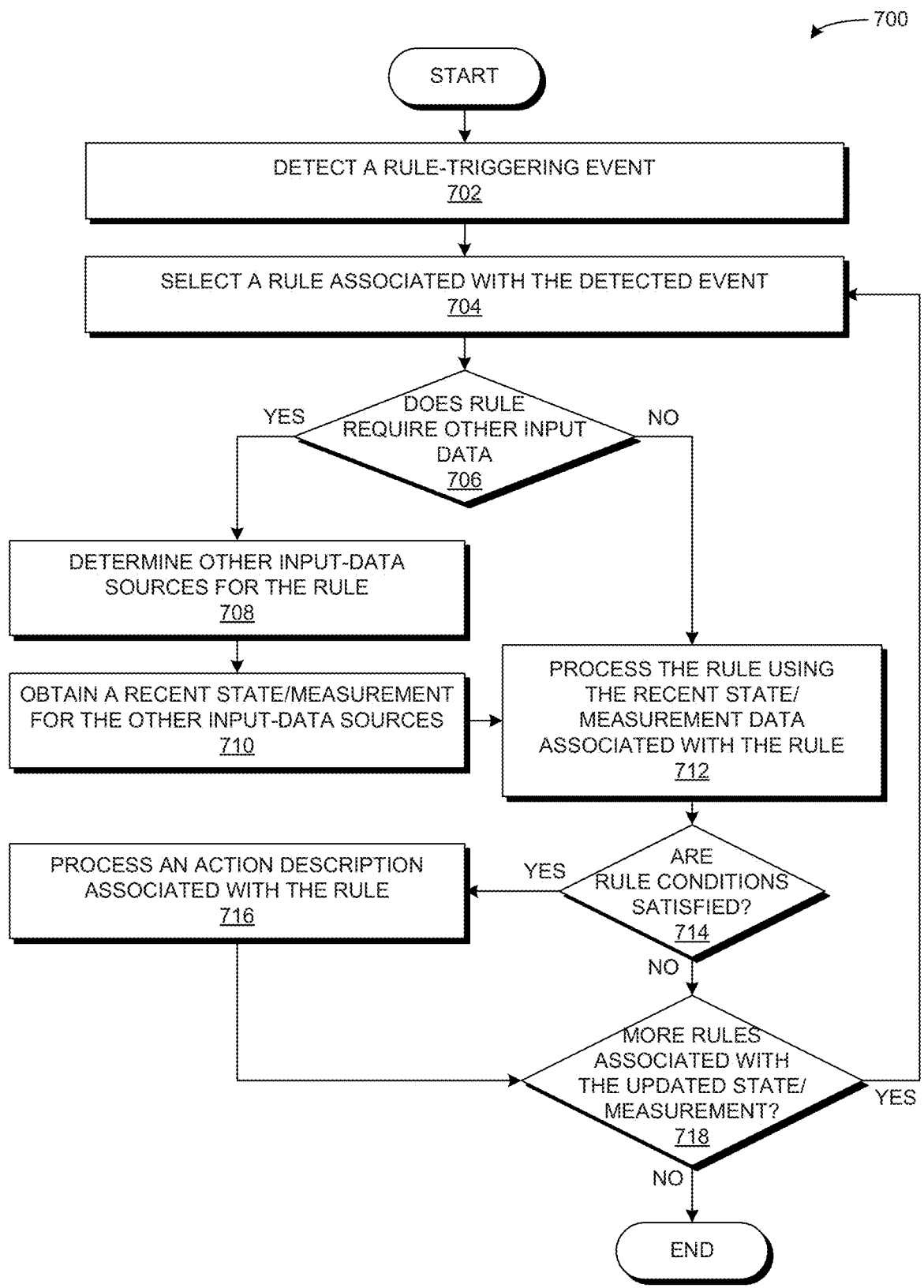
FIG. 7 presents a flowchart illustrating an exemplary method for processing a rule at a local interfacing device in accordance with an embodiment of the present invention.

FIG. 7 presents a flowchart illustrating an exemplary method 700 for processing a rule at a local interfacing device in accordance with an embodiment of the present invention. During operation, the local interfacing device can detect a rule-triggering event (operation 702), and selects a rule associated with the detected event (operation 704). The device can receive the event from a remote device, or can detect the event locally, such as by monitoring a locally-attached physical device and/or monitoring a schedule-condition that triggers a rule. To select the rule that is triggered by the event, the local device can perform a rule-lookup operation that selects, from the rule repository, at least one rule that includes a condition associated with the detected event. For example, the remote device may include an mPort device that receives input from a door sensor, and the local interfacing device can select one or more rules whose actions are triggered when the door sensor indicates that the door is open or closed.

In some embodiments, a condition can include a plurality of sensor variables that need to be evaluated to determine whether the condition is met. Further, the condition can also include a reference to a nested condition, and the device needs to first evaluate the nested condition to determine its outcome. Once the local device selects the rule to process, the local device can determine whether the rule's condition requires other input data (operation 706). The rule can include one or more condition elements associated with, for example, a physical device (e.g., a motion sensor), a schedule-condition, and/or a nested condition. If the rule's condition does not require other inputs, the local device can process the rule using the received data that indicates recent state or measurement data from the remote interfacing device (operation 712).

However, if the rule's condition does require other inputs, the local device can determine other input data sources for the rule (operation 708), such as sensor data, rule-scheduling data, or an outcome of a nested condition. The local device then obtains the necessary data for the other input-data sources (operation 710), and proceeds to operation 712 to process the rule using the obtained state and/or measurement data associated with the rule.

After processing the rule, the local device can determine whether the rule conditions have been satisfied by the device state and/or measurement data (operation 714). If so, the local device can process an action description associated with the rule (operation 716). Otherwise, the local device may ignore the rule or perform a remedial action (e.g., ignore the rule for a determinable time period).

The action description, for example, can include a command to configure one or more target intermediate device or physical device to a predetermined state. As another example, the action description can include a script which performs a complex operation. In some embodiments, the script can compute a target state for the local device by executing a sequence of instructions to process the recent and/or historical state and measurements from one or more physical devices. The local device also determines whether there are more rules associated with the updated state or measurement (operation 718), and can return to operation 704 to select another rule if it exists.

Note that it is possible for two rules with overlapping conditions (e.g., conditions that allow both their actions to be performed) to have conflicting actions. One rule's action may involve turning on a light, while the other rule's action may involve turning the same light off. If both rules were to be processed in "parallel," the execution of the two rules may be performed in any order (not necessarily simultaneously), such that one rule's action does not affect the next rule's execution. In the example above for controlling the light, if both rule's conditions are met and both rules are executed substantially in parallel, the light's final state depends on which rule is processed second. This unexpected order of execution can cause unexpected behavior.

In some embodiments, the local device processes one rule at a time, and processes them in an order specified by the user. For example, the local device performs operation 718 to select another rule in an ordered set only after performing operations 714 and/or 716 to process the previous rule. Also, if executing a rule changes a device's state, the next rule in the ordered set is processed according to the device's new state. Processing rules in this way ensures that there is only one expected behavior for each updated state/measurement that is obtained from an interfacing device.

Cloud-Based Implementation

In some embodiments, the controller resides and operates within a server cluster (e.g., the "cloud"). The controller can monitor and control interfacing devices for a plurality of different users by communicating with each interfacing device using IP packets over a wide area network, such as the Internet. When a user first deploys an interfacing device within his LAN, the user can pair the interfacing device with his personal account at the controller. For example, the user can enter his personal account number and password when configuring the interfacing device. Alternatively, the user can pair his interfacing device without revealing his password, for example, by registering his interfacing device's unique identifier (e.g., a MAC address) with the controller, or by authorizing the interfacing device via an open-authorization protocol.

Also, if the user desires to interact with the controller to monitor or control one or more devices within his LAN, the user can access a UI for the controller via a Web browser, or using an application that interfaces with the controller's Web APIs (e.g., using a mobile application for a smartphone or tablet computer, or using a software application on a personal computer).

Figure 8:
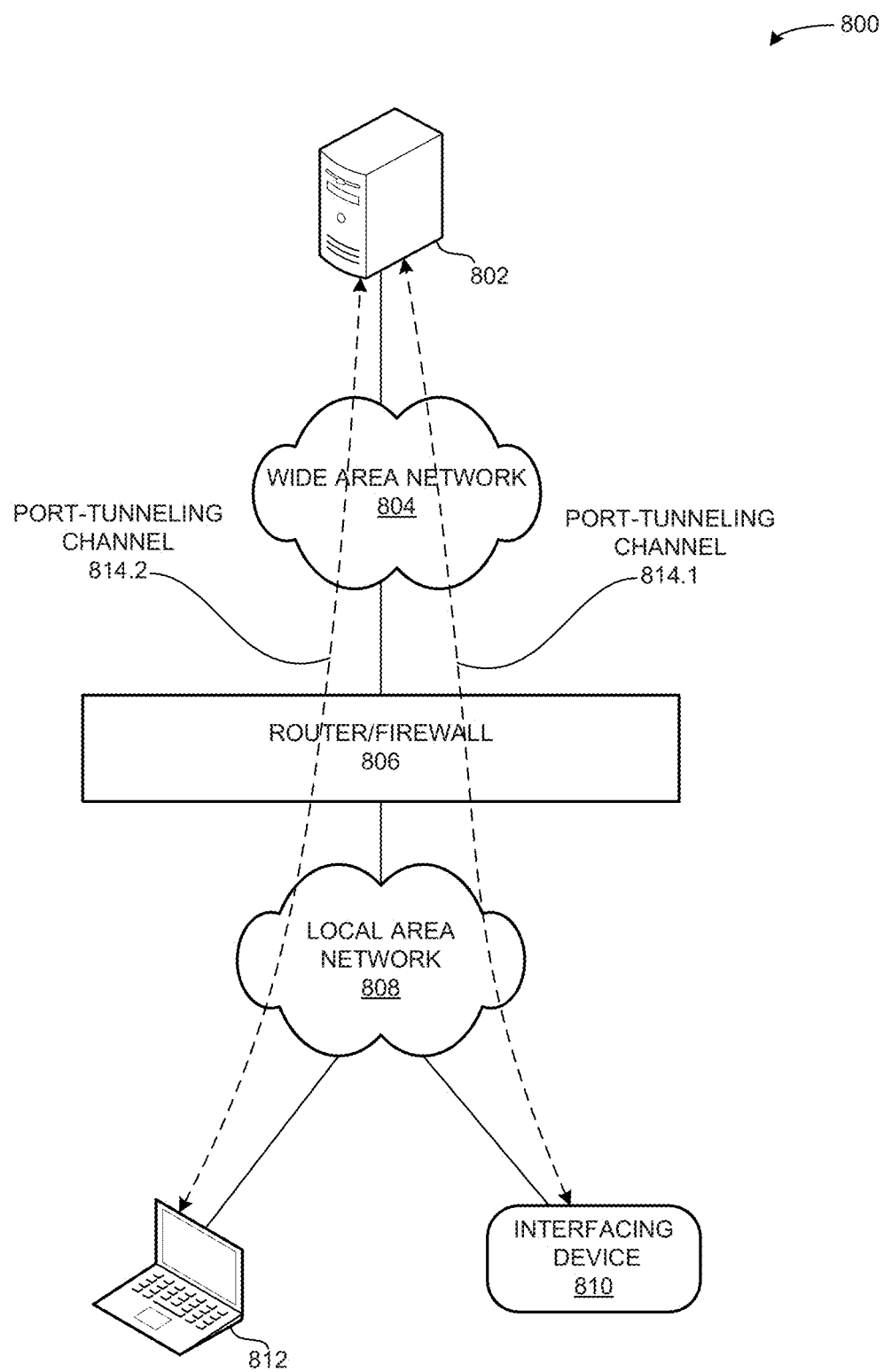
FIG. 8 illustrates an exemplary computer system for interfacing a controller within a server cluster with devices within a LAN.

FIG. 8 illustrates an exemplary computer system 800 for interfacing a controller 802 within a server cluster with devices within a LAN 808. Computer system 800 includes controller 802 coupled to a WAN 804. Computer system 800 also includes an interfacing device 810 and a computing device 812 within a LAN 808, and includes a router/firewall 806 that separates LAN 808 from WAN 804.

During operation, the devices within LAN 808 can establish a network connection to controller 802, or to one or more peer devices within LAN 808. For example, controller 802 can store network-addressing information in a database for each device, and maintains the network-addressing information up-to-date to facilitate communicating with these devices. This allows a user to use a personal computer (e.g., computing device 812) to reconfigure one or more interfacing devices within LAN 808, and/or one or more rules for the interfacing devices. The user's personal computer can include a software application that provides a UI for monitoring and/or configuring the device-interface network, and uploads any configurations to controller 802. The user's personal computer can also include a Web browser that accesses the UI from controller 802.

When the user enters and commits configuration changes to the device-interface network, controller 802 compiles the user's configurations into a device-specific configuration for one or more devices whose configuration needs to be updated, and sends the updated configuration to these interfacing devices via network-addressing information associated with their corresponding network connection. The device-specific configuration can include an update to the interfacing device's network configuration, rule configurations, network-addressing information for one or more peer devices (e.g., to subscribe to data that serve as inputs to one or more rules), etc.

Further, in some embodiments, each device within LAN 808 can also establish a network connection to any device to which it has a data subscription, and/or to any device that subscribes to its data. The device can function as a server to receive and respond to requests for data, from a peer device (or from controller 802). The device can also function as a client device, as it can receive unsolicited data (or a request for data) from a remote device, and can use network-addressing information associated with a network connection to the remote device to push real-time data to the remote device. Thus, even if LAN 808 becomes disconnected from WAN 804 (and thus, from controller 802), the devices within LAN 808 can continue to communicate with each other using the established peer-to-peer connections, and functioning as both servers and clients.

During operation, controller 802 can receive IP packets from device 810 or device 812 via a port-tunneling channel 814.1 or a port-tunneling channel 814.2, respectively. In some embodiments, port-tunneling channels 814 can include network connections created by long-polling requests that temporarily open a port within router/firewall 806 (e.g., created by protocols such as STUN (Session Traversal Utilities for NAT), Comet, etc.). These long-polling requests temporarily open a port within router/firewall 806 that can be used by controller 802 to issue a response packet.

For example, in some embodiments, controller 802 needs to send unsolicited data to interfacing device 810 (e.g., real-time data or a configuration for device 810), or to send unsolicited data to computing device 812 (e.g., real-time data). The devices within LAN 808 can maintain a persistent network connection with controller 802 by periodically communicating a long-polling message/request to controller 802 (e.g., an XHR message when using Comet, or a STUN message when using STUN). The message indicates a unique identifier for the device (e.g., a MAC address), which controller 802 uses to store the most-recent communication port for the device within a device-access repository.

In some other embodiments, port-tunneling channels 814 can include persistent and bidirectional network connection, such as a channel established using the WebSocket protocol. To establish the WebSocket channel, the device within LAN 808 sends to controller 802 a WebSocket handshake request, which upgrades an HTTP session to a WebSocket session and includes a Sec-WebSocket-Key token for controller 802. Controller 802 responds by sending to the device a response that acknowledges the WebSocket session, and includes a Sec-WebSocket-Accept token that is derived from the Sec-WebSocket-Key token.

Recall that each device associated with the interfacing-device network (e.g., controller 802, device 810, or device 812) includes a device-access repository that includes device-accessing information for each computing device or interfacing device of the network. In some embodiments, the device-access repository associates a device's unique identifier with one or more of: a port number associated with the device at router/firewall 806, an IP address for reaching router/firewall 806 (e.g., a WAN IP address), and an IP address for reaching the device within LAN 808. For example, when controller 802 needs to send a data packet to device 810 or device 812, controller 802 can determine the necessary IP address and a recent port number for the device from the device-access repository. Controller 802 can then send the data packet to the IP address via the recent port number of router/firewall 806.

Communicating Real-Time Data Via a Peer-to-Peer Network Connection

In some embodiments, an interfacing device within LAN 808 can communicate real-time data to peer devices by obtaining the device-accessing information for a peer device from the device-access repository. The device-accessing information can indicate a network address associated with a network connection to the target peer device, and can indicate authorization information for the local interfacing device (e.g., a username, a password, and/or a certificate). If the network connection to the peer device is active, the local interfacing device can send the data to the peer device via the network connection, and using any required authorization information.

If the network connection to the peer device is not active, the local interfacing device can establish the peer-to-peer network connection, for example, by obtaining device-accessing information for the peer device from a central controller. This peer-to-peer network connection provides for robust communication between peer devices, as it does not require the devices to communicate via WAN 804, and does not require a central forwarding service (e.g., controller 802) to maintain or complete the network connection between the peer interfacing devices.

Communicating Real-Time Data Via a Forwarding Service

In some embodiments, an interfacing device within LAN 808 may not be able to establish a peer-to-peer network connection, for example, when two peer devices reside within different network domains. In this instance, the local interfacing device can communicate real-time data to peer devices by using a forwarding service, which can be provided by controller 802, or can be provided by a server that is separate from controller 802 (not shown).

The device-accessing information can indicate network-addressing information associated with a network connection to the forwarding service, a unique identifier for the peer device, and authorization information for the local interfacing device (e.g., a username, a password, and/or a certificate). For example, if the local device does not have a network connection to the peer device, the local interfacing device can send the data to the peer device via the forwarding service, and using any required authorization information. This allows two peer devices to communicate real-time data with each other, even when the two devices are not within the same network domain.

As a further example, the local interfacing device can receive real-time data from a plurality of peer devices via the network connection to the forwarding service. The forwarding service can maintain a network connection to each interfacing device, and can use a network connection to a respective interfacing device to send real-time data from any other peer device to which the respective device has subscribed. This allows the interfacing device to receive real-time data from a plurality of peer devices, without maintaining a network connection to each individual peer device.

In some embodiments, a user's personal computing device can communicate directly with the interfacing devices, or via a data-forwarding service if a direct network connection is not available. When the user turns on the computing device (or launches a device-monitoring application), the computing device can use network-addressing information that the user's device has stored for a previous snapshot of the network configuration to communicate with other devices. The user's computing device can also obtain the network-addressing information from the central controller if the information is not available locally.

Figure 9:
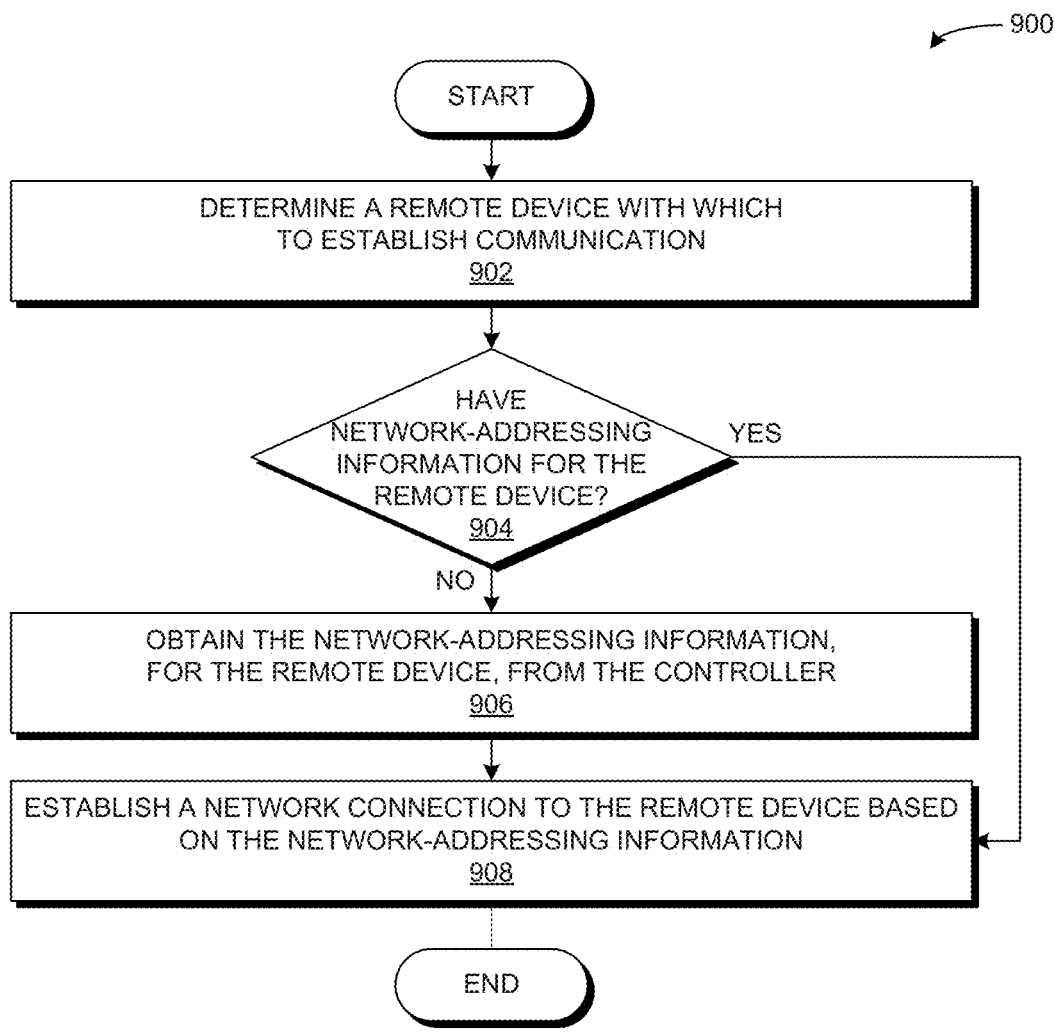
FIG. 9 presents a flowchart illustrating an exemplary method for establishing a network connection to a remote device based on network-addressing information received from a central controller for the remote device in accordance with an embodiment of the present invention.

FIG. 9 presents a flowchart illustrating an exemplary method 900 for establishing a network connection to a remote device based on network-addressing information received from a central controller for the remote device in accordance with an embodiment of the present invention. As mentioned above, the network connection can include a bidirectional channel established using the WebSocket protocol, or a network connection that is maintained using the STUN protocol, the Comet protocol, or any other communication protocol now known or later developed.

During operation, the user's computing device determines a remote device with which to establish communication (operation 902), and determines whether the computing device has network-addressing information for the remote interfacing device (operation 904). The computing device can determine that it needs to establish a network connection with a remote device in response to the user interacting with a user interface for monitoring, configuring, and/or controlling the interfacing devices. The user's computing device can determine whether it has network-addressing information for the remote device, for example, by searching for a corresponding entry of the device-access repository.

If so, the computing device establishes a network connection with the remote device based on the network-addressing information (operation 908), such as a peer-to-peer network connection, or a network connection via a data-forwarding service.

However, if the computing device does not have the network-addressing information, the computing device obtains the network-addressing information for the remote device from the controller (e.g., controller 802 of FIG. 8) (operation 906). The computing device then proceeds to operation 908 to establish the communication with the remote device based on the network-addressing information.

Figure 10:
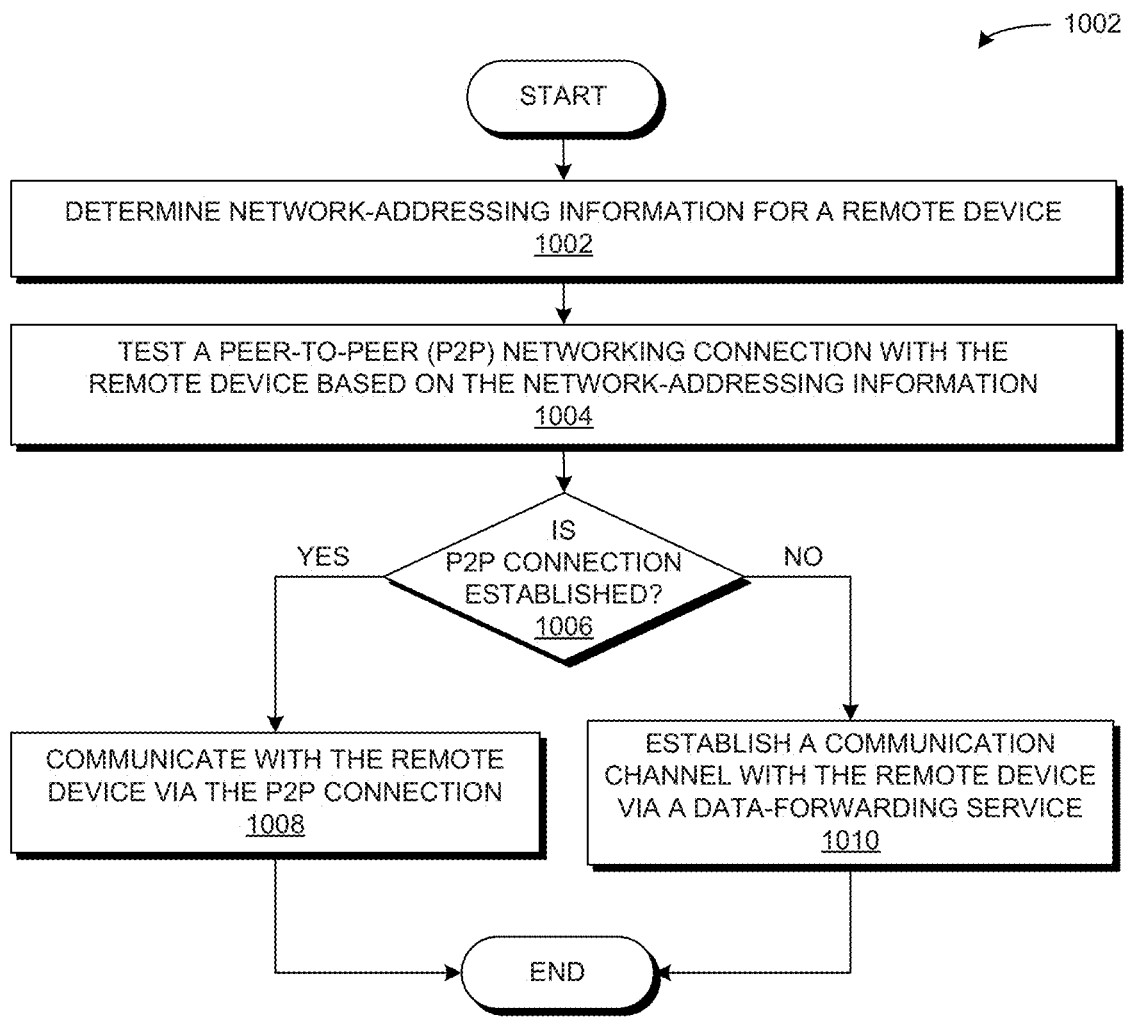
FIG. 10 presents a flowchart illustrating an exemplary method for establishing a network connection with a remote device based on a stored network-addressing information for the remote device in accordance with an embodiment of the present invention.

FIG. 10 presents a flowchart illustrating an exemplary method 1000 for establishing a network connection with a remote device based on a stored network-addressing information for the remote device in accordance with an embodiment of the present invention. During operation, the user's computing device determines network-addressing information for a remote device (operation 1002), and tests a peer-to-peer connection with the remote device based on the network-addressing information (operation 1004). In some embodiments, the computing device can test the peer-to-peer connection by sending a request to access a predetermined file from the peer device. The file can include any file that is expected to be stored by the target remote device, such that a successful request confirms that the desired interfacing device is reachable via the peer-to-peer connection.

The computing device then determines whether it succeeded in establishing a peer-to-peer connection with the remote device (operation 1006). If so, the computing device communicates with the remote device via the established peer-to-peer network connection (operation 1008). Otherwise, the computing device can establish a communication channel with the remote device via a data-forwarding service (operation 1010).

Device Authentication and Communication Security

In some embodiments, to establish a peer-to-peer network connection, a device at one end of the network connection needs to be authorized or authenticated by the other device of the network connection. For example, two devices may communicate with each other by each establishing a one-way channel to the other device. The device that establishes a given one-way channel can function as the communication client (e.g., the receiver that subscribes to data), and the device that hosts the data can function as the communication server (e.g., the sender that streams the real-time data being subscribed to).

A one-way channel may be established and maintained using the STUN protocol, the Comet protocol, XHR messages, or any other communication protocol now known or later developed. However, two devices may establish a persistent bidirectional communication channel, such as a channel established using the WebSocket protocol, or any other bidirectional communication protocol now known or later developed.

In some embodiments, the controller can provide to each interfacing device a username and password for each communication client that can subscribe to data from the interfacing device. The password can be in the form of a plaintext value, a hash value, or a salted hash. The communication client can provide a username and a password to the communication server to establish a one-way network connection, and the communication server can authorize the communication client if the username and password match the known username and password received from the controller. The two devices can establish a bidirectional network connection by each providing a username and password to the other device, and authorizing the other device based on the received username and password.

If the controller provides the client passwords to the interfacing devices (communication servers) as an encrypted hash value or salted hash, the controller can also provide the interfacing devices with an encryption key (and salt if necessary) for generating the hash value or salted hash. Each interfacing device can receive one key and salt that can be used by its communication clients. The controller does not provide the interfacing devices with a corresponding decryption key for decrypting the password from the hash or salted hash. Thus, when establishing the network connection, the interfacing device can provide the encryption key and salt to the communication client, so that the client does not expose its personal password to the interfacing device. The communication client can use the encryption key and salt to generate the hash value or salted hash for the password, and provides the username and the password hash or salted hash to the communication server to establish a secured network connection.

In some embodiments, the controller can provide, to each interfacing device, a digital certificate that indicates a domain to which the interfacing device belongs, and can indicate other domains with which the interfacing device can communicate. The controller can function as a certificate authority (CA) to sign the digital certificate, or can interact with a third-party CA to assign a digital certificate to an interfacing device. To establish a one-way network connection, a communication client can provide its digital certificate to the communication server, and the communication server can authorize the communication client if the digital certificate is valid, and if the digital certificate indicates a domain to which the communication server belongs. Thus, in the interface-device network, communication occurs between devices that belong to the same domain, or between devices that are configured or allowed to communicate with devices in each others' domains. The two devices can establish a bidirectional network connection by each providing a digital certificate to the other device, and authenticating the other device based on the received digital certificate.

The two interfacing devices can also communicate over the persistent channel using encrypted data. For example, the digital certificate can also include a communication client's public key to facilitate the interfacing devices to communicate over a secure channel. The communication server can use the public key to encrypt data that is to be sent over the network connection, and the communication client can use a corresponding private key to decrypt the data that it receives from the communication server. Alternatively, the two devices can secure their data using the Kerberos protocol, or by tunneling their data through an encrypted connection, such as using a secure sockets layer (SSL) protocol or a transport layer security (TLS) protocol.

Load-Balancing

Figure 11:
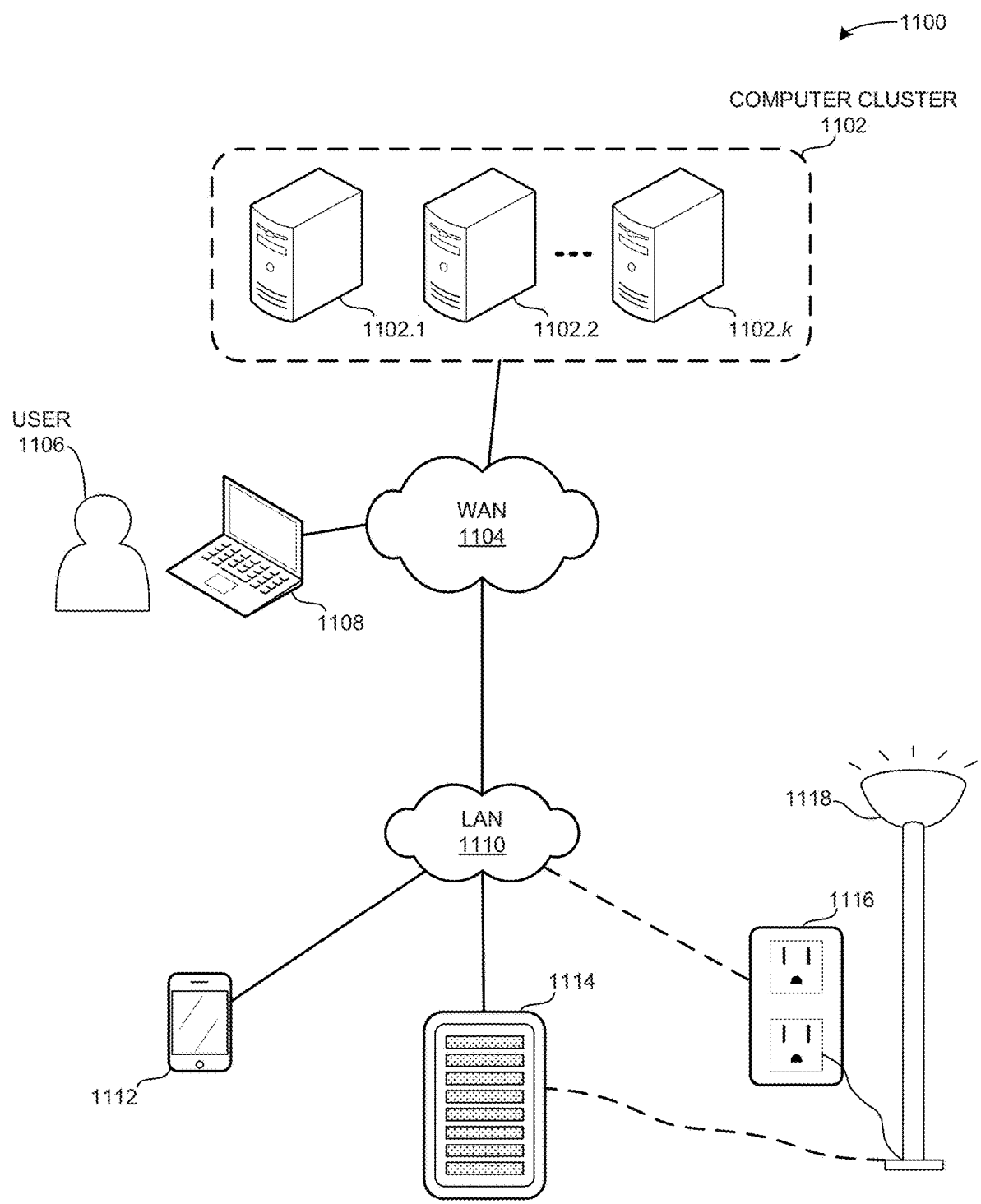
FIG. 11 illustrates an exemplary system architecture that includes an mDimmer device in accordance with an embodiment of the present invention.

FIG. 11 illustrates an exemplary distributed system 1100 for an interfacing-device network that includes a controller deployed on a computer cluster 1102 in accordance with an embodiment of the present invention. Computer cluster 1102 can include a plurality of computing nodes 1102.1-1102.$k$, which can reside within a single location and interconnected via a local network, or can be deployed across a plurality of geographic locations and interconnected via WAN 1104.

In some embodiments, a system administrator can deploy a set of computing nodes at various geographic locations, and can deploy redundant databases across the various geographic locations. Further, because the redundant databases across distributed system 1100 are synchronized, the plurality of computing nodes of the computer cluster 1102 can function as a single computing entity.

As interfacing devices are added or removed to/from distributed system 1100, the administrator can adjust the computing capacity provided by distributed system 1100 at various geographic locations to account for the computing demands of these geographic locations. For example, the administrator can deploy or remove computing nodes at a given geographic location as interfacing devices are added or removed from this location. Also, as use of the central controller fluctuates over time, computer cluster 1102 can load-balance the loads across computing devices 1102.1-1102.$k$, which increases the responsiveness of each computing node, and also increases the responsiveness of computer cluster 1102 as a whole.

Exemplary Application: Light Dimmer

In some embodiments, system architecture 1100 can also include a dimmer 1114 and a light fixture 1118. Dimmer 1114 can be in the same room as light fixture 1118, or can control light fixture 1118 from a remote location via WAN 1104 and/or LAN 1110. For example, light fixture 1118 can be coupled to dimmer 1114, such that dimmer 1114 can include a power regulator that controls an amount of power being provided to light fixture 1118. Alternatively, light fixture 1118 can be coupled to a power outlet 1116 that includes the power regulator which controls the amount of power to light fixture 1118, and dimmer 1114 can send commands to power outlet 1116 via LAN 1110.

In some other embodiments, dimmer 1114 can be in a different room than light fixture 1118, and can control a brightness level for light fixture 1118 by sending commands to power outlet 1116 via the computer network. For example, light fixture 1118 can include a stage light, and dimmer 1114 may be installed within a sound and lighting control room behind the stadium seats. A lighting technician in the control room can interact with dimmer 1114 to control one or more light fixtures, at which point dimmer 1114 can generate and send device-controlling event to one or more light fixtures via LAN 1110.

As another example, a security agency may install a plurality of light fixtures at key locations throughout a bank (e.g., within a bank vault), so that they can be controlled remotely via a dimmer 1114 within the security agency's headquarters. If a security agent desires to inspect the bank's premises, the security agent can interact with dimmer 1114, at which point dimmer 1114 can generate and send device-controlling event to one or more light fixtures via WAN 1104.

Recall that, in some embodiments, dimmer 1114 can maintain a peer-to-peer network connection with each target light fixture (e.g., light fixture 1118), and can send the device-controlling event to these light fixtures via their respective network connection. Dimmer 1114 and the plurality of light fixtures (e.g., light fixture 1118) can maintain a network connection to a forwarding service (e.g., a forwarding service provided via computer cluster 1102) via WAN 1104. Also, dimmer 1114 can provide the device-controlling event to the forwarding service via the network connection, and can indicate which light fixtures are to receive the device-controlling event. At this point, the forwarding service can communicate the device-controlling event to the specified light fixtures via the network connections between the forwarding service and the specified light fixtures (e.g., via WAN 1104 and LAN 1110).

In some embodiments, a device of the interfacing-device network can keep a log of the events that it has performed.

When dimmer 1114 receives a UI event via the touch-screen interface, dimmer 114 can store the UI event in the log. Dimmer can also process the UI event (e.g., a finger swipe) to determine an action to perform, and generates a device-controlling event based on the UI event. If the user performs a downward swipe on the touch-screen interface, dimmer 1114 can determine that the user is intending to decrease a lighting level of a corresponding light fixture 1118, and can determine a target light level based on a speed and/or a distance of the downward finger swipe. Dimmer 1114 can also record the device-controlling event in the event log.

If dimmer 1114 is configured to control light fixture 1118 directly (e.g., via a built-in power regulator whose output is electrically coupled to light fixture 1118), dimmer 1114 can adjust a power level provided to light fixture 1118 based on the device-controlling event. Also, dimmer 1114 can monitor an amount of power consumed by light fixture 1118 after adjusting the power level, and can create an entry in the event log to record the detected power level.

On the other hand, if dimmer 1114 is configured to control outlet 1116, dimmer 1114 can send the device-controlling event to outlet 1116. Then, when outlet 1116 receives the device-controlling event, outlet 1116 can store the received user-control event in the log, and adjusts a power level provided to light fixture 1118 based on the device-controlling event. Dimmer 1114 can also monitor an amount of power consumed by light fixture 1118 after adjusting the power level, and can record the detected power level in the event log.

The controller and/or a user can compare log entries from various peer devices in a communication chain to debug event conflicts. For example, a user 1106 may have generated a rule for dimmer 1114 that configures dimmer 1114 to increase the brightness of light fixture 1118 to a predetermined level when a built-in motion sensor detects a motion. Thus, if a user interacts with the touch-screen interface of dimmer 1114 to dim or turn off light fixture 1118, dimmer 1114 will detect the user-control event via the touch-screen interface, and may also detect a motion-sensing event via the built-in motion sensor. These events may cause dimmer 1114 to turn on light fixture 1118 shortly after having executed the user's command to dim or turn off light fixture 1118, which may be an unintended consequence.

Recall that when an interfacing device includes one or more rules that produce conflicting events, the interfacing device can process the rules in a predetermined sequence so that the last rule executed produces the final outcome. Thus, if the user has created a sequence of rules that do not solve conflicts in a desirable way, the user can analyze the event logs for on or more interfacing devices to determine a new sequence of rules that resolves the conflicts as desired.

For example, the user can analyze the event logs from dimmer 1114 to determine that dimmer 1114 processes a rule associated with the motion sensor (which turns on light fixture 1118) after processing a rule associated with the touch-screen interface (which dims or turns off light fixture 1118). The user can correct this by causing dimmer 1114 to process the rule for the touch-screen interface after processing the rule associated with the motion sensor.

As another example, by analyzing the event logs, the user may determine that after dimmer 1114 processes the user's touch-screen event to dim or turn off light fixture 1118, dimmer 1114 detects a motion-sensing event as the user moves his hand away from the touch-screen interface. The user can correct this by configuring dimmer 1114 to disable the rule associated with the motion sensor for a predetermined period of time, or until the motion sensor does not detect motion for a predetermined period of time.

In some embodiments, a device's log can store a number of historical log entries for a determinable time interval (e.g., log entries for the past week), and/or that are limited by a determinable quantity (e.g., a maximum of 1000 log entries) or a determinable file size (e.g. a maximum of 5 MB).

Configuring the Device-Interface Network

Recall that one or more computing devices can interact with the controller to manage and configure the interfacing-device network. For example, a user can interact with a personal computing device to provision and configure a new interfacing device of the interfacing-device network, and/or to deploy one or more rules onto the interfacing device. Once the user commits the configurations for the device, the controller can add the new device to the network, and can establish peer-to-peer network connections between the new device and other devices with which it needs to exchange real-time data.

However, in some embodiments, peer devices that reside in different network domains may not be able to establish a peer-to-peer connection. Thus, to establish network connections between the peer devices, the controller can configure the peer devices to communicate with each other via a forwarding service. The forwarding service can be implemented as a part of the controller, or can be a separate Internet service available to the peer devices of the network.

In some embodiments, the interfacing-device network includes at most one controller that configures the interfacing devices to operate within the network. For example, computer cluster 1102 can implement a controller for interfacing-device network 1100. If a user needs to reconfigure the network structure using a network device (e.g., laptop 1108 coupled to WAN 1104, or smartphone 1112 of LAN 1110), the network device needs to make this network reconfiguration via the master controller.

If a second user is also interacting with the controller to configure the network, the controller can push any changes made by the first user to the second user's computer to prevent the two users making redundant or conflicting changes to the network configuration. Also, when a user commits his changes to the network configuration, the controller can compile a configuration file for each affected interfacing device, and can download the configuration file for each interfacing device being modified.

Note that if the connection to the centralized controller goes offline (e.g., the controller goes offline, or a LAN loses connection to the Internet), the interfacing devices can continue to process the rules and communicate via their peer-to-peer network connections. However, the network device may not be able to reconfigure the network configuration, given that the master controller is not available to provision new interfacing devices, to compile and distribute new or updated rules, or to reconfigure the network connections between peer interfacing devices.

In some embodiments, the interfacing-device network can include more than one centralized controller. For example, the network can include a primary controller that is used to make any reconfigurations to the network, and can include one or more secondary or backup controllers that can be used to reconfigure at least a portion of the network in the case that the primary controller becomes unavailable.

Figure 12A:
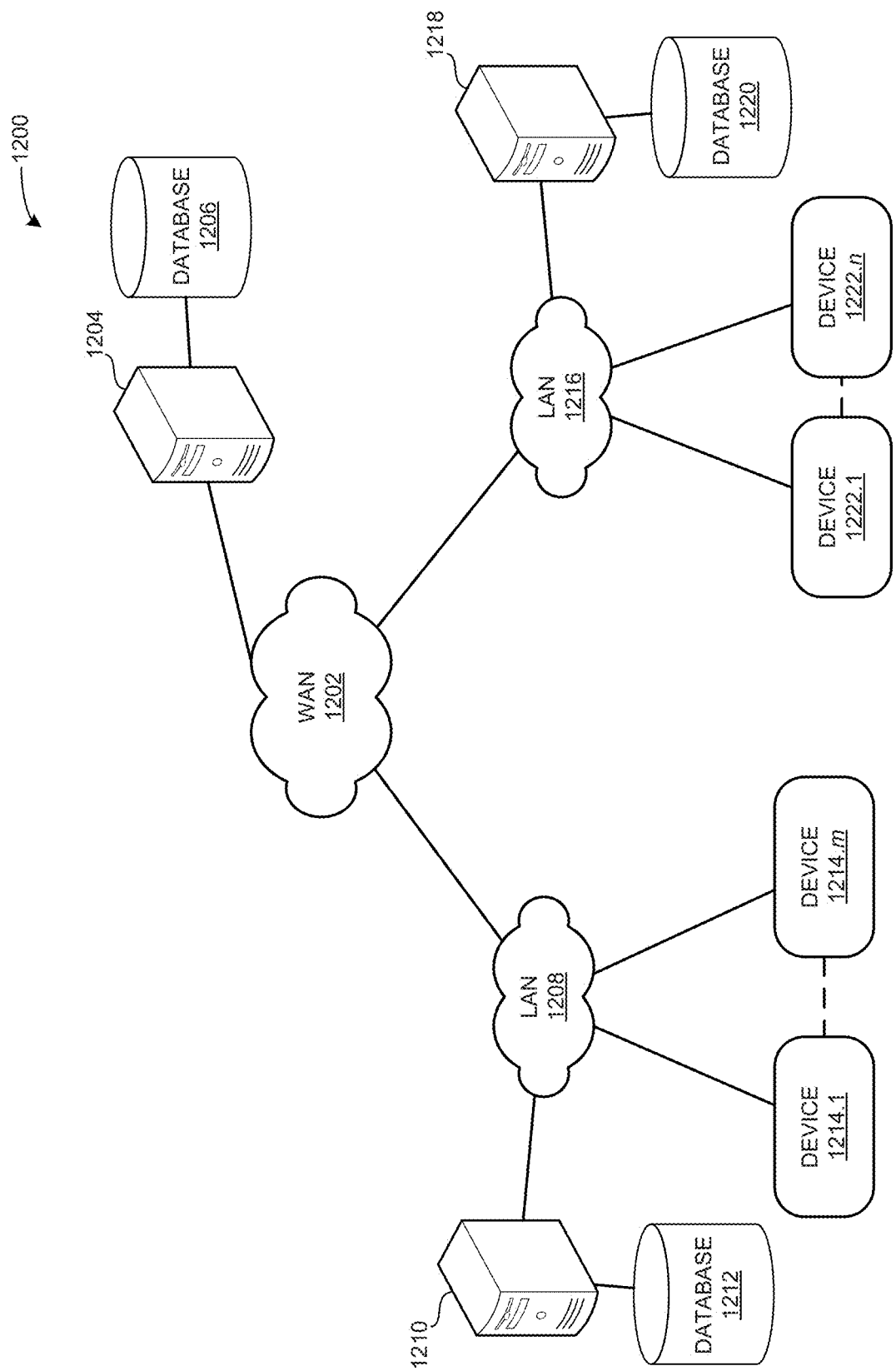
FIG. 12A illustrates an exemplary system architecture that includes a central controller and one or more LAN controllers with mirrored databases in accordance with an embodiment of the present invention.

FIG. 12A illustrates an exemplary system architecture 1200 that includes a primary controller 1204 and one or more LAN controllers with mirrored databases in accordance with an embodiment of the present invention. For example, primary controller 1204 can include or be coupled to a database 1206 that stores configuration information and historical data for a plurality of interfacing devices (e.g., interfacing devices within LANs 1208 and 1216). LAN 1208 can include a local controller 1210 coupled to a database 1212, which stores configuration information and historical data for interfacing devices within LAN 1208. Also, LAN 1216 can include a local controller 1218 coupled to a database 1220, which stores configuration information and historical data for interfacing devices within LAN 1216.

In system architecture 1200, the local controllers keep their local database synchronized with the primary controller's database. Database 1212 can mirror a plurality of table entries of database 1206 that are associated with devices 1214.1-1214.$m$ of LAN 1208. Similarly, database 1220 can mirror a plurality of table entries of database 1206 that are associated with devices 1222.1-1222.$n$ of LAN 1216. Thus, if system architecture 1200 includes interfacing devices that are distributed across a plurality of domains (e.g., across various cities), the amount of data stored by local controllers 1210 and 1218 in databases 1212 and 1220 is substantially small in comparison to the amount of data stored in database 1206 by the primary controller.

In some embodiments, local controller 1210 can monitor and/or control a plurality of interfacing devices within LAN 1208. Also, an administrator can interact with local controller 1210 to reconfigure a set of rules that are to be executed by interfacing devices 1214 within LAN 1210, and controller 1210 can reconfigure devices 1214 based on the new set of rules. However, in some embodiments, local controller 1210 may not provision new devices to add to the interfacing-device network, and/or may not remove devices from the network. A system administrator can add an interfacing device to the network by interacting with primary controller 1204 to provision the new device. Primary controller 1204 can assign a digital certificate for the new device, configure the new device to establish a network connection with other peer devices (e.g., to send or receive subscribed data), and can configure the new device to process a set of rules.

Controller 1210 may also be prevented from reconfiguring an existing interface device if controller 1210 has an outdated version of the database (e.g., when database 1212 becomes out of sync from a portion of database 1206 associated with LAN 1208). This requirement prevents controller 1210 from reversing a previous configuration made by primary controller 1204 or any up-to-date controller (e.g., controller 1218). For example, if local controller 1210 goes offline, and controller 1204 reconfigures one or more of interfacing devices 1214.1-1214.$m$, the configuration data within database 1212 can become out-of-date. As another example, if local controller 1210 loses communication with central controller 1204, and local controller 1210 reconfigures one or more of interfacing devices 1214.1-1214.$m$, the configuration data within database 1206 can become out-of-date.

Each interfacing device may store a configuration version number (e.g., a strictly increasing number or a timestamp), which indicates a local unique identifier for the device's configuration. Also, each database can store a recent configuration version number for the devices to which it is associated, which allows a corresponding controller to determine whether the database is out-of-date prior to reconfiguring an interfacing device. If the controller attempts to reconfigure an existing interfacing device, the controller can first determine whether the corresponding database is up-to-date with respect to the interfacing device being reconfigured.

If the controller determines that its most-recent configuration version number for an interfacing device matches that of the interfacing device, the controller can proceed to reconfigure the interfacing device. However, the controller can perform a remedial action if the controller determines that its most-recent configuration number does not match that of the interfacing device (e.g., its most-recent version number is smaller than that of the interfacing device). The remedial action can include alerting a user of the version discrepancy, and prompting the user to specify whether he desires to reconfigure the interfacing device based on the older device configuration of the out-of-date database. Alternatively, the remedial action can include reconfiguring the interfacing device at a later time after the database is brought up-to-date.

Alternatively, in some embodiments, controller 1210 can become the primary controller for interfacing devices within LAN 1208 in the event that LAN 1208 becomes decoupled from controller 1204 (e.g., LAN 1208 becomes decoupled from WAN 1202, or controller 1204 goes offline). Controller 1210 can be allowed to provision interfacing devices to add to the network, or to remove interfacing devices from the network. Controller 1210 can keep track of the changes to the network within database 1212. Then, once controller 1210 regains a connection to controller 1204, controller 1210 can provide the changes to the network to controller 1204, and controller 1204 updates database 1206 to reflect these changes to the network.

Also, once controller 1204 synchronizes database 1206 with database 1212, controller 1210 can proceed to resign its status as a primary controller, at which point controller 1204 becomes the primary controller for LAN 1208. If a new interfacing device within LAN 1208 is to communicate with a device outside of LAN 1208, primary controller 1204 can re-provision the new device so that the new device can interact with devices outside of network 1208. For example, primary controller 1204 can provide the new device with a digital certificate that is valid outside of LAN 1208, and can reconfigure the new device so that the new device establishes a network connection with one or more devices outside of LAN 1208 (e.g., via a peer-to-peer channel, or via a data forwarding service).

Figure 12B:
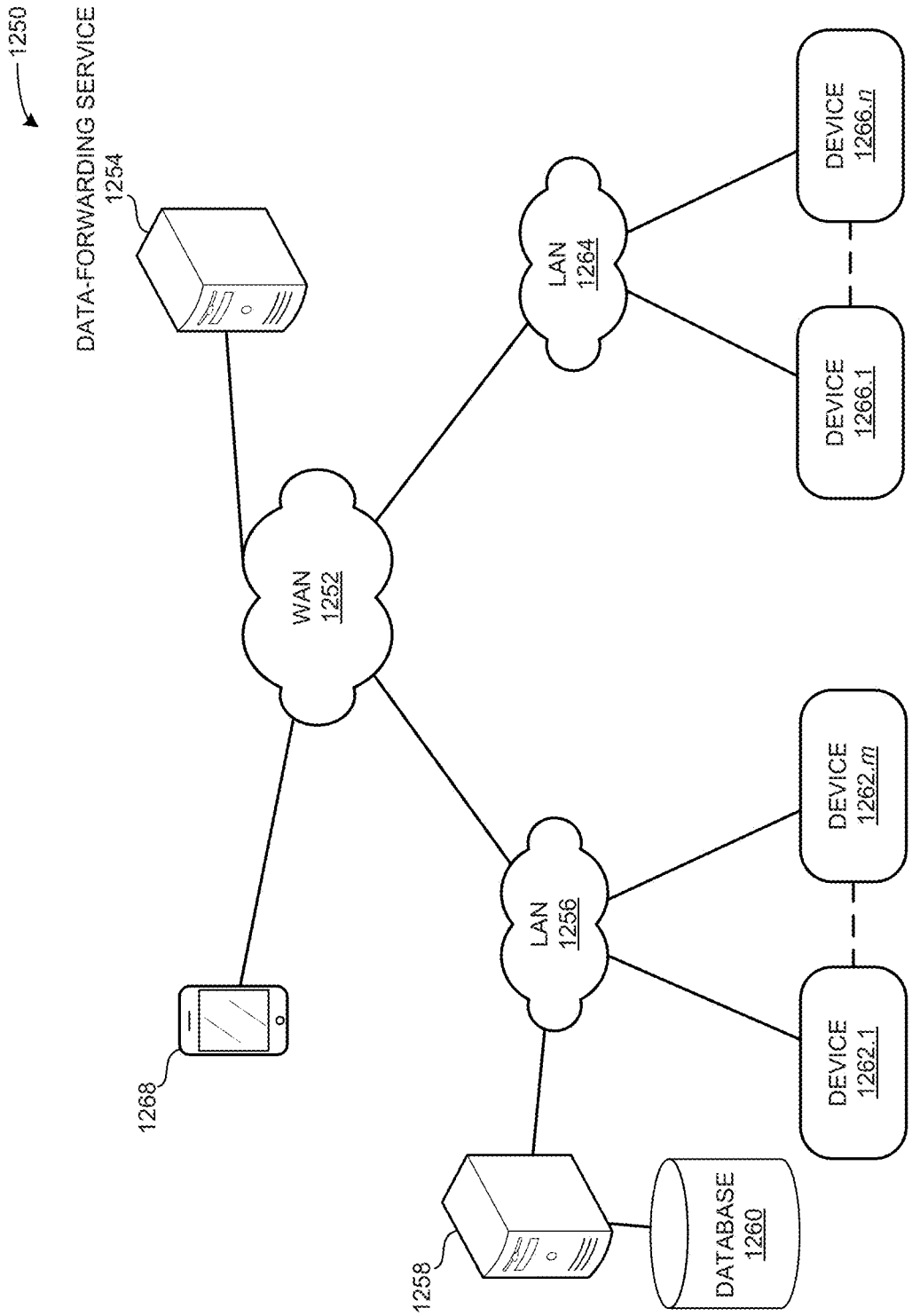
FIG. 12B illustrates an exemplary system architecture that includes a LAN controller within a local-area network and a forwarding service accessible within a wide-area network in accordance with an embodiment of the present invention.

FIG. 12B illustrates an exemplary system architecture 1250 that includes a LAN controller within a local-area network and a forwarding service accessible within a wide-area network in accordance with an embodiment of the present invention. LAN 1256 can include a primary controller 1258 that can be used to configure, monitor, and/or control interfacing devices within a local domain, as well as interfacing devices within one or more remote domains.

Specifically, controller 1258 can be installed within LAN 1256, and can include or be coupled to a database 1260 that stores configuration information and historical data for the interfacing devices of the local and remote domains. Controller 1258 can establish a peer-to-peer network connection to devices 1262.1-1262.$m$ within LAN 1256, and can establish network connections to one or more interfacing devices of a remote domain (e.g., to devices 1266.1-1266.$n$ of LAN 1264) via data-forwarding service 1254.

For example, controller 1258 can be installed within an organization's office building to manage a plurality of devices. A system administrator can interact with controller 1258 to add an interfacing device to the network, such as an mPort device coupled to a motion sensor, and an mPower device coupled to a light fixture. The system can also configure controller 1258 to collect real-time event data from the plurality of interfacing devices within an event log, which allows the administrator to study the event log in an effort to ensure the network of devices are operating as desired.

Further, if the organization expands to other buildings, either within the same city or at a distant location, the administrator can configure controller 1258 to establish a network connection to devices at the remote location via data-forwarding service 1254. This allows controller 1254 to reconfigure, control, and/or monitor devices at the remote location, without utilizing a central controller outside any of the organization's local-area networks. Thus, installing controller 1258 within the organization's local network allows the administrator to have control over the data that is collected by the interfacing devices and is stored within database 1260, while still allowing the administrator to deploy additional devices at remote locations.

In some embodiments, the administrator can also interact with controller 1258 and/or any of the interfacing devices while the administrator is not within any of the organization's local-area networks. The administrator can install an application on a personal computing device (e.g., a smartphone 1268), which has access to WAN 1252 (e.g., via a cellular network), and that communicates with central controller 1258 and/or with the interfacing devices via the data-forwarding service 1254. Alternatively, the administrator can use an Internet web browser to access a web-based interface hosted by controller 1258 by establishing a connection to controller 1258 via data-forwarding service 1254.

In some embodiments, system architecture 1250 can include a backup controller accessible via WAN 1252, which includes or is coupled to a database that mirrors database 1260. In the event that primary controller 1258 goes offline, the backup controller can temporarily become the primary controller. This allows the administrator to interact with the backup controller (e.g., using smartphone 1268) to add or remove devices to/from the interfacing device network and/or to reconfigure an existing interfacing device.

Figure 13:
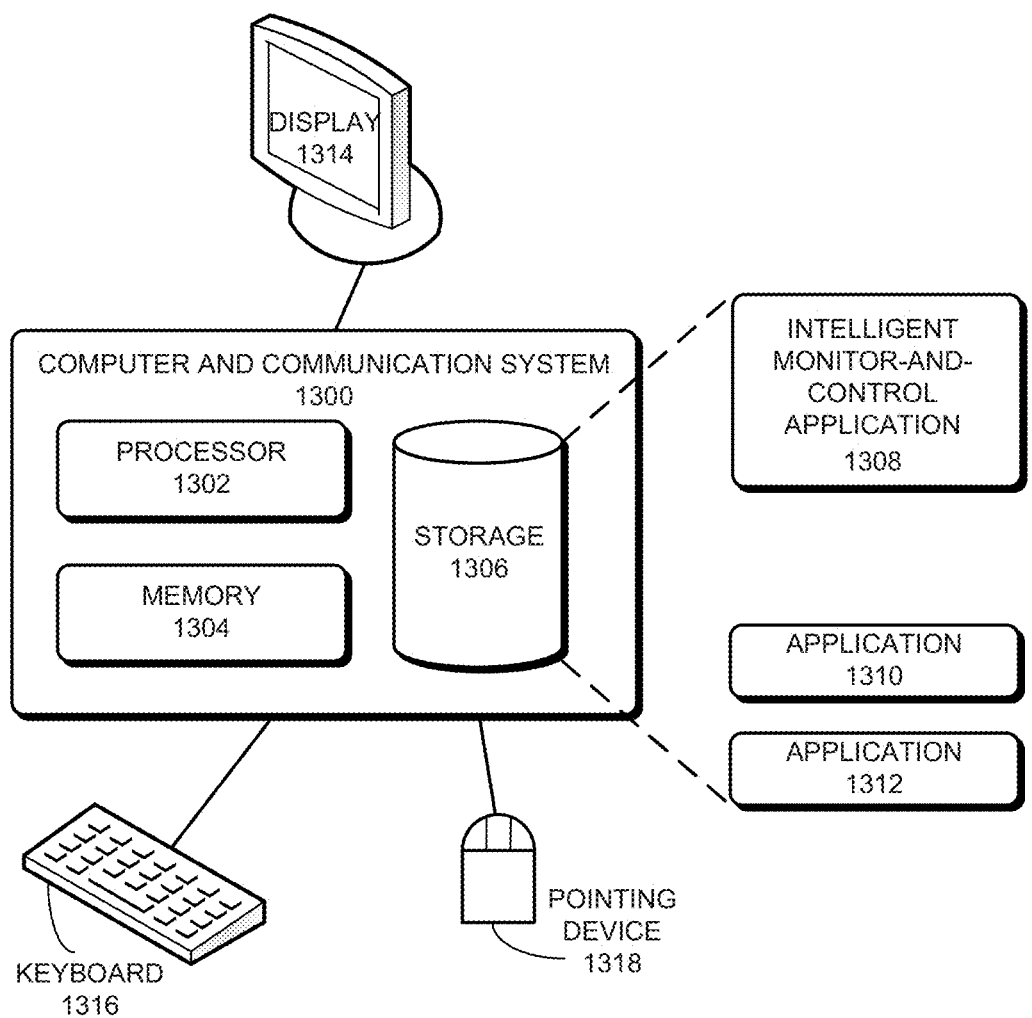
FIG. 13 illustrates an exemplary computer system for intelligent monitoring and controlling of devices in accordance with one embodiment of the present invention.

FIG. 13 illustrates an exemplary computer system for intelligent monitoring and controlling of devices in accordance with one embodiment of the present invention. In one embodiment, a computer and communication system 1300 includes a processor 1302, a memory 1304, and a storage device 1306. Storage device 1306 stores an intelligent monitor-and control application 1308, as well as other applications and data (e.g., additional applications 1310 and 1312). During operation, intelligent monitor-and control application 1308 is loaded from storage device 1306 into memory 1304 and then executed by processor 1302 to monitor data from a plurality of interfacing devices, to configure an interfacing device, and/or to control a state of an interfacing device. While executing the program, processor 1302 performs the aforementioned functions. Computer and communication system 1300 can also be coupled to a display 1314, a keyboard 1316, and a pointing device 1318. The display, keyboard, and pointing device can facilitate a user to monitor, configure, and/or control one or more interfacing devices.

One embodiment of the present invention provides a device-controlling system that configures, monitors, and controls one or more interfacing devices, such that an interfacing device can obtain and disseminate sensor data from one or more attached physical devices that include sensors for measuring physical attributes. During operation, the system can configure an interfacing device by establishing a network connection with the interfacing device, and determining one or more rules for the interfacing device. A rule can indicate an action description for performing an action, and indicates a condition that indicates criteria for processing the rule's action description. The system can configure the interfacing device to process its associated rules.

In some variations to this embodiment, the system configures the interfacing device to send recent sensor data to the device-controlling computer, and the system uses this data to configure or control one or more interfacing devices. When the system determines that a rule associated with the interfacing device is satisfied based on recent data from one or more interfacing devices, the system modifies the interfacing device's operating state based on the rule's action description.

In some variations to this embodiment, the system configures one or more interfacing devices to facilitate distributed rule processing. To configure the interfacing device, the system programs the interfacing device to process the one or more rules. The system also determining one or more other devices that generate sensor data associated with the one or more rules for the interfacing device, and configures the interfacing device to subscribe to sensor data from the one or more other devices.

In some embodiments, the system can receive a request, from a client device, to obtain a device-monitoring UI The system can present the device-monitoring UI by obtaining data associated with one or more interfacing devices for the device-monitoring UI, and providing the device-monitoring UI to the client device so that the device-monitoring UI presents sensor data from the one or more interfacing devices.

In some variations to these embodiments, the data associated with an interfacing device includes device-accessing information for the interfacing device, which the client device can use to obtain real-time sensor data for the device-monitoring UI directly from the respective interfacing device.

In some variations to these embodiments, the data associated with an interfacing device includes a geographic location. Also, to provide the device-monitoring UI, the system can obtain a map that covers a geographic area associated with at least one interfacing device. The system then generates the device-monitoring UI to display the obtained map, and to overlay the at least one interfacing device over the map.

In some variations to these embodiments, the data associated with a respective device includes a set of image coordinates. Thus, when the system provides the device-monitoring UI, the system can obtain an image of an area associated with at least one interfacing device. The system then generates the device-monitoring UI to display the obtained image, and to overlay the at least one interfacing device over the obtained image. The obtained image can include a frame from a real-time video feed, and the system can periodically update the device-monitoring UI to display a recent frame from the real-time video feed.

In some variations to these embodiments, the real-time video feed can include a video feed from a pan-tilt-zoom (PTZ) camera. Thus, while the system provides the device-monitoring UI, the system can map the image coordinates for an interfacing device to a set of coordinates associated with the frame from the PTZ camera. When the camera's orientation changes, the system can update the device-monitoring UI to overlay the interfacing device over the recent frame based on the mapped image coordinates.

In some embodiments, a user-definable rule can include a compound rule that is associated with multiple physical devices.

In some embodiments, the system can receiving a command, from a client device, to control an interfacing device. The system then determines an established network connection for communicating with the interfacing device, and configures the interfacing device, via the network connection, as indicated by the received command.

The system can also receive, from a client device, a request to obtain a rule-configuring UI. The rule-configuring UI can indicate one or more existing rules for one or more interfacing devices, and facilitates creating or modifying new or existing rules. Then, in response to receiving a description for a rule, the system determines one or more target interfacing devices that process at least a portion of the rule's action description. The system then generates a device-specific rule for a target device, such that the device-specific rule includes a portion of the rule's action description that is to be processed by the target device. The system then configures the target device to process the device-specific rule.

In some variations to the embodiments, while configuring the interfacing device, the system can determine a geographic location for the interfacing device, and/or can determine a description for one or more physical devices coupled to the interfacing device. Also, the system can generate a digital certificate for the interfacing device, and/or can provision the interfacing device based at least on the digital certificate.

One embodiment of the present invention provides a data-forwarding system that establishes a network connection to a plurality of network devices to facilitate an interfacing device communicating with a device-controlling system, a peer interfacing device, or other computing devices. During operation, when the system receives data from a network device, the system determines a peer network device that is to receive the data, such as a device that is subscribed to receive the data. The system can forward the sensor data to the peer network device by determining an established network connection for communicating with the second network device, and sending the sensor data to the peer network device via the established network connection.

In some embodiments, to determine a second network device that is subscribed to the received sensor data, the system searches through a data-subscription repository, which stores data-subscription requests for a plurality of network devices, to obtain a stored data-subscription request associated with the received sensor data. The system then identifies an interfacing device that is subscribed to the received sensor data based on the stored data-subscription request.

In some embodiments, the system implements a data-forwarding service that receives a data-subscription request from the first network device. The data-subscription request indicates a data-supplying interfacing device, and also indicates sensor data supplied by the data-supplying interfacing device. The system then stores the data-subscription, in the data-subscription repository, in association with the first network device. The system also forwards the data-subscription request to the data-supplying interfacing device.

In some embodiments, while establishing the network connection, the system receives a request from a network device to establish the network connection, and the system determines device-accessing information for the network device based on the request. The system stores the device-accessing information in association with the network device, and establishes the network connection with the network device based on the device-accessing information.

In some embodiments, the system establishes the network connection using a WebSocket protocol, a Session Traversal Utilities for Network-address-translation (STUN) protocol, and/or a Comet protocol.

In some variations to these embodiments, when establishing the network connection using the WebSocket protocol, the request can include a WebSocket handshake request to upgrade a hypertext transfer protocol (HTTP) session to a WebSocket session, and can include a Sec-WebSocket-Key token from the network device. The system can store the Sec-WebSocket-Key in association with the network device, and generates a Sec-WebSocket-Accept token for the interfacing device based on the Sec-WebSocket-Key. The system then sends to the interfacing device a response which acknowledges a persistent Web Socket communication channel, such that the response includes at least the Sec-WebSocket-Accept token for the interfacing device.

In some variations to these embodiments, when establishing the network connection using the STUN protocol, the system receives a binding request that indicates network-addressing information for the network device, and stores the network-addressing information in association with the network device. The network-addressing information can include at least one or more of a network address and a port number.

In some variations to these embodiments, when establishing the network connection using the Comet protocol, the system receives a long-polling request from the network device, and determines network-addressing information for the network device based on the long-polling request. The network-addressing information includes at least one or more of a network address and a port number. The system stores the network-addressing information in association with the network device, which facilitates accessing the network connection at a later time.

In some embodiments, the device-accessing information can include a network address for the network device, a port number for the network device, and/or a unique identifier for the network device. The device-accessing information can also include authentication information, such as a digital certificate assigned to the network device, login credentials associated with the network device, etc.

In some embodiments, the system can determine the device-accessing information by determining the network address and/or the port number for the network device based on the message header from a network packet that includes the request.

In some embodiments, the network device can include a sensor-interfacing device, a power outlet, a power strip, a light dimmer, a light switch, or a client computing device.

One embodiment of the present invention provides an interfacing device that communicates with other devices over an established network connection to send and/or receive real-time sensor data. During operation, the local interfacing device can establish a network connection with a remote network device, such as with a peer interfacing device, or a data-forwarding system. The device can maintain data subscriptions to other peer devices by selecting a rule that takes sensor data from one or more remote interfacing devices as input, and generating a data-subscription request for a sensor data element associated with the rule. The data-subscription request indicates a data-supplying interfacing device, and further indicates sensor data supplied by the data-supplying interfacing device. The device then sends the data-subscription request to the remote device via the established network connection.

In some embodiments, the remote device can include a remote peer device associated with the data-subscription request, or a data-forwarding device configured to maintain a network connection between the local network device and a remote peer device associated with the data-subscription request.

In some embodiments, the local interfacing device can store the rule in a rule repository. Then, when the device receives sensor data via the established network connection, and in response to determining that the received sensor data is associated with the stored rule, the device processes the rule based at least on the received sensor data.

In some embodiments, the local interfacing device can obtain sensor data from a local physical device, such that the physical device can include a sensor for measuring one or more physical attributes. If the interfacing device determines that the remote device is subscribed to the obtained sensor data, the interfacing device sends the sensor data to the remote device via the established network connection.

In some embodiments, the local interfacing device establishes the network connection using a WebSocket protocol, a Session Traversal Utilities for Network-address-translation (STUN) protocol, and/or a Comet protocol.

In some variations to these embodiments, the request can include a WebSocket handshake request to upgrade a hypertext transfer protocol (HTTP) session to a WebSocket session, and can include a Sec-WebSocket-Key token from the network device. Also, when establishing the network connection using the WebSocket protocol, the local interfacing device can store the Sec-WebSocket-Key in association with the remote device, and generates a Sec-WebSocket-Accept token for the remote device based on the Sec-WebSocket-Key. The local interfacing device then sends to the remote device a response which acknowledges a persistent WebSocket communication channel, such that the response includes at least the Sec-WebSocket-Accept token for the remote device.

In some variations to these embodiments, when establishing the network connection using the STUN protocol, the local interfacing device receives a binding request that indicates network-addressing information for the remote device, and stores the network-addressing information in association with the remote device. The network-addressing information can include at least one or more of a network address and a port number.

In some variations to these embodiments, when establishing the network connection using the Comet protocol, the local interfacing device receives a long-polling request from the remote device, and determines network-addressing information for the remote device based on the long-polling request. The network-addressing information includes at least one or more of a network address and a port number. The local interfacing device stores the network-addressing information in association with the remote device, which facilitates accessing the network connection at a later time.

One embodiment of the present invention provides a local controller that maintains a local database which stores information associated with a set of interfacing devices of a local-area network. The local database can include a database mirror for a remote database, of a remote controller, that stores information for a set of provisioned interfacing devices. During normal operation, a remote controller hosting the remote database can have primary control of interfacing devices within the local area network and/or other network domains, and the local controller maintains the local database to include at least a subset of the remote database. However, when the local controller determines that the remote controller has gone offline, the local controller can obtain primary control of interfacing devices within the local area network.

In some embodiments, while configuring the local network controller to obtain primary control of the local area network, the local controller is enabled to monitor interfacing devices of the local area network, to reconfigure an interfacing device of the local area network, and/or to control an interfacing device of the local area network.

In some embodiments, the local controller is not configured to add an interfacing device to the interfacing-device network, or to remove an interfacing device from the set of provisioned interfacing devices.

In some embodiments, while obtaining primary control of the local area network, the local controller determines that the local database is synchronized with a latest version of the remote database.

In some embodiments, in response to determining that the local database and the remote database are synchronized, the local controller is configured to obtain primary control of the local area network. To obtain primary control of the local area network, the local controller is enabled to add a new interfacing device to the set of provisioned interfacing devices, and to remove an interfacing device from the set of provisioned interfacing devices.

In some embodiments, the local controller is configured to rescind primary control of the local area network, in response to determining that a remote controller that hosts the remote database has come online.

In some embodiments, while to rescinding primary control of the local area network, the local controller synchronizes the local database with the remote database.

One embodiment provides an interfacing device that is configured to process one or more rules, based on sensor data, to perform a predetermined action. During operation, the device can receive a device configuration that includes a rule for the interfacing device. The rule can include an action description for performing an action, and can include a condition that takes sensor data as input and indicates criteria for performing the action. The device can store the rule in a rule repository, and determines a remote interfacing device that generates a piece of data associated with the rule's condition. The device can also subscribe to the piece of data from the remote interfacing device.

In some embodiments, the local interfacing device establishes a network connection with the remote interfacing device, and subscribes to the data from the remote interfacing device via the established connection.

In some embodiments, while establishing the network connection, the local interfacing devices establishes a peer-to-peer network connection with the remote interfacing device.

In some embodiments, the local interfacing device establishes the network connection using a WebSocket protocol, a Session Traversal Utilities for Network-address-translation (STUN) protocol, and/or a Comet protocol.

In some embodiments, while establishing the network connection, if the local interfacing device determines that the remote interfacing device is not reachable via a peer-to-peer communication channel, the local interfacing device establishes the network connection via a data-forwarding service.

In some embodiments, when the local interfacing device obtains sensor data, the local interfacing device selects a rule to process based on the sensor data. If the local interfacing device determines that the rule's condition is satisfied, and the local interfacing device processes the rule's action description to perform the action.

In some embodiments, the local interfacing device obtains sensor data from a local or remote physical device that measures one or more physical attributes, and/or from a network controller which monitors and/or configures one or more interfacing devices.

In some embodiments, while selecting the rule to process, the local interfacing device selects a set of rules whose condition takes the obtained data as input, and determines a user-specified ordering for the set of rules. The user-specified ordering indicates an order in which the rules are to be processed. The local interfacing device then selects a rule, from the set of rules, based on the user-specified ordering.

In some embodiments, the local interfacing device obtains sensor data by periodically monitoring a data value from a physical device coupled to the interfacing device. Also, if the local interfacing device determines that the obtained data satisfies a data-subscription request from a remote interfacing device, the local interfacing device communicates the obtained data to the remote interfacing device.

In some embodiments, the local interfacing device can communicate the data to the remote interfacing device by communicating the data via an established network connection, which has been established for communicating with the remote interfacing device.

One embodiment provides a sensor-monitoring interfacing device, coupled to one or more physical devices that include sensors for measuring physical attributes. During operation, the interfacing device obtains and processes sensor data from the physical devices. When the interfacing device obtains sensor data from a physical device, the interfacing device selects a rule to process based on the obtained sensor data. If the interfacing device determines that the rule's condition is satisfied, the interfacing device can process the rule's action description to perform a corresponding action.

In some embodiments, the physical device can include a temperature sensor, a humidity sensor, a voltage sensor, a current sensor, a motion sensor, a light sensor, a moisture sensor a digital-value sensor, and/or a door/window sensor.

In some embodiments, the action can include sending a predetermined signal pattern over a serial port, and/or sending a predetermined signal pattern over one or more general-purpose output pins. Also, the action can include processing a predetermined script to configure a peripheral device via a serial port, sending an email message to a predetermined recipient, creating a system alert, generating an event for an event log, and/or computing a data value based in part on the received sensor data.

In some embodiments, if the local interfacing device determines that the sensor data satisfies a data-subscription request from a remote interfacing device, the interfacing device communicates the sensor data to the remote interfacing device.

In some embodiments, the data-subscription request indicates can indicate a minimum threshold value for the sensor data, a maximum threshold value for the sensor data, a time duration since a previous piece of sensor data was provided to the remote interfacing device, and/or a difference threshold between the obtained sensor data and a previous piece of sensor data that was provided to the remote interfacing device.

In some embodiments, while communicating the data to the remote interfacing device, the local interfacing device can communicate the data via an established peer-to-peer network-connection associated with the remote interfacing device.

In some embodiments, while selecting the rule to process, the local interfacing device selects a set of rules whose condition takes the obtained data as input, and determines a user-specified ordering for the set of rules. The user-specified ordering indicates an order in which the rules are to be processed. The local interfacing device then selects a rule based on the user-specified ordering.

In some embodiments, the local interfacing device can adjust a color of a light-emitting diode (LED) indicator based on determining that the interfacing device is in a factory-default mode. The local interfacing device can adjust a color of a light-emitting diode indicator based on determining that the interfacing device is provisioned by a network controller that monitors or controls one or more interfacing devices, and/or determining that the interfacing device is being monitored by the network controller.

One embodiment provides a load-controlling interfacing device that obtains and processes sensor data from a user interface and/or other devices, and that processes rules based on the sensor data to control an electrical load, such as a light fixture. During operation, when the interfacing device obtains sensor data, the interfacing device selects a rule to process based on the sensor data from the user interface. If the interfacing device determines that the rule's condition is satisfied, the interfacing device can process the rule's action description to perform a corresponding action for controlling power to the electrical load.

In some embodiments, the electrical load includes a light fixture.

In some embodiments, the event data includes sensor data from a touch-screen user interface. The touch-screen user interface can include a capacitive-touch surface area, a resistive-touch surface area, a proximity sensor, and/or a motion sensor.

In some embodiments, the event data from the touch-screen user interface can indicate a portion of the touch-screen user interface that was touched by a local user, a detected object within a determinable distance from the touch-screen user interface, and/or a detected motion.

In some embodiments, while obtaining the event data, the interfacing device processes information from the touch-screen UI to determine a gesture. The gesture can include an upward finger swipe for increasing a light intensity of the light fixture, a downward finger swipe for decreasing a light intensity of the light fixture, a finger tap for activating or deactivating power to the light fixture, and/or a finger tap for adjusting the light fixture's light intensity to a determinable level.

In some embodiments, the interfacing device can determine that the event data satisfies a data-subscription request from a remote interfacing device, and communicates the event data to the remote interfacing device.

In some embodiments, the remote-interfacing device is electrically coupled to a corresponding light fixture, and the remote-interfacing device can be configured to adjust power to the corresponding light fixture based on the event data.

One embodiment provides a load-monitoring interfacing device that obtains and processes sensor data from an electrical load. The interfacing device can include at least one power outlet to provide power to a corresponding electrical load. During operation, the interfacing device can obtain sensor data from a local power outlet coupled to an electrical load, such that the sensor data can indicate an electrical measurement associated with the electrical load.

The interfacing device selects a rule to process based on the obtained sensor data, and processes the rule to determine whether to perform an action. If the rule's condition is satisfied, the interfacing device proceeds to processing the rule's action description to perform the action, such as to enable or disable a power outlet, or to perform any other pre-defined action.

In some embodiments, the sensor data from the power outlet can include a power state for the corresponding electrical load, a current measurement, and/or a voltage measurement.

In some embodiments, the action can include activating a power outlet, deactivating a power outlet, modulating a voltage provided by an outlet, and/or modulating an amount of current provided by a power outlet. Also, the action can include sending an email message to a predetermined recipient, creating a system alert, generating an event for an event log, and/or computing a data value based in part on the received sensor data.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    storing in a rule repository, by an interfacing device, a plurality of rules specified by a user and received from a controller, wherein the interfacing device comprises at least a power outlet for providing power to an electrical load and a power-output controller configured to monitor an amount of power provided by the power outlet, and wherein a respective rule includes an action description for performing an action and a compound logic condition for performing the action;
    obtaining, by the interfacing device, sensor data from the power-output controller, wherein the sensor data indicates an electrical measurement associated with the electrical load;
    detecting a rule-triggering event based on the obtained sensor data, wherein the rule-triggering event triggers at least two rules having conflict action descriptions;
    selecting a first rule from the at least two rules based on an order specified by the user;
    in response to determining that processing the selected first rule requires additional sensor data, identifying a remote interfacing device that generates the additional sensor data, wherein the remote interfacing device comprises at least one or more connection terminals for coupling to one or more physical devices that provide the additional sensor data;
    subscribing to the additional sensor data from the identified remote interfacing device;
    receiving the additional sensor data from the identified remote interfacing device;
    determining that the selected first rule's condition is satisfied based on electrical measurement associated with the electrical load and the additional sensor data from the remote interfacing devices;
    processing, by the interfacing device, the selected first rule to execute the first rule's action description;
    determining an updated state of the interfacing device based on the execution of the first rule's action description; and
    processing a second rule from the at least two rules based on the order specified by the user to execute the second rule's action description.

2. The method of claim 1, wherein the compound logic condition comprises one or more of:
    a power state for the corresponding electrical load or the second electrical load;
    a current measurement; and
    a voltage measurement.

3. The method of claim 1, wherein the action includes one or more of:
    activating a power outlet;
    deactivating a power outlet;
    modulating a voltage provided by an outlet;
    modulating an amount of current provided by a power outlet;
    sending an email message to a predetermined recipient;
    creating a system alert;
    generating an event for an event log; and
    computing a data value based in part on the received sensor data.

4. The method of claim 1, further comprising:
    determining that the sensor data satisfies a data-subscription request from a second remote interfacing device; and
    sending the sensor data to the second remote interfacing device.

5. The method of claim 4, wherein the data-subscription request indicates one or more of:
    a minimum threshold value for the sensor data;
    a maximum threshold value for the sensor data;
    a time duration since a previous piece of sensor data was provided to the second remote interfacing device; and
    a difference threshold between the obtained sensor data and a previous piece of sensor data that was provided to the second remote interfacing device.

6. The method of claim 4, wherein sending the data to the second remote interfacing device involves sending the data via an established peer-to-peer network connection associated with the second remote interfacing device.

7. The method of claim 6, wherein the established network connection is established using one or more of:
- a WebSockets protocol;
- a communication channel via the Session-Traversal Utilities for NAT (STUN) protocol; and
- a Comet protocol.

8. The method of claim 7, wherein a request for establishing the network connection using the WebSocket protocol includes at least one of:
- a WebSocket handshake request to upgrade a hypertext transfer protocol (HTTP) session to a WebSocket session; and
- a Sec-WebSocket-Key token from a network device.

9. The method of claim 8, wherein establishing the network connection using the WebSocket protocol further involves:
- storing the Sec-WebSocket-Key in association with the network device;
- generating a Sec-WebSocket-Accept token for the interfacing device based on the Sec-WebSocket-Key; and
- sending to the interfacing device a response which acknowledges a persistent WebSocket communication channel, wherein the response includes at least the Sec-WebSocket-Accept token for the interfacing device.

10. The method of claim 7, wherein establishing the network connection using the STUN protocol involves:
- receiving a binding request that indicates network-addressing information for a network device, wherein the network-addressing information includes at least one or more of a network address and a port number; and
- storing the network-addressing information in association with the network device.

11. The method of claim 7, wherein establishing the network connection using the Comet protocol involves:
- receiving a long-polling request from a network device;
- determining network-addressing information for the network device based on the long-polling request, wherein the network-addressing information includes at least one or more of a network address and a port number; and
- storing the network-addressing information in association with the network device.

12. The method of claim 1, further comprising adjusting a color of a light-emitting diode (LED) indicator located on the interfacing device based on one or more of:
- determining that the interfacing device is in a factory-default mode;
- determining that the interfacing device is provisioned by a network controller which monitors or controls one or more interfacing devices; and
- determining that the interfacing device is being monitored by the network controller.

13. A non-transitory computer-readable storage medium storing instructions that when executed by a processor of an interfacing device that comprises at least a power outlet for providing power to an electrical load and a power-output controller configured to monitor an amount of power provided by the power outlet, cause the processor to perform a method, the method comprising:
- storing in a rule repository a plurality of rules specified by a user and received from a controller, wherein a respective rule includes an action description for performing an action and a compound logic condition for performing the action;
- obtaining sensor data from the power-output controller, wherein the sensor data indicates an electrical measurement associated with the electrical load;
- detecting a rule-triggering event based on the obtained sensor data, wherein the rule-triggering event triggers at least two rules having conflict action descriptions;
- selecting a first rule from the at least two rules based on an order specified by the user;
- in response to determining that processing the selected first rule requires additional sensor data, identifying a remote interfacing device that generates the additional sensor data, wherein the remote interfacing device comprises at least one or more connection terminals for coupling to one or more physical devices that provide the additional sensor data;
- subscribing to the additional sensor data from the identified remote interfacing device;
- receiving the additional sensor data from the identified remote interfacing device;
- determining that the first rule's condition is satisfied based on electrical measurement associated with the electrical load and the additional sensor data from the remote interfacing devices;
- processing the selected first rule to execute the first rule's action description;
- determining an updated state of the interfacing device based on the execution of the first rule's action description; and
- processing a second rule from the at least two rules based on the order specified by the user to execute the second rule's action description.

14. The storage medium of claim 13, wherein the compound logic condition comprises one or more of:
- a power state for the corresponding electrical load or the second electrical load;
- a current measurement; and
- a voltage measurement.

15. The storage medium of claim 13, wherein the action includes one or more of:
- activating a power outlet;
- deactivating a power outlet;
- modulating a voltage provided by an outlet;
- modulating an amount of current provided by a power outlet;
- sending an email message to a predetermined recipient;
- creating a system alert;
- generating an event for an event log; and
- computing a data value based in part on the received sensor data.

16. The storage medium of claim 13, wherein the method further comprises:
- determining that the sensor data satisfies a data-subscription request from a second remote interfacing device; and
- sending the sensor data to the second remote interfacing device.

17. The storage medium of claim 16, wherein the data-subscription request indicates one or more of:
- a minimum threshold value for the sensor data;
- a maximum threshold value for the sensor data;
- a time duration since a previous piece of sensor data was provided to the second remote interfacing device; and
- a difference threshold between the obtained sensor data and a previous piece of sensor data that was provided to the second remote interfacing device.

18. The storage medium of claim 16, wherein sending the data to the second remote interfacing device involves sending the data via an established peer-to-peer network connection associated with the second remote interfacing device.

19. The storage medium of claim 18, wherein the established network connection is established using one or more of:
   a WebSockets protocol;
   a communication channel via the Session-Traversal Utilities for NAT (STUN) protocol; and
   a Comet protocol.

20. The storage medium of claim 19, wherein a request for establishing the network connection using the WebSocket protocol includes at least one of:
   a WebSocket handshake request to upgrade a hypertext transfer protocol (HTTP) session to a WebSocket session; and
   a Sec-WebSocket-Key token from a network device.

21. The storage medium of claim 20, wherein establishing the network connection using the WebSocket protocol further involves:
   storing the Sec-WebSocket-Key in association with the network device;
   generating a Sec-WebSocket-Accept token for the interfacing device based on the Sec-WebSocket-Key; and
   sending to the interfacing device a response which acknowledges the persistent WebSocket communication channel, wherein the response includes at least the Sec-WebSocket-Accept token for the interfacing device.

22. The storage medium of claim 19, wherein establishing the network connection using the STUN protocol involves:
   receiving a binding request that indicates network-addressing information for a network device, wherein the network-addressing information includes at least one or more of a network address and a port number; and
   storing the network-addressing information in association with the network device.

23. The storage medium of claim 19, wherein establishing the network connection using the Comet protocol involves:
   receiving a long-polling request from a network device;
   determining network-addressing information for the network device based on the long-polling request, wherein the network-addressing information includes at least one or more of a network address and a port number; and
   storing the network-addressing information in association with the network device.

24. The storage medium of claim 13, wherein the method further comprises adjusting a color of a light-emitting diode (LED) indicator located on the interfacing device based on one or more of:
   determining that the interfacing device is in a factory-default mode;
   determining that the interfacing device is provisioned by a network controller which monitors or controls one or more interfacing devices; and
   determining that the interfacing device is being monitored by the network controller.

25. An apparatus, comprising:
   at least one power outlet for providing power to an electrical load and a power-output controller configured to monitor an amount of power provided by the power outlet;
   a controller;
   a rule repository storing a plurality of rules specified by a user and received from the controller, wherein a respective rule includes an action description for performing an action and a compound logic condition for performing the action;
   a processing unit;
   a memory storing instructions that, when executed by the processing unit, cause the processing unit to implement:
      a sensor-monitoring module to obtain sensor data from the power-output controller, wherein the sensor data indicates an electrical measurement associated with the electrical load; and
      a rule-processing module to:
         detect a rule-triggering event based on the obtained sensor data, wherein the rule-triggering event triggers at least two rules having conflict action descriptions;
         select a first rule from the at least two rules based on an order specified by the user;
         in response to determining that processing the selected first rule requires additional sensor data, identify a remote interfacing device that generates the additional sensor data, wherein the remote interfacing device comprises at least one or more connection terminals for coupling to one or more physical devices that provide the additional sensor data;
         subscribe to the additional sensor data from the identified remote interfacing device;
         receive the additional sensor data from the identified remote interfacing device;
         determine that the selected first rule's condition is satisfied based on electrical measurement associated with the electrical load and the additional sensor data from the remote interfacing devices;
         process the selected first rule to execute the first rule's action description;
         determine an updated state of the interfacing device based on the execution of the first rule's action description; and
         process a second rule from the at least two rules based on the order specified by the user to execute the second rule's action description.

26. The apparatus of claim 25, wherein the action includes one or more of:
   activating a power outlet;
   deactivating a power outlet;
   modulating a voltage provided by an outlet;
   modulating an amount of current provided by a power outlet;
   sending an email message to a predetermined recipient;
   creating a system alert;
   generating an event for an event log; and
   computing a data value based in part on the received sensor data.

27. The apparatus of claim 25, wherein the processing unit further implements:
   a communication module configured to communicate with one or more remote interfacing devices; and
   a subscription-processing module to:
      determine that the sensor data satisfies a data-subscription request from a second remote interfacing device; and
      configure the communication module to send the sensor data to the second remote interfacing device.

28. The apparatus of claim 27, wherein the data-subscription request indicates one or more of:

a minimum threshold value for the sensor data;
a maximum threshold value for the sensor data;
a time duration since a previous piece of sensor data was provided to the second remote interfacing device; and
a difference threshold between the obtained sensor data and a previous piece of sensor data that was provided to the second remote interfacing device.

29. The apparatus of claim 27, wherein while sending the data to the second remote interfacing device, the communication module is further configured to sending the data via an established peer-to-peer network connection associated with the second remote interfacing device.

30. The apparatus of claim 29, wherein the established network connection is established using one or more of:
a WebSockets protocol;
a communication channel via the Session-Traversal Utilities for NAT (STUN) protocol; and
a Comet protocol.

31. The apparatus of claim 30, wherein a request for establishing the network connection using the WebSocket protocol includes at least one of:
a WebSocket handshake request to upgrade a hypertext transfer protocol (HTTP) session to a WebSocket session; and
a Sec-WebSocket-Key token from a network device.

32. The apparatus of claim 30, wherein while establishing the network connection using the Comet protocol, the communication module is further configured to:
receive a long-polling request from a network device;
determine network-addressing information for the network device based on the long-polling request, wherein the network-addressing information includes at least one or more of a network address and a port number; and
store the network-addressing information in association with the network device.

33. The method of claim 1:
wherein the sensor data indicates a measured physical value;
wherein the rule's condition depends on the measured physical value; and
wherein obtaining the sensor data further involves:
obtaining a model identifier of the electrical load;
determining, based on the model identifier, a type of data value associated with the electrical load; and
analyzing the electrical measurement, based on the type of data value, to determine the measured physical value.

34. The method of claim 33, wherein the type of data value indicates calibration information associated with the electrical load.

35. The method of claim 33, wherein the measured physical value includes one or more of:
a time value;
a temperature;
a humidity level;
a detected motion;
an open or closed state of a door or window;
an ambient light level; and
a moisture level.

36. The method of claim 1, further comprising:
sending the sensor data indicating the electrical measurement to the controller;
obtaining, by the controller, a map that covers a geographic area associated with at least the interfacing device; and
presenting, by the controller, a device-monitoring user interface that displays the map, and represents the interfacing device and sensor data over the map.

* * * * *